(12) United States Patent
Dill

(10) Patent No.: US 10,289,929 B2
(45) Date of Patent: *May 14, 2019

(54) VISION-2-VISION CONTROL SYSTEM

(71) Applicant: VISION-2-VISION, LLC, Allen, TX (US)

(72) Inventor: Don K. Dill, Allen, TX (US)

(73) Assignee: VISION-2-VISION, LLC, Allen, TX (US)

( * ) Notice: Subject to any disclaimer, the term of this patent is extended or adjusted under 35 U.S.C. 154(b) by 469 days.

This patent is subject to a terminal disclaimer.

(21) Appl. No.: 14/581,591

(22) Filed: Dec. 23, 2014

(65) Prior Publication Data
US 2015/0110355 A1 Apr. 23, 2015

Related U.S. Application Data

(63) Continuation of application No. 13/088,036, filed on Apr. 15, 2011, now Pat. No. 8,917,905.

(Continued)

(51) Int. Cl.
G06K 9/00 (2006.01)
G06K 9/62 (2006.01)
(Continued)

(52) U.S. Cl.
CPC .............. *G06K 9/62* (2013.01); *A63J 1/02* (2013.01); *A63J 5/02* (2013.01); *F21V 23/0471* (2013.01);
(Continued)

(58) Field of Classification Search
CPC ........... G06K 9/00362; G06K 9/00369; G06K 9/00375; G06K 9/00382; G06K 9/00389; G06K 9/00342; G06K 9/62; G06F 3/011; G06F 3/012; G06F 3/017; G06F 3/0304; G06F 3/0425; G06F 3/048; G06F 3/0484; G06T 7/00; G06T 7/70; G06T 7/73; G06T 7/74; G06T 7/75; G06T 19/006; H05B 37/02; H05B 37/0218; H05B 37/0227; H05B 37/0236; H05B 37/0245; H05B 37/029; H04L 12/2803; H04L 12/282; F21V 23/0442; F21V 23/0471;
(Continued)

(56) References Cited

U.S. PATENT DOCUMENTS 4,947,302 A * 8/1990 Callahan .............. H05B 37/029 315/312
5,023,709 A 6/1991 Kita et al.
(Continued)

*Primary Examiner* — Eric Rush
(74) *Attorney, Agent, or Firm* — Gregory M. Howison

(57) ABSTRACT

A method for controlling an object space having an associated object environment includes the steps of, defining a target set of coordinates in the object space, recognizing the presence of a predetermined object in the object space, and determining a coordinate location of the recognized predetermined object in the object space. The method further includes determining the spatial relationship between the recognized predetermined object and the target set of coordinates, comparing the spatial relationship with predetermined spatial relationship criteria, and if the determined spatial relationship criteria falls within the predetermined spatial relationship criteria, modifying the object space environment.

22 Claims, 86 Drawing Sheets

Related U.S. Application Data

(60) Provisional application No. 61/324,443, filed on Apr. 15, 2010.

(51) Int. Cl.
  *A63J 5/02* (2006.01)
  *F21V 23/04* (2006.01)
  *H05B 37/02* (2006.01)
  *A63J 1/02* (2006.01)

(52) U.S. Cl.
  CPC ...... *F21V 23/0478* (2013.01); *G06K 9/00342* (2013.01); *G06K 9/00362* (2013.01); *G06K 9/00369* (2013.01); *H05B 37/02* (2013.01); *H05B 37/029* (2013.01); *H05B 37/0227* (2013.01); *H05B 37/0236* (2013.01)

(58) Field of Classification Search
  CPC . F21V 23/0478; F21V 23/0485; Y02B 20/44; Y02B 20/48; A63J 1/02; A63J 5/02
  USPC ........ 382/100, 103, 286, 291; 345/632, 633; 715/757, 863; 348/135, 169
  See application file for complete search history.

(56) References Cited

U.S. PATENT DOCUMENTS

| | | | |
|---|---|---|---|
| 5,293,097 A | 3/1994 | Elwell | |
| 5,434,617 A | 7/1995 | Bianchi | |
| 5,550,726 A | 8/1996 | Hiromachi et al. | |
| 6,431,711 B1 * | 8/2002 | Pinhanez | G03B 21/28 348/E5.137 |
| 6,548,967 B1 | 4/2003 | Dowling et al. | |
| 6,698,897 B2 * | 3/2004 | Hamana | G06F 3/03542 345/158 |
| 7,069,516 B2 * | 6/2006 | Rekimoto | G06F 3/011 715/757 |
| 7,225,414 B1 * | 5/2007 | Sharma | G06F 3/012 715/862 |
| 7,564,368 B2 | 6/2009 | Segall | |
| 7,710,271 B2 | 5/2010 | Frumau | |
| 8,162,486 B2 * | 4/2012 | Borger | G06F 3/011 348/46 |
| 8,410,724 B2 | 4/2013 | Adenau | |
| 8,619,131 B2 * | 12/2013 | Bergman | G03B 21/00 348/54 |
| 8,624,895 B2 | 1/2014 | Reese et al. | |
| 8,730,309 B2 * | 5/2014 | Wilson | G06F 3/011 348/51 |
| 9,526,156 B2 * | 12/2016 | LaDuke | H05B 37/029 |
| 2002/0038157 A1 * | 3/2002 | Dowling | A63J 17/00 700/90 |
| 2002/0186221 A1 * | 12/2002 | Bell | G06F 3/011 345/474 |
| 2003/0210229 A1 * | 11/2003 | Nishimura | G06F 3/0386 345/157 |
| 2004/0068409 A1 | 4/2004 | Tanaka et al. | |
| 2004/0183775 A1 * | 9/2004 | Bell | G06F 3/011 345/156 |
| 2005/0114121 A1 | 5/2005 | Tsingos et al. | |
| 2006/0040739 A1 * | 2/2006 | Wells | G06F 3/01 463/37 |
| 2007/0189026 A1 * | 8/2007 | Chemel | H05B 37/029 362/458 |
| 2007/0285510 A1 | 12/2007 | Lipton et al. | |
| 2010/0073363 A1 | 3/2010 | Densham et al. | |
| 2010/0191353 A1 | 7/2010 | Boleko Ribas et al. | |
| 2010/0264830 A1 | 10/2010 | Van Endert et al. | |
| 2013/0328770 A1 * | 12/2013 | Parham | G06F 3/0304 345/157 |

* cited by examiner

TO FIG. 5'

| L2R: PANELS WILL BE ENABLED IN COLUMNS FROM LEFT TO RIGHT. PANELS WILL BE TURNED ON IN SEQUENCE BASED UPON THE SYNC TRIGGER PARAMETERS. IN THE EXAMPLE, EACH TIC MARK ADDED TO THE LETTER "A" REPRESENTS A CONSECUTIVE DISPLAY STEP (E.G. A" WOULD FOLLOW A'). | | | | |
|---|---|---|---|---|
| | A' | A" | A''' | A'''' |
| | A' | A" | A''' | A'''' |
| | A' | A" | A''' | A'''' |
| | A' | A" | A''' | A'''' |

| R2L: PANELS WILL BE ENABLED IN COLUMNS FROM RIGHT TO LEFT. PANELS WILL BE TURNED ON IN SEQUENCE BASED UPON THE SYNC TRIGGER PARAMETERS. IN THE EXAMPLE, EACH TIC MARK ADDED TO THE LETTER "A" REPRESENTS A CONSECUTIVE DISPLAY STEP (E.G. A" WOULD FOLLOW A'). | | | | |
|---|---|---|---|---|
| | A'''' | A''' | A" | A' |
| | A'''' | A''' | A" | A' |
| | A'''' | A''' | A" | A' |
| | A'''' | A''' | A" | A' |

| L2R-ODD: PANELS WILL BE ENABLED FROM LEFT TO RIGHT SELECTING ODD NUMBERED PANELS. PANELS WILL BE TURNED ON IN SEQUENCE BASED UPON THE SYNC TRIGGER PARAMETERS. IN THE EXAMPLE, EACH TIC MARK ADDED TO THE LETTER "A" REPRESENTS A CONSECUTIVE DISPLAY STEP (E.G. A" WOULD FOLLOW A'). | | | | |
|---|---|---|---|---|
| | A' | | A" | |
| | | A" | | A''' |
| | A" | | A''' | |
| | | A''' | | A'''' |

| L2R-EVEN: PANELS WILL BE ENABLED FROM LEFT TO RIGHT SELECTING EVEN NUMBERED PANELS. PANELS WILL BE TURNED ON IN SEQUENCE BASED UPON THE SYNC TRIGGER PARAMETERS. IN THE EXAMPLE, EACH TIC MARK ADDED TO THE LETTER "A" REPRESENTS A CONSECUTIVE DISPLAY STEP (E.G. A" WOULD FOLLOW A'). | | | | |
|---|---|---|---|---|
| | | A' | | A" |
| | A' | | A" | |
| | | A" | | A''' |
| | A" | | A''' | |

FIG. 10

| FRAME ID | TIME | SYSTEM OR USER ACTION | VIDEO FRAME CAPTURE AND PROCESS (INTERNAL VIEW) | EXAMPLE OBJECT ATTRIBUTES OBTAINED |
|---|---|---|---|---|
| 1 | | | | NONE – BASELINE IMAGE |
| 2 | | USER SHINES LASER POINTER IN ENVIRONMENT TO DESIRED TARGET FOCUS POSITION | | LOCATION<br><br>NOTE: LASER BEAM SHOWN FOR CLARITY, HOWEVER ONLY THE BEAM POINT MAY BE OBSERVED |
| 3 | | | | LOCATION (COMPARE TO PRIOR VALUE)<br><br>NOTE: LASER BEAM SHOWN FOR CLARITY, HOWEVER ONLY THE BEAM POINT MAY BE OBSERVED |

| FRAME ID | TIME | EXAMPLE INTERNAL LOG | EXAMPLE ENVIRONMENT DEVICE CONTROL ATTRIBUTE UPDATES |
|---|---|---|---|
| 1 | | | |
| 2 | | | |
| 3 | | CRITERIA MET, INITIATE DEVICE ATTRIBUTE UPDATES | MAPPED ENVIRONMENT LIGHT FOCUS DATA UPDATED |

FIG. 13A″

| FRAME ID | TIME | SYSTEM OR USER ACTION | VIDEO FRAME CAPTURE AND PROCESS (INTERNAL VIEW) | EXAMPLE OBJECT ATTRIBUTES OBTAINED |
|---|---|---|---|---|
| 4 | | SYSTEM ENABLES POSITIONING LASER | 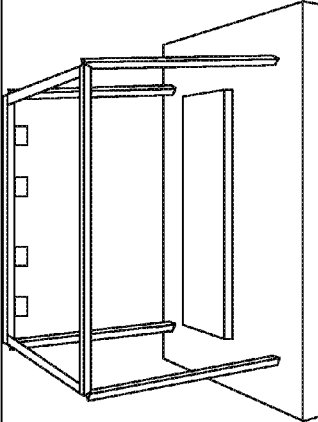 | LOCATION DATA FOR POSITIONING LASER<br><br>NOTE: LASER BEAM SHOWN FOR CLARITY, HOWEVER ONLY THE BEAM POINT MAY BE OBSERVED |
| 5 | | | 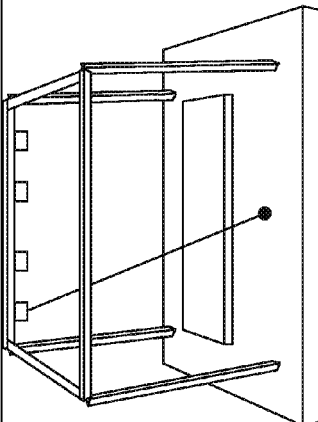 | LOCATION (COMPARE TO PRIOR VALUE)<br><br>NOTE: LASER BEAM SHOWN FOR CLARITY, HOWEVER ONLY THE BEAM POINT MAY BE OBSERVED |
| 6 | | | 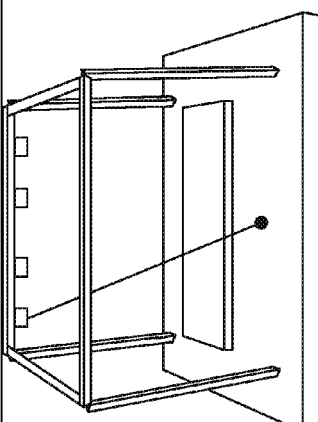 | |

| FRAME ID | TIME | EXAMPLE INTERNAL LOG | EXAMPLE ENVIRONMENT DEVICE CONTROL ATTRIBUTE UPDATES |
|---|---|---|---|
| 4 | | | |
| 5 | | | |
| 6 | | CRITERIA MET, INITIATE DEVICE ATTRIBUTE UPDATES | MAPPED ENVIRONMENT LIGHT FOCUS DATA UPDATED |

FROM FIG. 13B'

FIG. 13B"

| FRAME ID | TIME | SYSTEM OR USER ACTION | VIDEO FRAME CAPTURE AND PROCESS (INTERNAL VIEW) | EXAMPLE OBJECT ATTRIBUTES OBTAINED |
|---|---|---|---|---|
| 1 | | SYSTEM ENABLES POSITIONING LASER | | LOCATION DATA FOR POSITIONING LASER<br><br>*NOTE: LASER BEAM SHOWN FOR CLARITY, HOWEVER ONLY THE BEAM POINT MAY BE OBSERVED* |
| 2 | | SYSTEM TURNS ON FIRST LIGHTING FIXTURE | | LOCATION (COMPARE TO PRIOR VALUE)<br><br>*NOTE: LASER BEAM SHOWN FOR CLARITY, HOWEVER ONLY THE BEAM POINT MAY BE OBSERVED* |
| 3 | | SYSTEM TURNS OFF LIGHTING FIXTURE AND PREPARES TO MOVE TO NEXT UNIT | | *NOTE: LASER BEAM SHOWN FOR CLARITY, HOWEVER ONLY THE BEAM POINT MAY BE OBSERVED* |

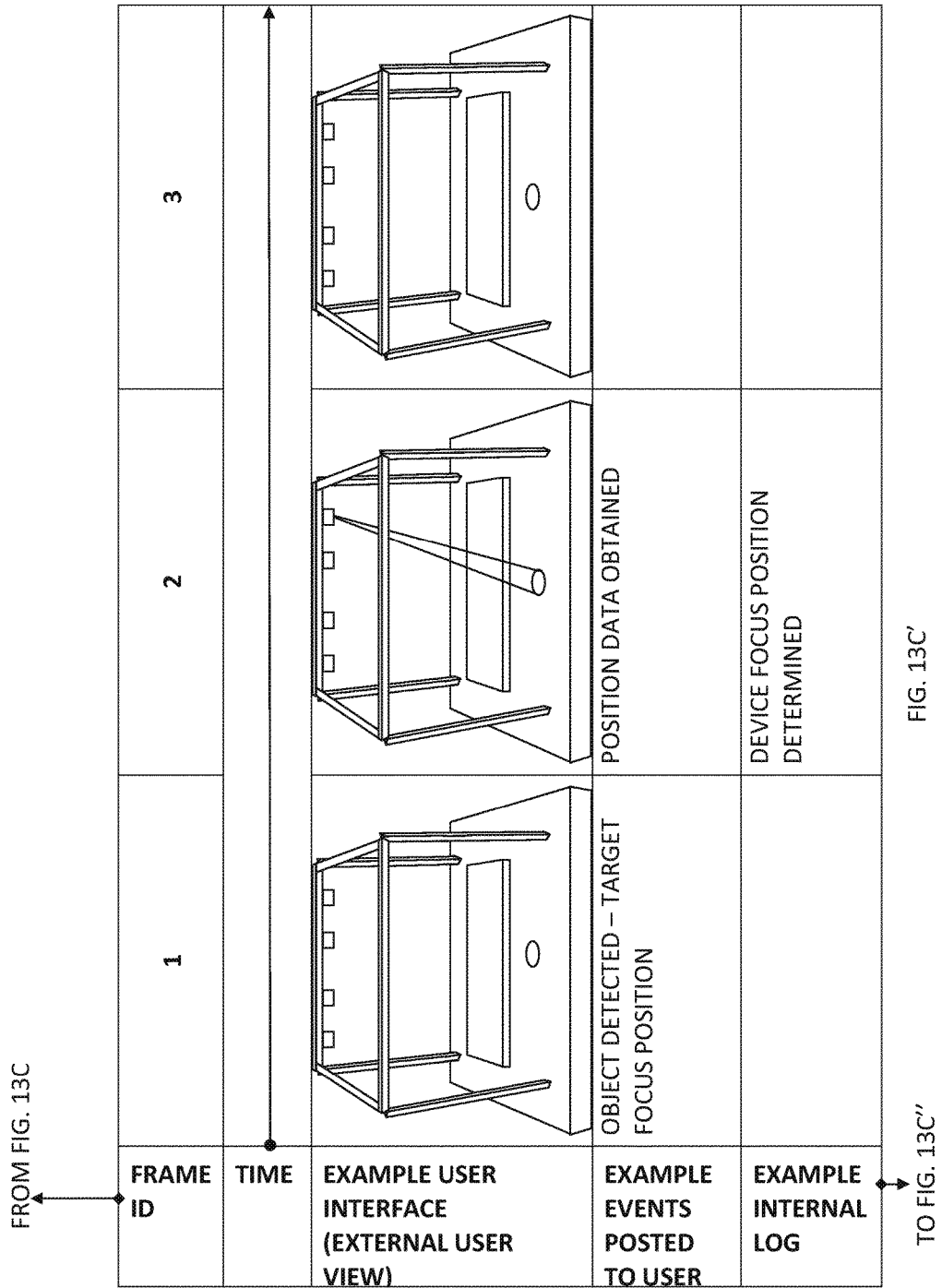

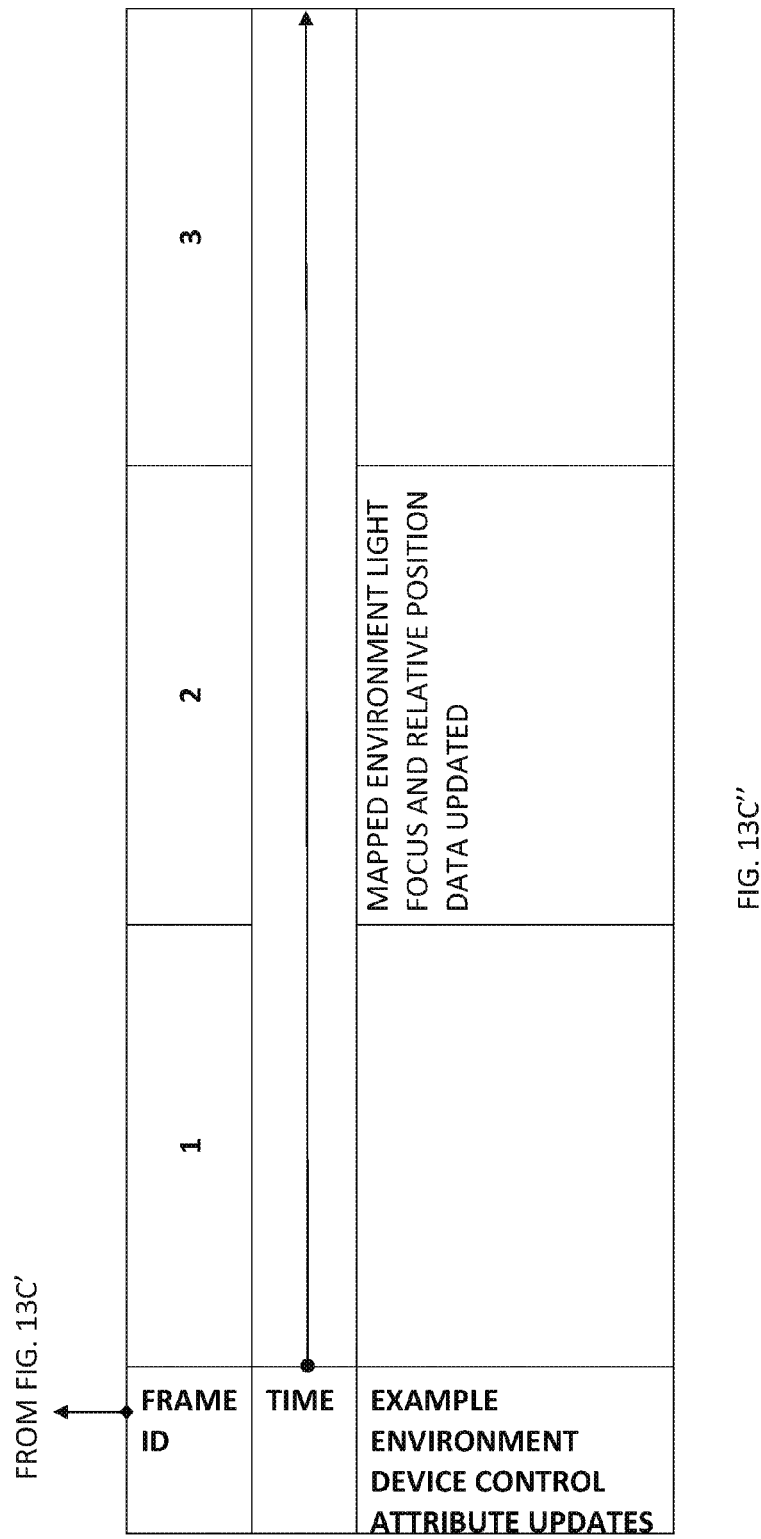

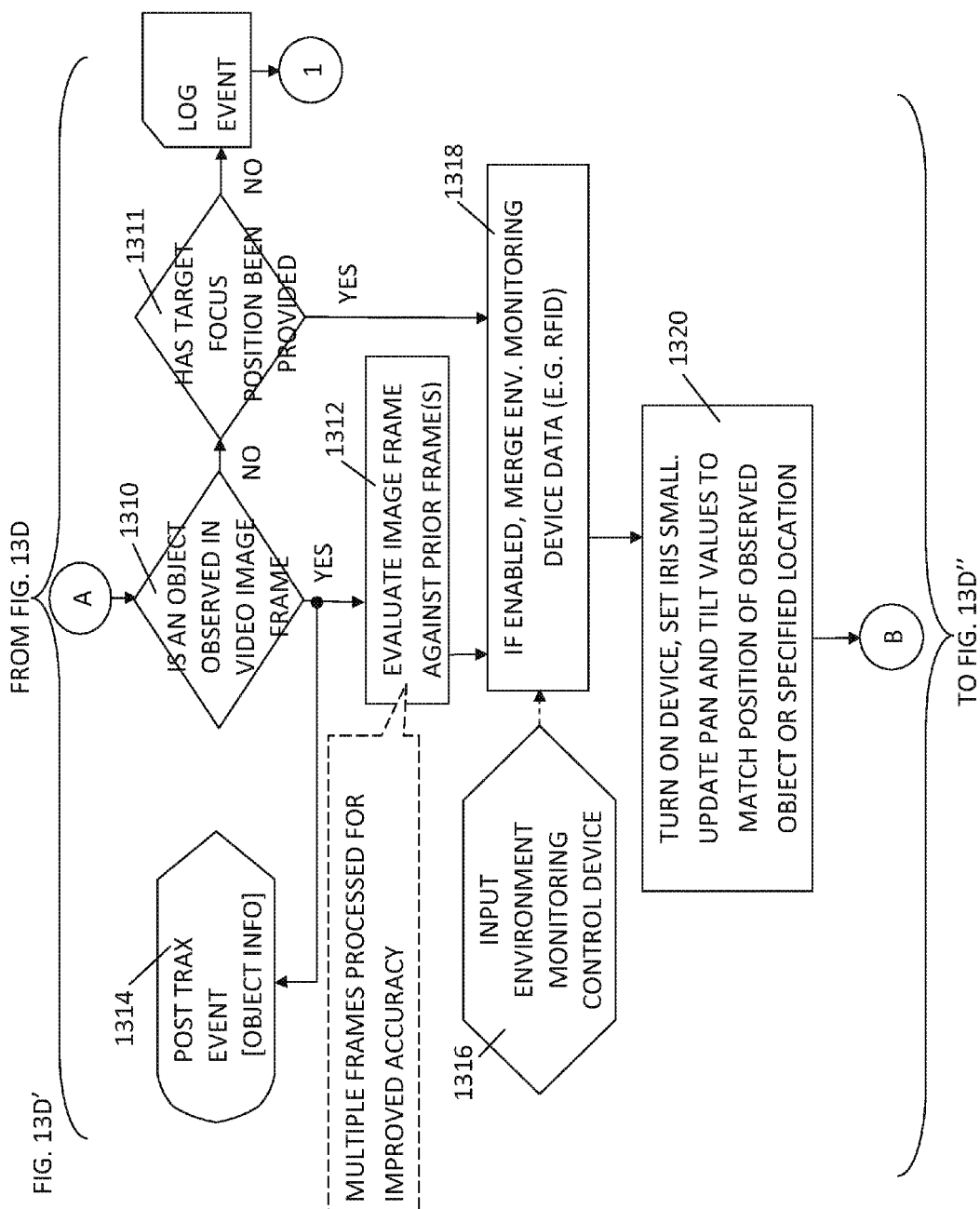

| FRAME ID | TIME | SYSTEM OR USER ACTION | VIDEO FRAME CAPTURE AND PROCESS (INTERNAL VIEW) | EXAMPLE OBJECT ATTRIBUTES OBTAINED |
|---|---|---|---|---|
| 1 | | SYSTEM HAS MAPPED THE OBJECT GESTURE "POINTING" TO REPRESENT A PERSON HOLDING THEIR ARM OUT IN A GIVEN DIRECTION | | *NONE – BASELINE IMAGE* |
| 2 | | | | LOCATION |
| 3 | | THE OBSERVED OBJECT HOLDS THEIR ARM OUT TOWARD THE AUDIENCE | | GESTURE - POINTING |

| FRAME ID | TIME | EXAMPLE INTERNAL LOG | EXAMPLE ENVIRONMENT DEVICE CONTROL ATTRIBUTE UPDATES |
|---|---|---|---|
| 1 | | | |
| 2 | | | |
| 3 | | CRITERIA MET, INITIATE DEVICE ATTRIBUTE UPDATES | MAPPED ENVIRONMENT LIGHT GESTURE ENABLED – SEND PAN, TILT, FOCUS DATA |

FROM FIG. 14A'

FIG. 14A''

| FRAME ID | TIME | VIDEO FRAME CAPTURE AND PROCESS (INTERNAL VIEW) | EXAMPLE OBJECT ATTRIBUTES OBTAINED |
|---|---|---|---|
| 1 | | | *NONE – BASELINE IMAGE* |
| 2 | | | SIZE, LOCATION, COLOR, SHAPE, EDGES |
| 3 | | | TRAJECTORY, MOTION, ANGLE, LOCATION |

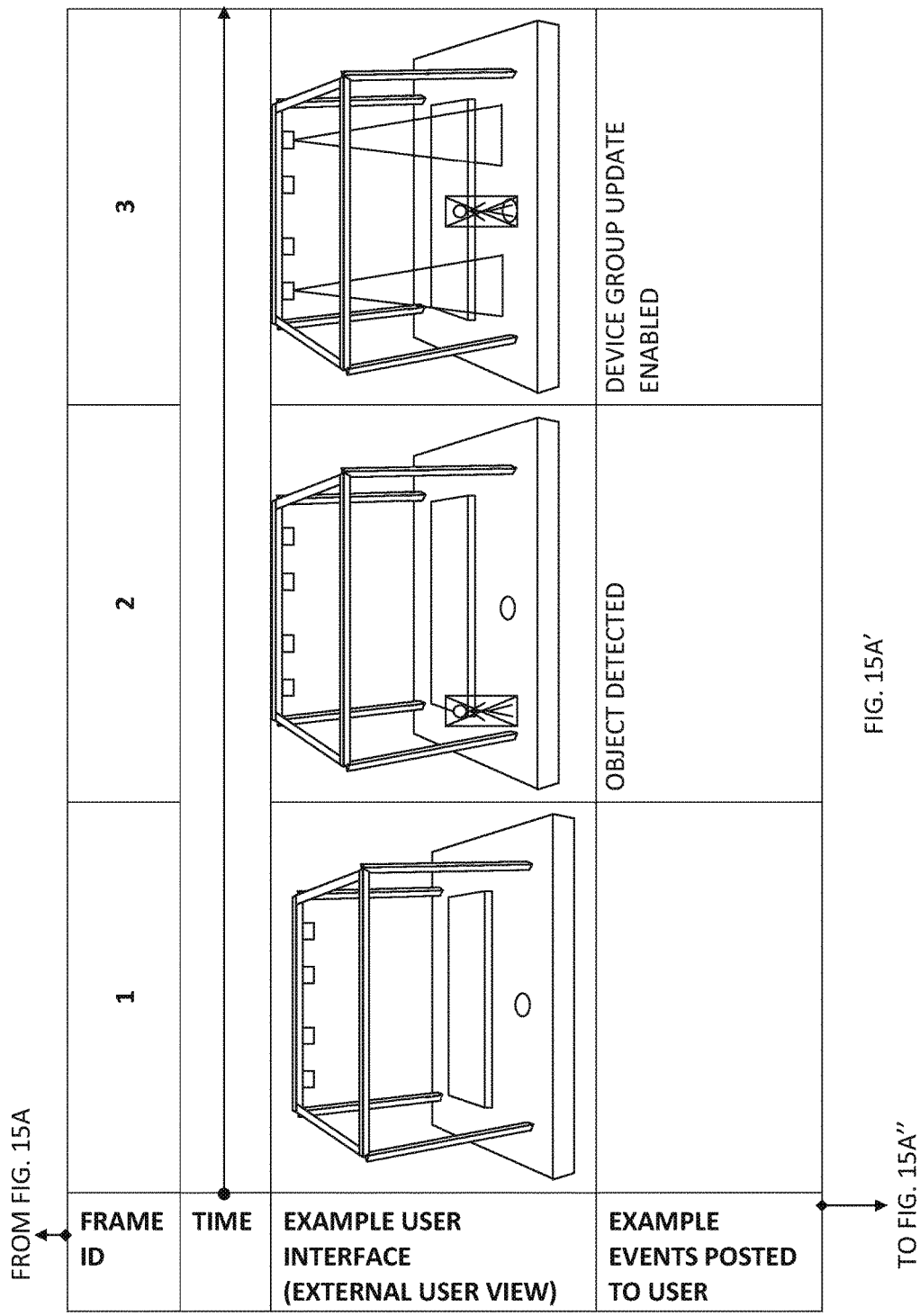

| FRAME ID | TIME | EXAMPLE INTERNAL LOG | EXAMPLE ENVIRONMENT DEVICE CONTROL ATTRIBUTE UPDATES |
|---|---|---|---|
| 1 | | | |
| 2 | | | |
| 3 | | CRITERIA MET, INITIATE DEVICE ATTRIBUTE UPDATES | MAPPED ENVIRONMENT LIGHT GROUP TURNED ON |

FIG. 15A"

| FRAME ID | TIME | VIDEO FRAME CAPTURE AND PROCESS (INTERNAL VIEW) | EXAMPLE OBJECT ATTRIBUTES OBTAINED |
|---|---|---|---|
| 1 | | 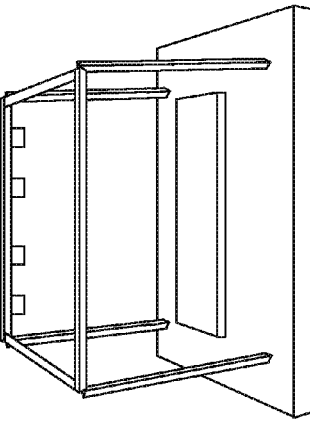 | *NONE – BASELINE IMAGE* |
| 2 | | 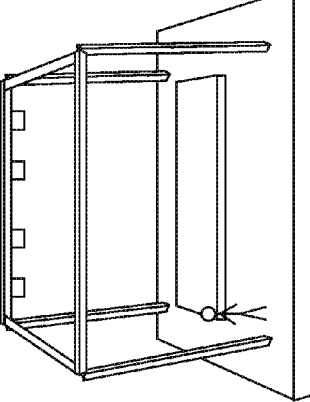 | LOCATION, SIZE, COLOR, SHAPE |
| 3 | | 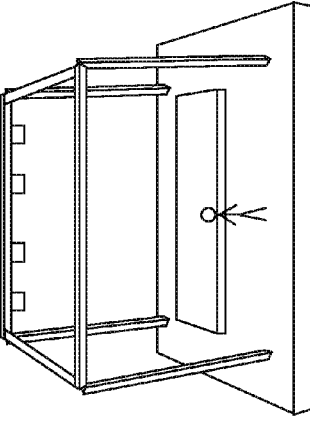 | TRAJECTORY, MOTION, LOCATION |
FIG. 15B
TO FIG. 15B'

| FRAME ID | TIME | EXAMPLE EVENTS POSTED TO USER | EXAMPLE INTERNAL LOG | EXAMPLE ENVIRONMENT DEVICE CONTROL ATTRIBUTE UPDATES |
|---|---|---|---|---|
| 1 | | | | |
| 2 | | OBJECT DETECTED | | |
| 3 | | DEVICE UPDATE ENABLED – OBJECT IN TARGET AREA OR ZONE | CRITERIA MET, INITIATE DEVICE ATTRIBUTE UPDATES | MAPPED ENVIRONMENT LED PANEL ENABLED |

FROM FIG. 15B'

FIG. 15B''

| FRAME ID | TIME | SYSTEM OR USER ACTION | DEFINED ZONE & ID MAPPING |
|---|---|---|---|
| 1 | | USER TURNS ON A LIGHT, SETS THE COLOR, LOCATION, AND SHAPE | |
| 2 | | USER SETS ZONE MAPPING MODE: MIRROR ZONE 1 TO 2 SYSTEM MIRRORS SETTINGS | |
| 3 | | USER SETS ZONE MAPPING MODE: COPY ZONE 1 TO 2 SYSTEM COPIES SETTINGS | |

| FRAME ID | TIME | EXAMPLE INTERNAL LOG | EXAMPLE ENVIRONMENT DEVICE CONTROL ATTRIBUTE UPDATES |
|---|---|---|---|
| 1 | | | |
| 2 | | CRITERIA MET, ZONE MAPPING MODE MIRROR, INITIATE UPDATES | MAPPED ENVIRONMENT POSITION ATTRIBUTES MIRROR, OTHER ATTRIBUTES COPIED |
| 3 | | CRITERIA MET, ZONE MAPPING MODE COPY, INITIATE UPDATES | MAPPED ENVIRONMENT ATTRIBUTES COPIED |

FIG. 15C'''

| FRAME ID | TIME | SYSTEM OR USER ACTION | VIDEO FRAME CAPTURE AND PROCESS (INTERNAL VIEW) | EXAMPLE OBJECT ATTRIBUTES OBTAINED |
|---|---|---|---|---|
| 1 | | | | *NONE – BASELINE IMAGE* |
| 2 | | USER DEFINES TRIP LINE LOCATION AND MAPS TO DEVICE ALARM ATTRIBUTE | | *SIZE, SHAPE, LOCATION* |
| 3 | | | | *TRAJECTORY, MOTION, LOCATION* |

| FRAME ID | TIME | EXAMPLE INTERNAL LOG | EXAMPLE ENVIRONMENT DEVICE CONTROL ATTRIBUTE UPDATES |
|---|---|---|---|
| 1 | | | |
| 2 | | | |
| 3 | | CRITERIA MET, INITIATE DEVICE ATTRIBUTE UPDATES | MAPPED ENVIRONMENT TRIP LINE ALARM ENABLED |

FROM FIG. 15D'

FIG. 15D''

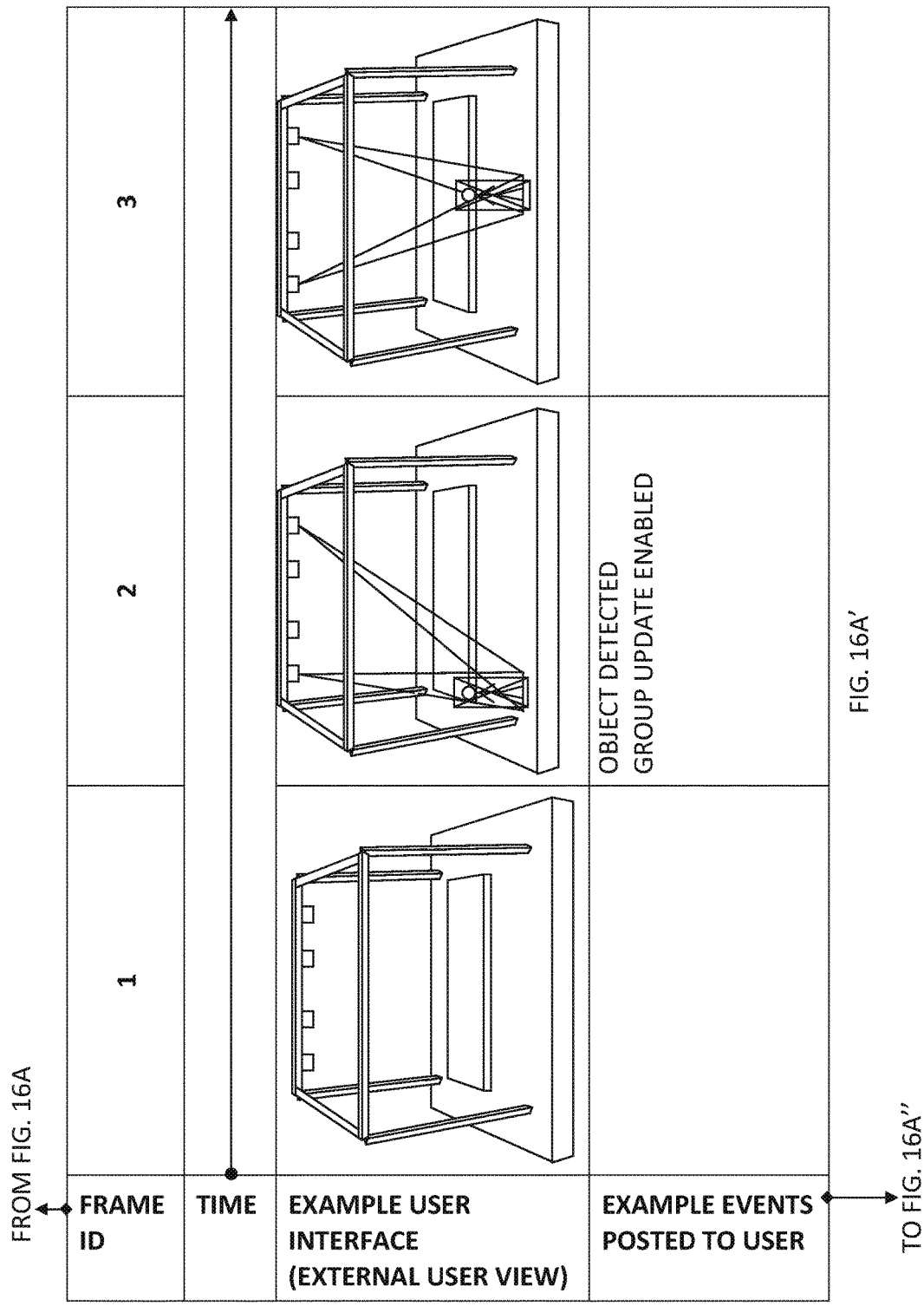

| FRAME ID | TIME | EXAMPLE INTERNAL LOG | EXAMPLE ENVIRONMENT DEVICE CONTROL ATTRIBUTE UPDATES |
|---|---|---|---|
| 1 | | | |
| 2 | | CRITERIA MET, INITIATE DEVICE ATTRIBUTE UPDATES | MAPPED ENVIRONMENT LIGHT GROUP TRACKING ENABLED – SEND PAN, TILT, FOCUS DATA |
| 3 | | | MAPPED ENVIRONMENT LIGHT GROUP TRACKING ENABLED – SEND PAN, TILT, FOCUS DATA |

FIG. 16A″

| FRAME ID | TIME | SYSTEM OR USER ACTION | VIDEO FRAME CAPTURE AND PROCESS (INTERNAL VIEW) | EXAMPLE OBJECT ATTRIBUTES OBTAINED |
|---|---|---|---|---|
| 1 | | USER PLACES SCENERY IN ENVIRONMENT | 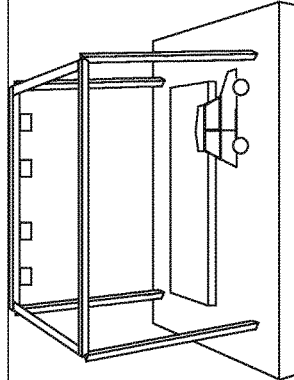 | NONE – BASELINE IMAGE |
| 2 | | USER CIRCLES CAR SCENERY WITH A LASER POINTER | 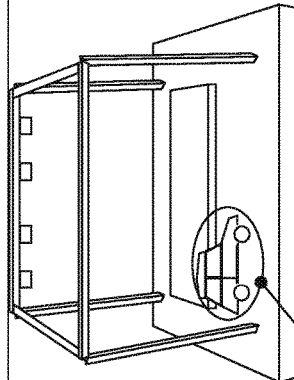 | LOCATION, SIZE, COLOR, EDGES<br><br>NOTE: LASER BEAM SHOWN FOR CLARITY, HOWEVER ONLY THE BEAM POINT MAY BE OBSERVED – SHOWING COMPLETED CIRCLE |
| 3 | | | 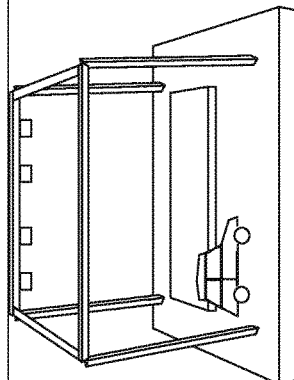 | TRAJECTORY, MOTION |

FIG. 16B

| FRAME ID | TIME | EXAMPLE INTERNAL LOG | EXAMPLE ENVIRONMENT DEVICE CONTROL ATTRIBUTE UPDATES |
|---|---|---|---|
| 1 | | | |
| 2 | | CRITERIA MET, INITIATE DEVICE ATTRIBUTE UPDATES | MAPPED ENVIRONMENT LIGHT FOCUS DATA UPDATED (E.G. PAN, TILT) |
| 3 | | | MAPPED ENVIRONMENT LIGHT FOCUS DATA UPDATED (E.G. PAN, TILT) |

FROM FIG. 16B'

FIG. 16B"

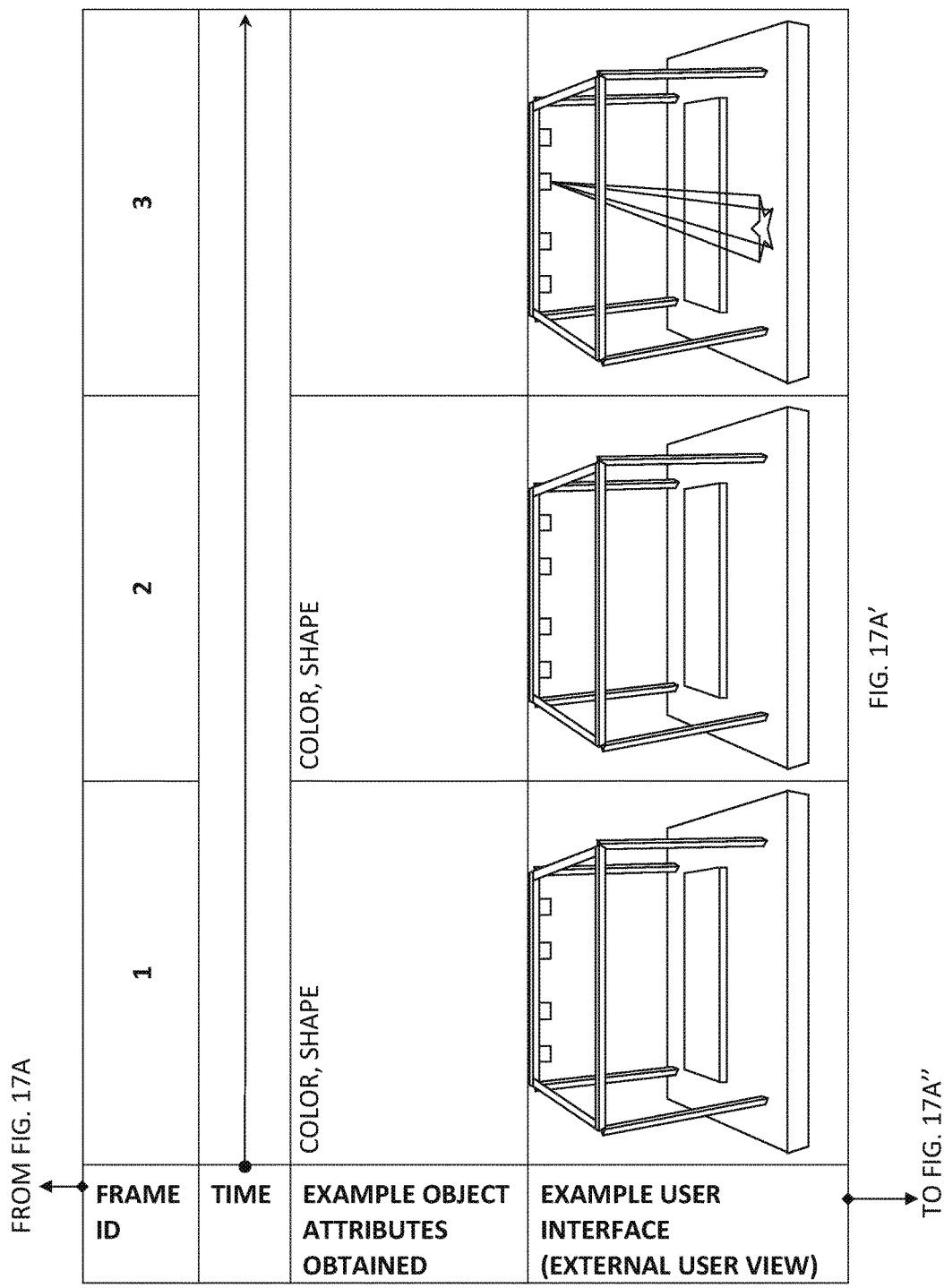

| FRAME ID | TIME | EXAMPLE EVENTS POSTED TO USER | EXAMPLE INTERNAL LOG | EXAMPLE ENVIRONMENT DEVICE CONTROL ATTRIBUTE UPDATES |
|---|---|---|---|---|
| 1 | | | | |
| 2 | | OBJECT DETECTED WITH SUCCESSFUL COMPARE | | |
| 3 | | DEVICE UPDATE ENABLED | CRITERIA MET, INITIATE DEVICE ATTRIBUTE UPDATES | MAPPED ENVIRONMENT LIGHT SHAPE AND COLOR SET |

FIG. 17A″

| FRAME ID | 1 | 2 | 3 |
|---|---|---|---|
| TIME | ●————————————————————————————————————▶ | | |
| SYSTEM OR USER ACTION | USER SHOWS A CARD WITH A STAR ON IT TO A CAMERA | USER BEGINS TO ROTATE THE CARD | USER CONTINUES TO ROTATE THE CARD |
| PROCESS IMAGE FROM: VIDEO FRAME, CAMERA, OR A DATABASE (INTERNAL VIEW) | 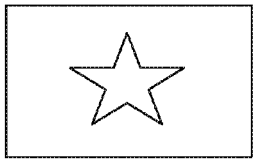 | 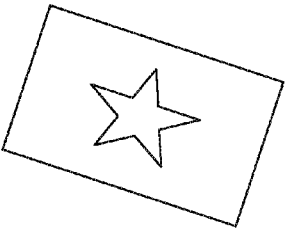 | 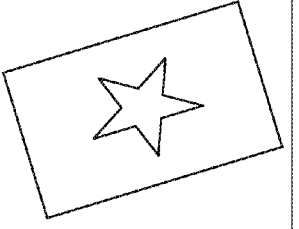 |
| EXAMPLE OBJECT ATTRIBUTES OBTAINED | | COLOR, SHAPE, TEXTURE | COLOR, SHAPE, TEXTURE |
| EXAMPLE USER INTERFACE (EXTERNAL USER VIEW) | *NOT APPLICABLE* | *NOT APPLICABLE* | *NOT APPLICABLE* |

FROM FIG. 17B

| FRAME ID | 1 | 2 | 3 |
|---|---|---|---|
| TIME | ← | | → |
| EXAMPLE EVENTS POSTED TO USER | | OBJECT DETECTED | IMAGE CONFIGURED AS BASELINE |
| EXAMPLE INTERNAL LOG | | | |
| EXAMPLE ENVIRONMENT DEVICE CONTROL ATTRIBUTE UPDATES | | | |

FIG. 17B'

| FRAME ID | TIME | SYSTEM OR USER ACTION | PROCESS IMAGE FROM: VIDEO FRAME, CAMERA, OR A DATABASE (INTERNAL VIEW) | EXAMPLE OBJECT ATTRIBUTES OBTAINED |
|---|---|---|---|---|
| 1 | | SYSTEM SETS A PATTERN AND COLOR ON A LIGHT FIXTURE AND TURNS IT ON | 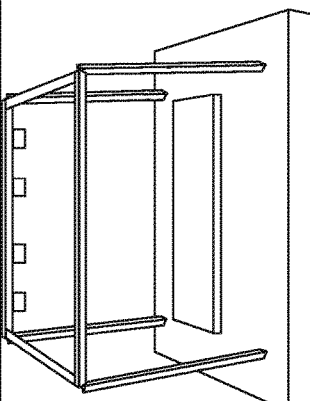 | COLOR, SHAPE |
| 2 | | | 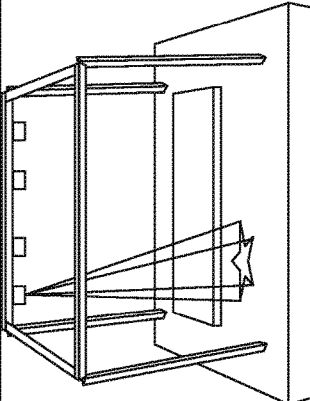 | COLOR, SHAPE |
| 3 | | SYSTEM TURNS OFF LIGHT FIXTURE | 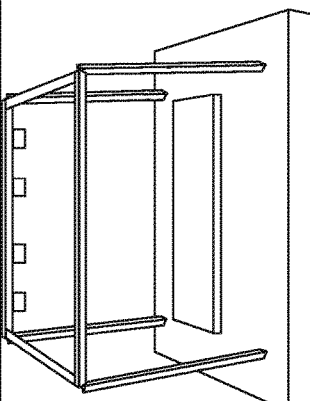 | |
→ TO FIG. 17C'
FIG. 17C

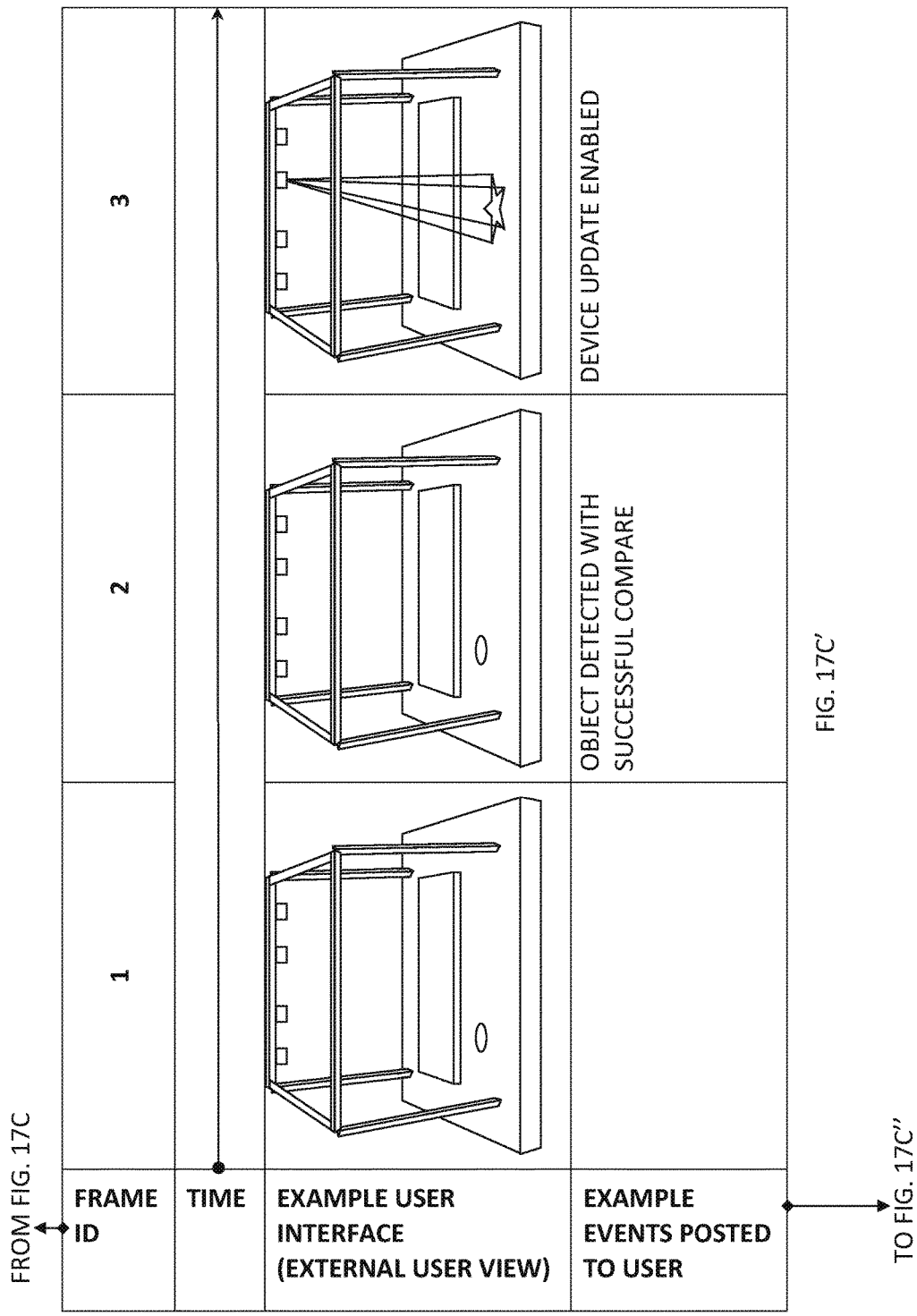

| FRAME ID | TIME | EXAMPLE INTERNAL LOG | EXAMPLE ENVIRONMENT DEVICE CONTROL ATTRIBUTE UPDATES |
|---|---|---|---|
| 1 | | | |
| 2 | | | |
| 3 | | CRITERIA MET, INITIATE DEVICE ATTRIBUTE UPDATES | MAPPED ENVIRONMENT LIGHT SHAPE AND COLOR SET |

FIG. 17C''

FROM FIG. 17C'

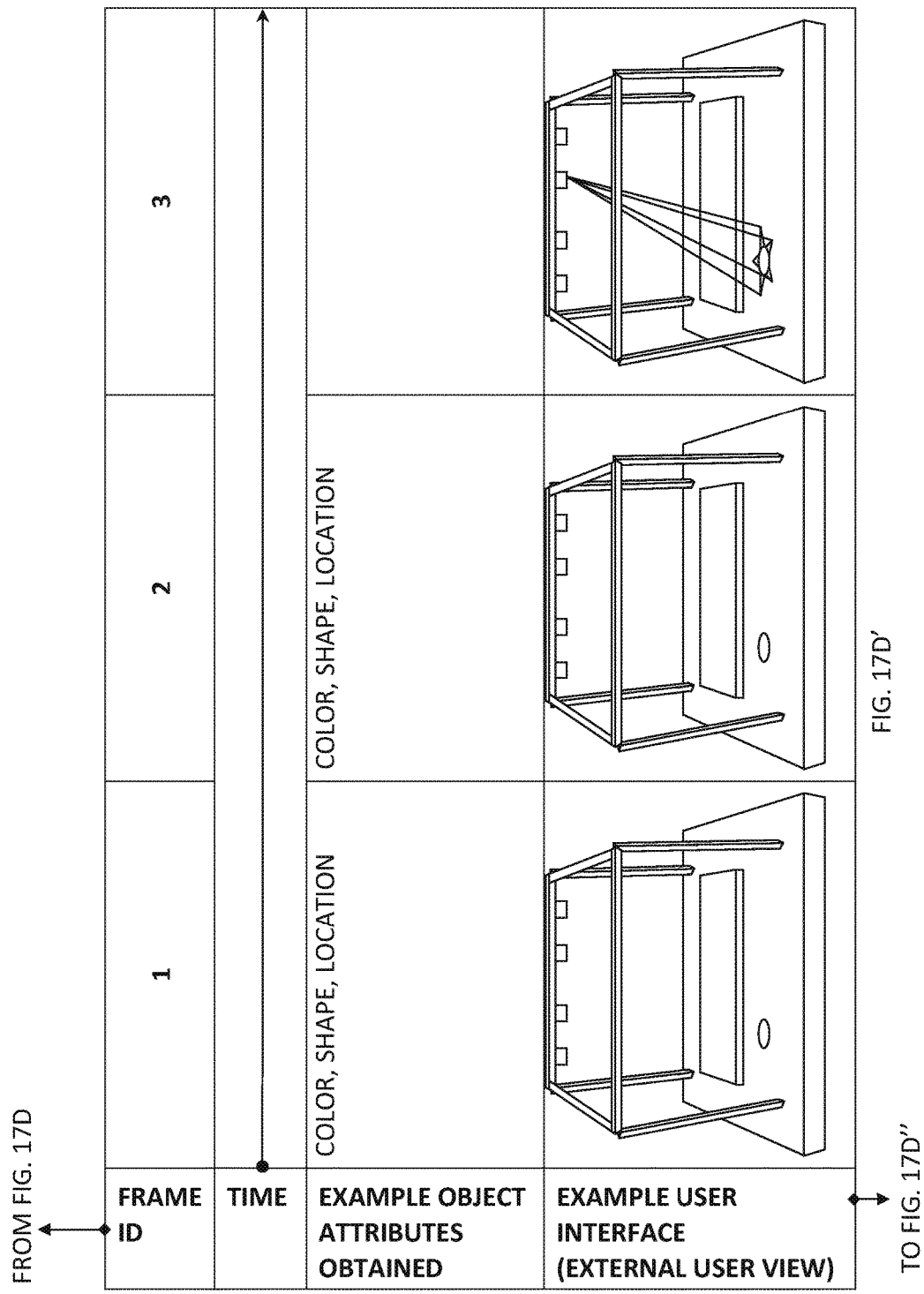

| FRAME ID | TIME | EXAMPLE EVENTS POSTED TO USER | EXAMPLE INTERNAL LOG | EXAMPLE ENVIRONMENT DEVICE CONTROL ATTRIBUTE UPDATES |
|---|---|---|---|---|
| 1 | | | | |
| 2 | | OBJECT DETECTED WITH SUCCESSFUL COMPARE | | |
| 3 | | DEVICE UPDATE ENABLED | CRITERIA MET, INITIATE DEVICE ATTRIBUTE UPDATES | MAPPED ENVIRONMENT LIGHT SHAPE, COLOR, AND POSITION SET |

FIG. 17D''

| FRAME ID | TIME | SYSTEM OR USER ACTION | PROCESS IMAGE FROM: VIDEO FRAME, CAMERA, OR A DATABASE (INTERNAL VIEW) |
|---|---|---|---|
| 1 | | SYSTEM SETS A PATTERN AND COLOR ON A LIGHT FIXTURE AND TURNS IT ON | |
| 2 | | | |
| 3 | | SYSTEM TURNS OFF LIGHT FIXTURE | |

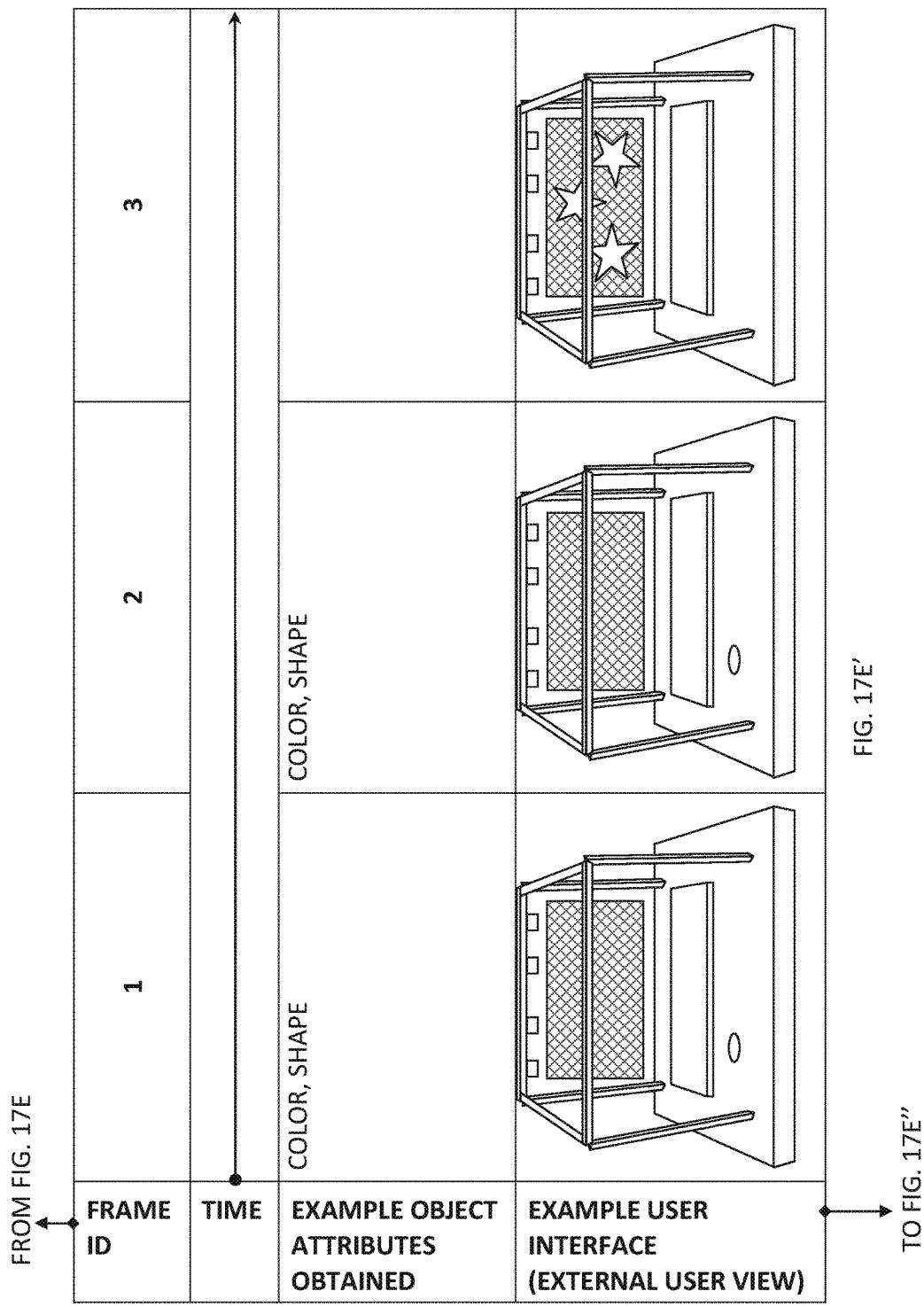

| FRAME ID | TIME | EXAMPLE EVENTS POSTED TO USER | EXAMPLE INTERNAL LOG | EXAMPLE ENVIRONMENT DEVICE CONTROL ATTRIBUTE UPDATES |
|---|---|---|---|---|
| 1 | | | | |
| 2 | | OBJECT DETECTED WITH SUCCESSFUL COMPARE | | |
| 3 | | DEVICE UPDATE ENABLED | CRITERIA MET, INITIATE DEVICE ATTRIBUTE UPDATES | MAPPED ENVIRONMENT LED VIDEO PANEL LAYER SHAPE AND COLOR SET |

FIG. 17E″

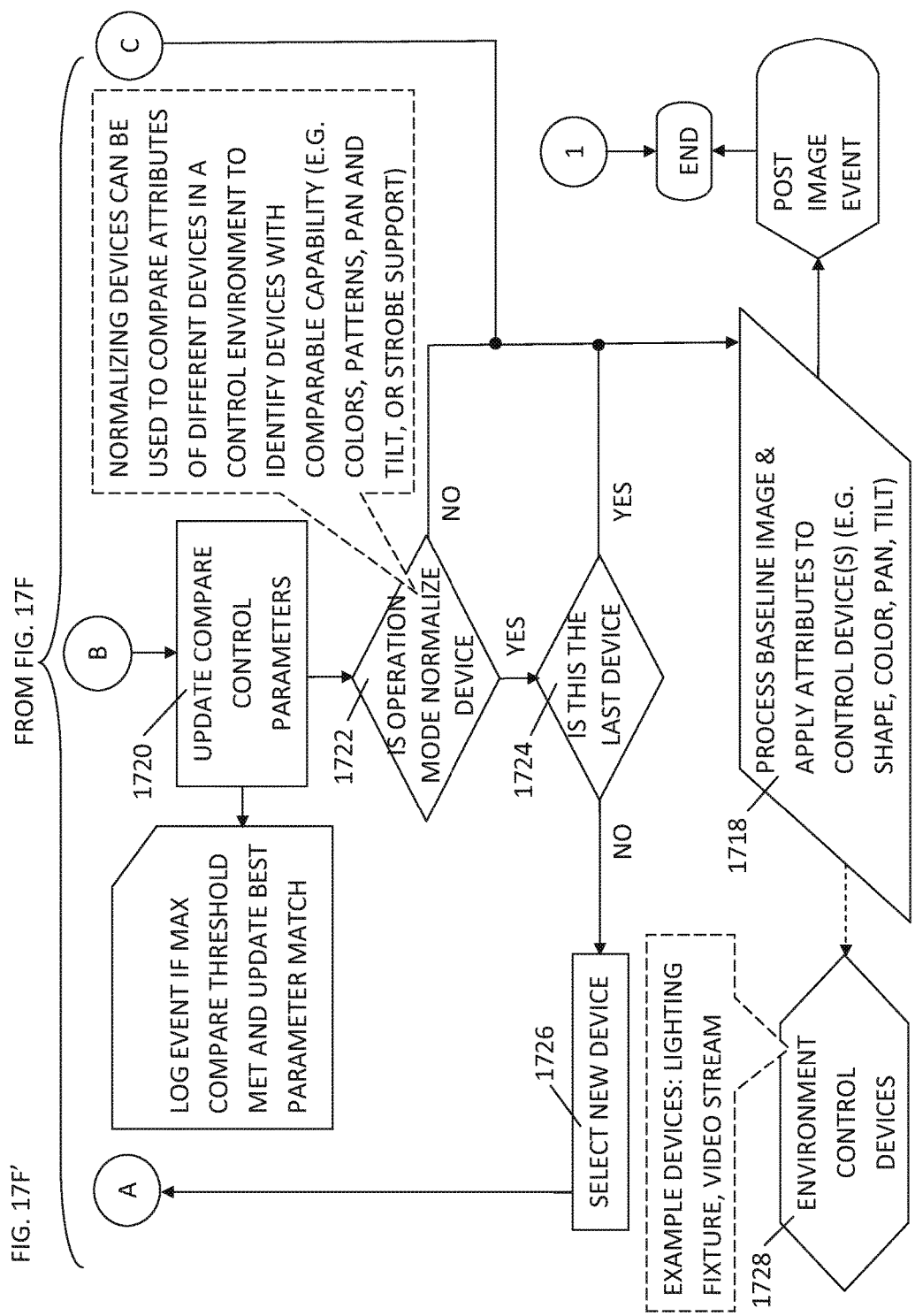

| TIME | SYSTEM OR USER ACTION | GRAMMAR CHECK | EXAMPLE USER INTERFACE (EXTERNAL USER VIEW) |
|---|---|---|---|
| | USER SAYS "TURN ON MARTIN MACS" | ACTION TOKEN: "ON" DEVICE TOKEN: "MARTIN MACS" | |
| | USER SAYS "CENTERSTAGE" | DETAIL TOKEN: "CENTERSTAGE" DEVICE TOKEN: *DEFAULT* | |
| | USER SAYS "TURN LIGHTS OFF" | ACTION TOKEN: "OFF" DEVICE TOKEN: *DEFAULT* | |

| TIME | EXAMPLE EVENTS POSTED TO USER | EXAMPLE INTERNAL LOG | EXAMPLE ENVIRONMENT DEVICE CONTROL ATTRIBUTE UPDATES |
|---|---|---|---|
| | VOICE ACTIVATION, MARTIN MACS ON | DEFAULT VOICE COMMAND DEVICE SET TO MARTIN MACS | MARTIN MACS SHUTTER OR IRIS SET TO OPEN |
| | VOICE ACTIVATION, MARTIN MACS CENTERSTAGE | | LIGHT PAN AND TILT VALUES UPDATED ON MARTIN MACS |
| | VOICE ACTIVATION, MARTIN MACS OFF | | MARTIN MACS SHUTTER OR IRIS SET TO CLOSE |

FIG. 18A'

| TIME | SYSTEM OR USER ACTION | GRAMMAR CHECK | EXAMPLE USER INTERFACE (EXTERNAL USER VIEW) |
|---|---|---|---|
| ↑ | USER SAYS "TURN ON MARTIN MACS" | ACTION TOKEN: "ON" DEVICE TOKEN: "MARTIN MACS" | 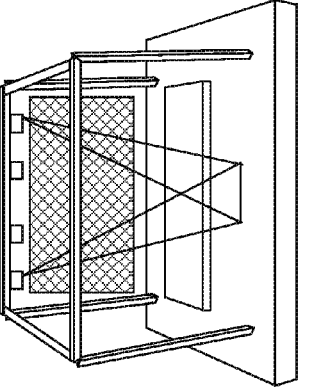 |
| | USER SAYS "CENTERSTAGE", THEN "TURN ON VL1000S", THEN "TURN ON VIDEO LAYER 1" | DETAIL TOKEN: "CENTERSTAGE" DEVICE TOKEN: *DEFAULT* <br><br>ACTION TOKEN: "ON" DEVICE TOKEN: "VL1000S" <br><br>ACTION TOKEN: "ON" DEVICE TOKEN: "VIDEO" DETAIL TOKEN: "LAYER 1" | 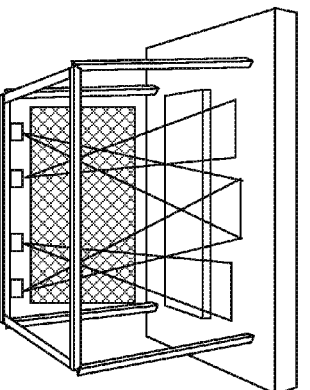 |
| | USER SAYS "TURN LIGHTS OFF" | ACTION TOKEN: "OFF" DEVICE TOKEN: *DEFAULT* | 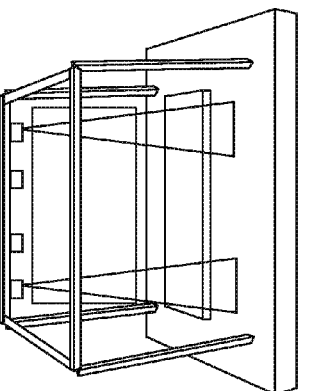 |

| TIME | EXAMPLE EVENTS POSTED TO USER | EXAMPLE INTERNAL LOG | EXAMPLE ENVIRONMENT DEVICE CONTROL ATTRIBUTE UPDATES |
|---|---|---|---|
| | VOICE ACTIVATION, MARTIN MACS ON | DEFAULT VOICE COMMAND DEVICE SET TO MARTIN MACS | MARTIN MACS SHUTTER OR IRIS SET TO OPEN |
| | VOICE ACTIVATION, MARTIN MACS CENTERSTAGE<br><br>VOICE ACTIVATION, VL1000S ON<br><br>VOICE ACTIVATION, VIDEO ON LAYER 1 | DEFAULT VOICE COMMAND DEVICE SET TO VL1000S<br><br>DEFAULT VOICE COMMAND VIDEO DEVICE SET TO LAYER 1 | LIGHT PAN AND TILT VALUES UPDATED ON MARTIN MACS<br><br>VL1000S SHUTTER OR IRIS SET TO OPEN<br><br>VIDEO LAYER 1 STREAM ON |
| | VOICE ACTIVATION, VL1000S OFF | | VL1000S SHUTTER OR IRIS SET TO CLOSE |

FROM FIG. 18C

FIG. 18C'

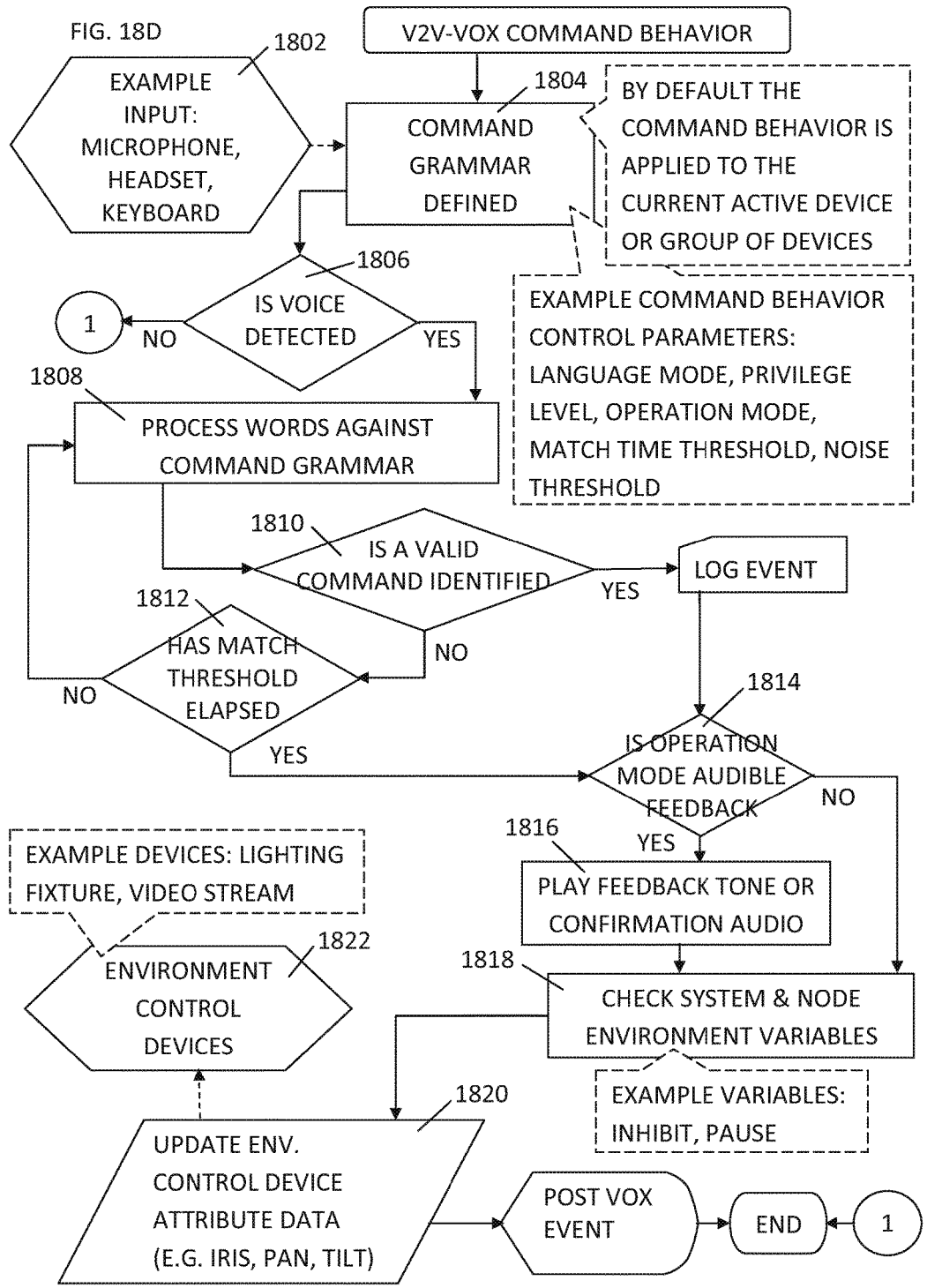

| FRAME ID | TIME | SYSTEM OR USER ACTION | VIDEO FRAME CAPTURE AND PROCESS (INTERNAL VIEW) | EXAMPLE OBJECT ATTRIBUTES OBTAINED |
|---|---|---|---|---|
| 1 OF 6 | | USER DEFINES FOUR CORNER LOCATIONS (CONTROL PARAMETERS: SHAPE IS SQUARE, PLANE IS X-Y) | | NONE – BASELINE IMAGE |
| 2 OF 6 | | USER TRIGGERS 2D INIT SEQUENCE FOR ONE FIXTURE / SYSTEM TURNS ON THE FIXTURE | | SIZE, SHAPE, LOCATION |
| 3 OF 6 | | SYSTEM UPDATES PAN AND TILT VALUES TO MOVE FIXTURE BEAM OVER FIRST CORNER | | MOTION, LOCATION |

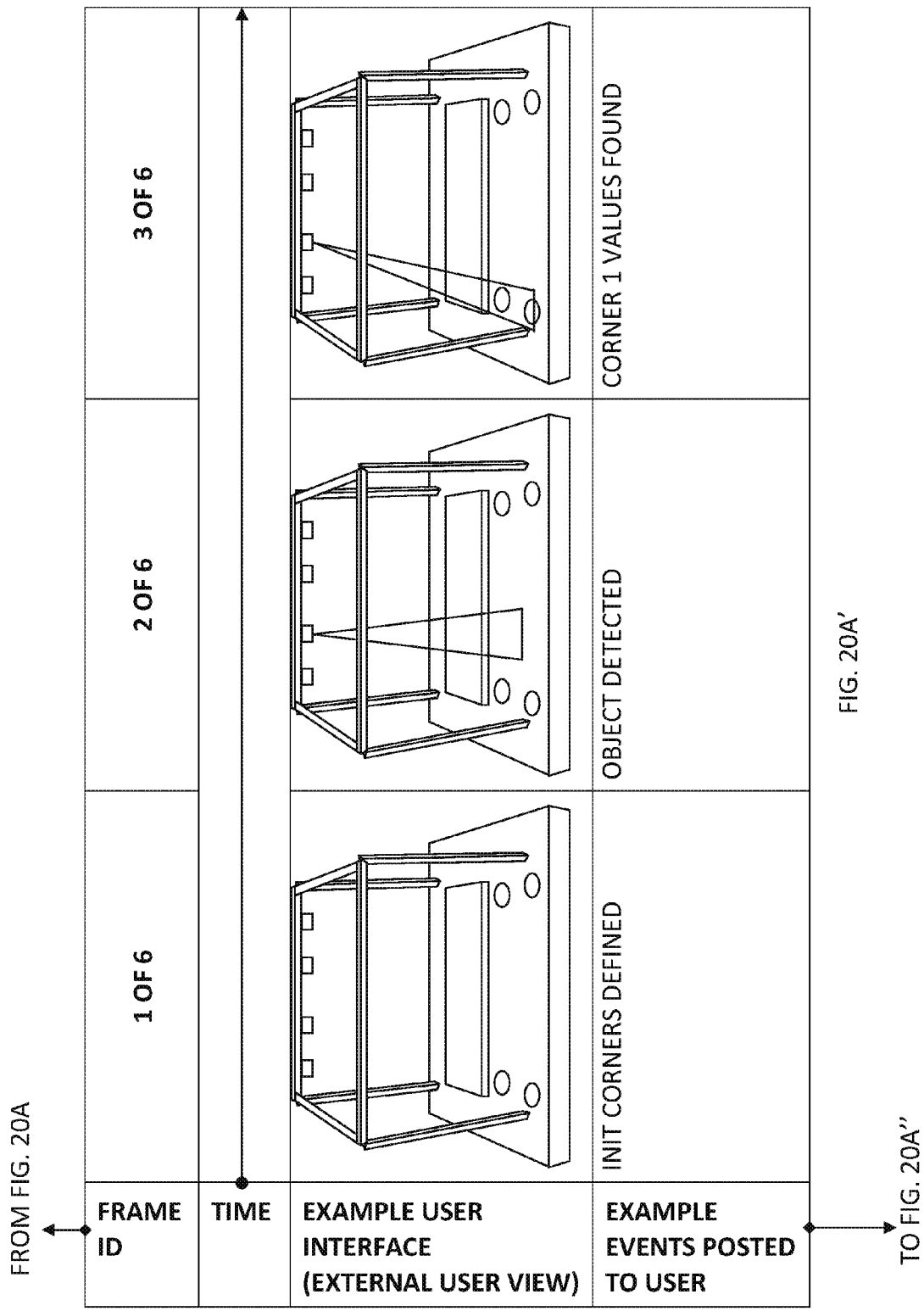

| FRAME ID | TIME | EXAMPLE INTERNAL LOG | EXAMPLE ENVIRONMENT DEVICE CONTROL ATTRIBUTE UPDATES |
|---|---|---|---|
| 1 OF 6 | | | |
| 2 OF 6 | | | |
| 3 OF 6 | | INCREASE PAN AND TILT | MAPPED LIGHT PAN AND TILT FOR CORNER 1 |

FIG. 20A″

| FRAME ID | TIME | SYSTEM OR USER ACTION | VIDEO FRAME CAPTURE AND PROCESS (INTERNAL VIEW) | EXAMPLE OBJECT ATTRIBUTES OBTAINED |
|---|---|---|---|---|
| 4 OF 6 | | SYSTEM UPDATES FIXTURE PAN AND TILT VALUES TO MOVE FIXTURE BEAM OVER SECOND CORNER | | MOTION, LOCATION |
| 5 OF 6 | | SYSTEM UPDATES FIXTURE PAN AND TILT VALUES TO MOVE FIXTURE BEAM OVER THIRD CORNER | | MOTION, LOCATION |
| 6 OF 6 | | SYSTEM UPDATES FIXTURE PAN AND TILT VALUES TO MOVE FIXTURE BEAM OVER FOURTH CORNER | | MOTION, LOCATION |

FIG. 20B

| FRAME ID | TIME | EXAMPLE INTERNAL LOG | EXAMPLE ENVIRONMENT DEVICE CONTROL ATTRIBUTE UPDATES |
|---|---|---|---|
| 4 OF 6 | | INCREASE PAN AND TILT | MAPPED LIGHT PAN AND TILT FOR CORNER 2 |
| 5 OF 6 | | INCREASE PAN AND TILT | MAPPED LIGHT PAN AND TILT FOR CORNER 3 |
| 6 OF 6 | | INCREASE PAN AND TILT | MAPPED LIGHT PAN AND TILT FOR CORNER 4 |

FIG. 20B''

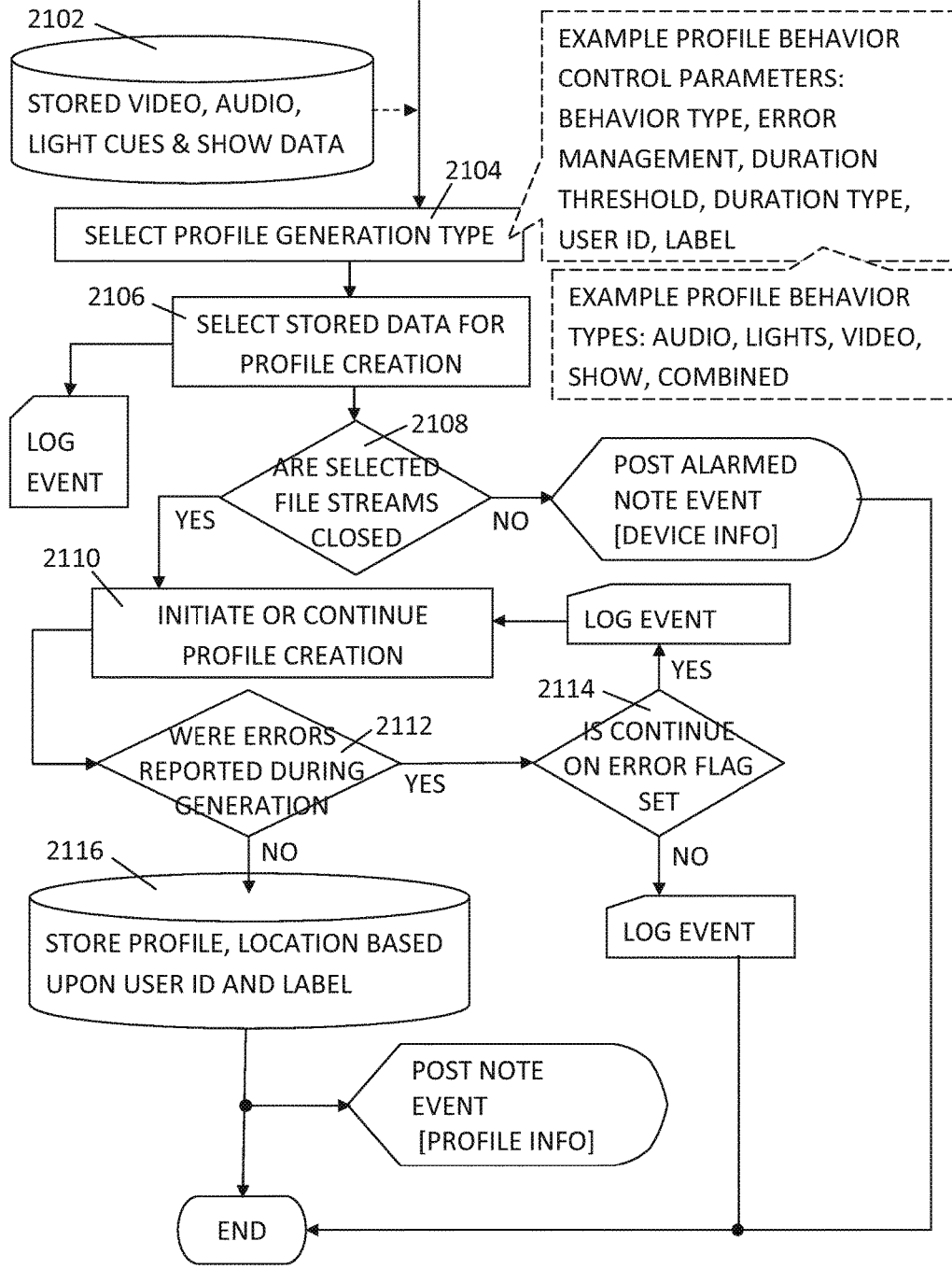

VISION-2-VISION CONTROL SYSTEM

CROSS-REFERENCE TO RELATED APPLICATIONS

This application is a continuation of U.S. patent application Ser. No. 13/088,036, filed Apr. 15, 2011, now U.S. Pat. No. 8,917,905, issued on Dec. 23, 2014, entitled VISION-2-VISION CONTROL SYSTEM which claims benefit of U.S. Provisional Application No. 61/324,443, filed Apr. 15, 2010, entitled VISION-2-VISION CONTROL SYSTEM, the specifications of which are incorporated by reference herein in their entirety.

TECHNICAL FIELD

Embodiments of the invention are related in general to controlling output devices within an entertainment environment, and more particularly to controlling output devices based upon the detection of objects in the entertainment environment.

BACKGROUND

Modern stage lighting is a flexible tool in the production of theatre, dance, opera and other performance arts. Several different types of stage lighting instruments are used in the pursuit of the various principles or goals of lighting. Stage lighting has grown considerably in recent years partially due to improved technical equipment. Lighting control tools allow a user to change the quality of the lighting. Historically, this has been done by the use of intensity control. Technological advancements have made intensity control relatively simple—solid state dimmers are controlled by one or more lighting controllers. Controllers are commonly lighting consoles designed for sophisticated control over very large numbers of dimmers or luminaires, but may be simpler devices which play back stored sequences of lighting states with minimal user interfaces. Consoles are also referred to as lighting desks or light-boards. For larger shows or installations, multiple consoles are often used together and in some cases lighting controllers are combined or coordinated with controllers for sound, automated scenery, pyrotechnics and other effects to provide total automation of the entire show. DMX512 is the control protocol most prevalent in the industry. Newer control protocols include RDM (remote device management) which adds management and status feedback capabilities to devices which use it while maintaining compatibility with DMX512, ArtNet which is an implementation of DMX over Ethernet, and Architecture for Control Networks (ACN) which is a fully featured multiple controller networking protocol. These allow the possibility of feedback of position, state or fault conditions from units, whilst allowing much more detailed control of them.

SUMMARY

A method for controlling an object space having an associated object environment includes the steps of, defining a target set of coordinates in the object space, recognizing the presence of a predetermined object in the object space, and determining a coordinate location of the recognized predetermined object in the object space. The method further includes determining the spatial relationship between the recognized predetermined object and the target set of coordinates, comparing the spatial relationship with predetermined spatial relationship criteria, and if the determined spatial relationship criteria falls within the predetermined spatial relationship criteria, modifying the object space environment.

A system for controlling an object space having an associated object environment includes at least one processor configured to receive a definition of a target set of coordinates in the object space, recognize the presence of a predetermined object in the object space, and determine a coordinate location of the recognized predetermined object in the object space. The at least one processor is further configured to determine the spatial relationship between the recognized predetermined object and the target set of coordinates, compare the spatial relationship with predetermined spatial relationship criteria, and if the determined spatial relationship criteria falls within the predetermined spatial relationship criteria, modify the object space environment.

BRIEF DESCRIPTION OF THE DRAWINGS

For a more complete understanding, reference is now made to the following description taken in conjunction with the accompanying Drawings in which:

FIG. 10 illustrates an embodiment of an example of a 4×4 LED panel matrix under control of the V2V-SYNC software components;

FIGS. 15a-15a" illustrate an example sequence of a proximity behavior function of the V2V-TRAX software module where an environment light fixture groups' attributes are controlled by the relationship between an object and predefined location;

FIG. 21 illustrates an embodiment of a procedure for a profile behavior function of the V2V-NOTE software component.

DETAILED DESCRIPTION

Figure 1:
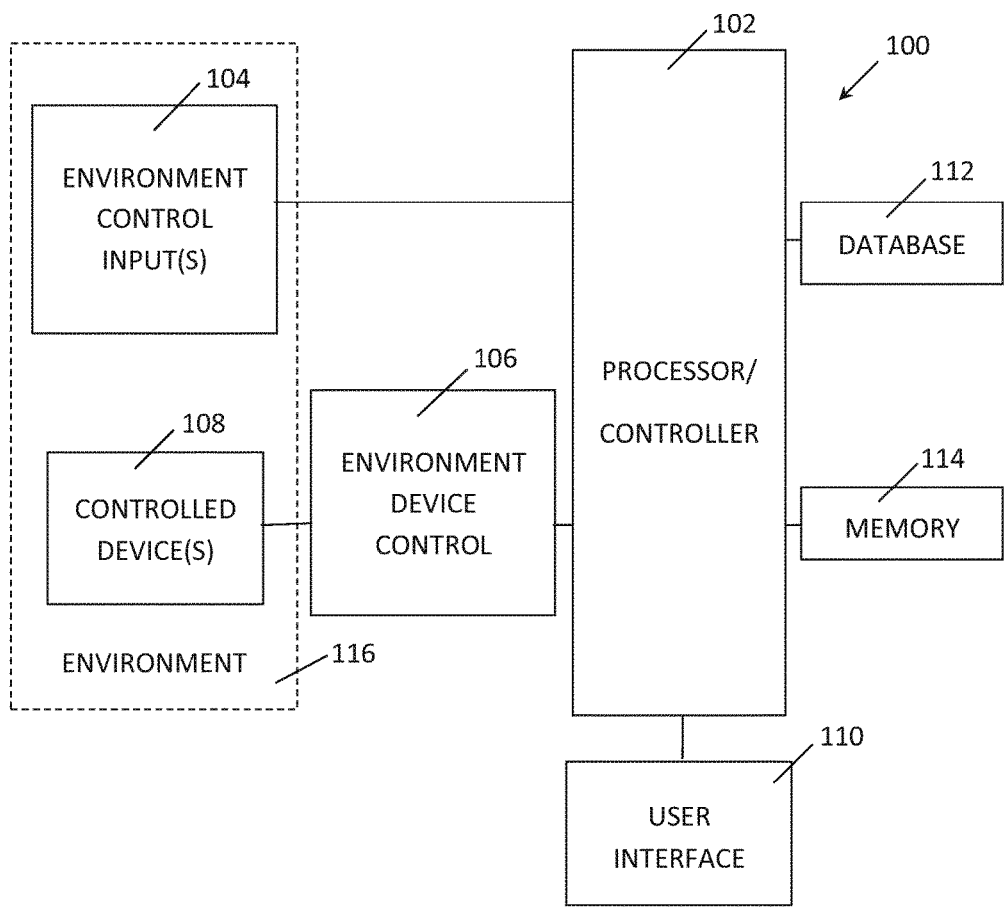
FIG. 1 illustrates an embodiment of a system block diagram for a control system.

Referring now to the drawings, wherein like reference numbers are used herein to designate like elements throughout, the various views and embodiments of a Vision-2-Vision (V2V) control system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Various embodiments describe a control system for an entertainment venue, which provides for the capability of an operator to control devices such as lighting, video and audio within an entertainment environment in response to environmental control inputs such as a video image captured from the observed environment, audio from the observed environment, or other control devices or sensors within the observed environment such as an Inertial Measurement Unit [IMU], Radio Frequency Identification [RFID], temperature, or pressure sensor. In particular embodiments, the control system can track objects within the environment and trigger events based on motion or position of the object in order to control a device such as a stage light, a video board, an audio output or any other output device within the environment.

FIG. 1 illustrates an embodiment of a system block diagram for a control system. The control system 100 includes a processor/controller subsystem 102, an environment control input subsystem 104, an environment device control subsystem 106, one or more controlled devices 108, a user interface 110, a database 112, and a memory 114. In the embodiment illustrated in FIG. 1, the environment control input 104 and the environment device control 106 are each in communication with the processor/controller 102. The environment control input 104 receives one or more inputs related to the environment, such as an entertainment venue, in which it is located. In response to receiving an environment control input, the processor/controller 102 processes the environment control input and provides a control signal to the environment device control subsystem 106. In response to receiving the control output, the environment device control 106 controls the operation of one or more controlled devices 108 within the environment 116. In a particular embodiment, the controlled devices 108 may be one or more light fixtures. The controlling of the controlled devices 108 may include controlling the pan and tilt of the lighting device as well as controlling the intensity of the output thereof. The user interface 110 is in communication with the processor/controller 102 and allows a user or operator of the control system 100 to program behavior of controlled devices 108 relative to their capability and in response to environment control inputs 104 as well as perform other functions of the system as will be further described herein. The database 112 is in communication with the process/controller 102 and functions to store data related to various aspects of the control system 100. The memory 114 is coupled to the processor/controller 102 and functions to allow storage of data related to the processing of signals as well as comprising a computer readable medium for storing software to perform the various functions of the control system 100 described herein.

In at least one embodiment, the environment includes an object environment having an object space associated therewith. The processor/controller 102 recognizes the presence of a predetermined object in the object space. In at least one embodiment, the processor/controller 102 receives one or more images of the object space from an imaging device. In a particular embodiment, the one or more imaging devices are cameras configured to capture one or more images of at least a portion of the object space. In various embodiments, the predetermined object is previously selected by a user. The processor/controller 102 then determines a coordinate location of the recognized predetermined object in the object space. In at least one embodiment, the determining of the coordinate location of the predetermined object is based upon processing the one or more captured images of the object space. In still other embodiments, the determining of the coordinate location of the predetermined object may be performed by GPS, triangulation, geolocation, location or pressure sensors mounted in or on a floor surface, altitude sensors, IMU sensors, or any other location method. Some embodiments utilize a combination of methods and devices. In a particular embodiment, the coordinate location is a two-dimensional coordinate location within the object space. In still other embodiments, the coordinate location is a three-dimensional coordinate location within the object space.

In at least one embodiment, the processor/controller receives a definition of a target set of coordinates in the object space. In at least one embodiment, the definition of a target set of coordinates in the object space is performed by a user in a prior setup procedure as will be further described herein. The target set of coordinates represents a location within the object space in which it is desired to trigger one or more outputs by the controlled output devices 108 when predefined criteria are satisfied. In at least one embodiment, the defined criteria are related to a spatial relationship, such a predefined proximity, between the coordinate location of the predetermined object and the target set of coordinates. The processor/controller 102 then determines the spatial relationship between the recognized predetermined object and the target set of coordinates and compares the spatial relationship with predetermined spatial relationship criteria. Examples of predetermined spatial relation criteria include proximity of the recognized predetermined object to the target set of coordinates where the target coordinates may represent another observed or predetermined object, an area or zone, a specific location, or a line defined as a delimiter or "trip line" within the environment. If the determined spatial relationship criteria falls within the predetermined spatial relationship criteria, the processor sends control signals to modify the object space environment. Examples of predetermined object attribute criteria include location, color, pattern or size of the recognized predetermined object within the object space. If the predetermined object's attribute criteria falls within the predetermined attribute criteria, the processor sends control signals to modify the object space environment. Examples of predetermined motion criteria include the motion of the predetermined object relative to a predetermined path in the environment and or detecting a gesture of the recognized predetermined object. In various embodiments, the object space environment is modified by controlling one or more controlled devices 108 within the environment. In a particular example, object space environment is modified by controlling the pan, tilt, and light intensity of one or more light fixtures to direct their light beams within the object space environment. In other embodiments, the control of devices 108 within the environment may be mapped to audio attributes obtained from the environment such as pitch or volume or mapped to predefined set of environment control attributes defined by a system profile.

In various embodiments, the system supports various fixture control protocols such as the following industry protocols: Digital Multiplexing—DMX 512=E1.11, USITT DMX512-A (maintained by Entertainment Services and Technology Association [ESTA]); Remote Device Management—RDM; and Architecture for Controls Networks—ACN=ANSI E1.17 (maintained by ESTA).

For fixture control signal data management, leverages several mechanisms to manage/control the new attributes that one can now associate to fixtures. Some of the attribute fields that are utilized in building fixture lighting cues today include: dimming (intensity), pan, tilt, color, gobo, iris (beam angle), frost (beam edge control), focus, and shutter/strobe. The Vision-2-Vision system provides new attributes—examples include: attributes that manage object tracking, object selection, V2V-TRAX behavior and rate of change, audio frequency select, V2V-SYNC behavior and rate of change, V2V-IMAGE effect(s), and V2V-IMAGE behavior and rate of change. To the user, the new fields can be thought of as additional fixture channels added to and utilized by an associated device. In various embodiments, the user interface presents a control interface that is consistent with systems today presenting new attributes as additional fixture channels so that users can manage the new capability in a familiar way. In addition, in some embodiments the system offers simplified interfaces to offer a simpler control interface strategy for cue management and creation. An example would be to utilize a behavior latch interface tool to link a new feature and control capability to mark/pre-set cue in a standard industry cue stack. An example of using some of the fields described is shown in the table below (note, example shown in non-tracking cue mode):

| FIXTURE ID | DIMMER | PAN | TILT | COLOR | GOBO | OBJECT TRACKING | OBJECT SELECT | V2V-TRAX BEHAV./RATE | CUE ID |
|---|---|---|---|---|---|---|---|---|---|
| MFG-A_UNIT 11 | 50 | 30 | 25 | GREEN | SQUARE | OFF | | | 1 |
| MFG-A_UNIT 12 | 50 | *60 | *25 | BLUE | CIRCLE | OBJ_ID12 | AUTO-3SS | FOLLOWSPOT | 1 |
| MFG-A_UNIT 13 | 50 | 90 | 25 | **GREEN | SQUARE | OBJ_ID12 | MAN-RP | COMPLEMENT | 1 |

*Given V2V-TRAX is in use for the cue, the pan and tilt values represent a mark/pre-set cue value.
**The console will evaluate the primary color stored for OBJ_ID12 in the image DB and override the COLOR attribute control to select a complementary color In some embodiments, solutions that leverage an existing controller that is used in conjunction with a rack mount/standalone Vision-2-Vision controller may leverage one of several strategies to manage fixture control operations. One can use a multiplexed control signal (e.g. DMX universe) and connect it to the V2V controller, define/map key fixture attribute data into the external device controller, or leverage an overlay approach where devices are programmed via an industry standard protocol directly to the external device controller.

Figure 2:
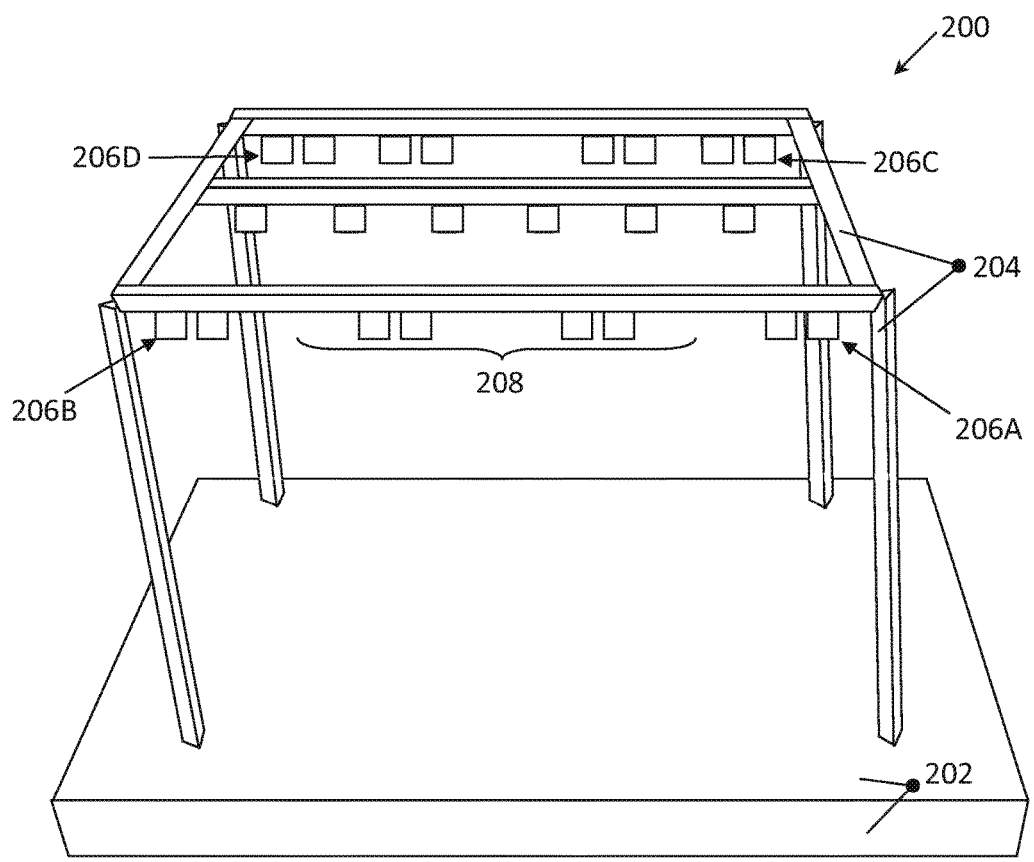
FIG. 2 illustrates an embodiment of an entertainment environment 200 for use with the control system.

FIG. 2 illustrates an embodiment of an entertainment environment 200 for use with the control system 100. The entertainment environment 200 includes a stage 202 and a truss structure 204 attached thereto. The truss structure 204 functions to suspend various equipment such as lighting fixtures and other devices above the stage 202. A downstage left camera 206a, a downstage right camera 206b, an upstage left camera 206c and an upstage right camera 206d is attached to the truss structure 204 and are coupled to the processor 102 as environment control inputs 104. The cameras 206a-d are directed downward toward the stage area and capture video and/or still images of the environment 200. One or more stage lights 208 or other devices are affixed to the truss structure and function as controlled devices 108 under control of the processor/controller 102 as further described herein. Although the embodiment illustrated in FIG. 2 uses four cameras, it should understood that in other embodiments any number of cameras or imaging devices may be used. In particular, in one embodiment, the entertainment environment may include one imaging device. In some embodiments, other environmental sensors may be attached to the truss 204 structure such as IMUs, pressure sensors, or lasers, and objects which may appear in the volume of space defined by the truss 204 and stage 202 may have sensors attached such as RFID.

Figure 3:
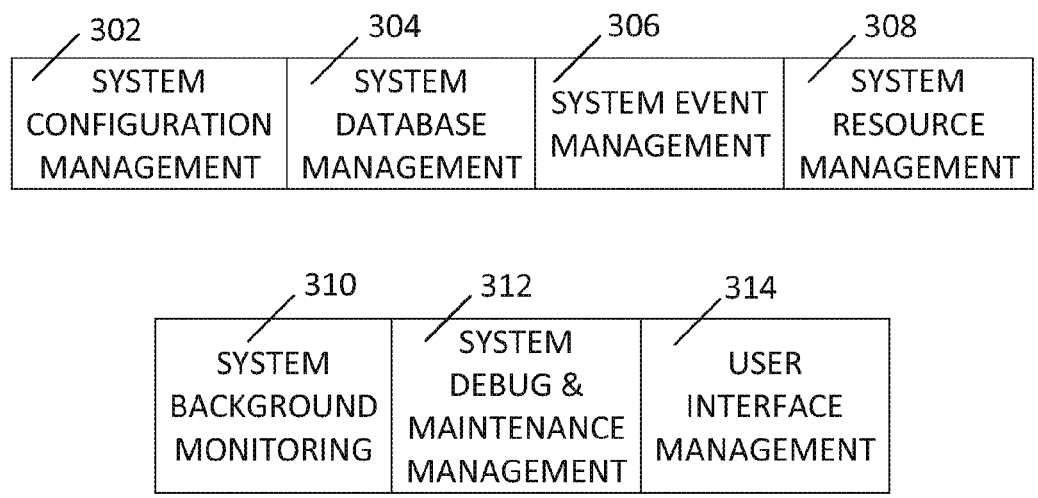
FIG. 3 illustrates an embodiment of general software components of the software architecture for the VISION-2-VISION control system.

FIG. 3 illustrates an embodiment of general software components of the software architecture for the VISION-2-VISION control system. The general software components include a system configuration management component 302, a system database management component 304, a system event management component 306, a system resource management component 308, a system background monitoring component 310, a system debug and maintenance management component 312, and a user interface management component 314. In various embodiments, the control system is designed to be scalable so that the system can grow as the user's needs grow or system feature performance demands increase. In a particular embodiment, components can be mapped to a specific CPU core or deployed in an independent computing platform blade/interface depending on the user/performance needs. If a particular service or component is hosted on a different platform blade, Ethernet, RS-232, or any other suitable protocol may be used to communicate data to the master control computing interface.

Figure 4:
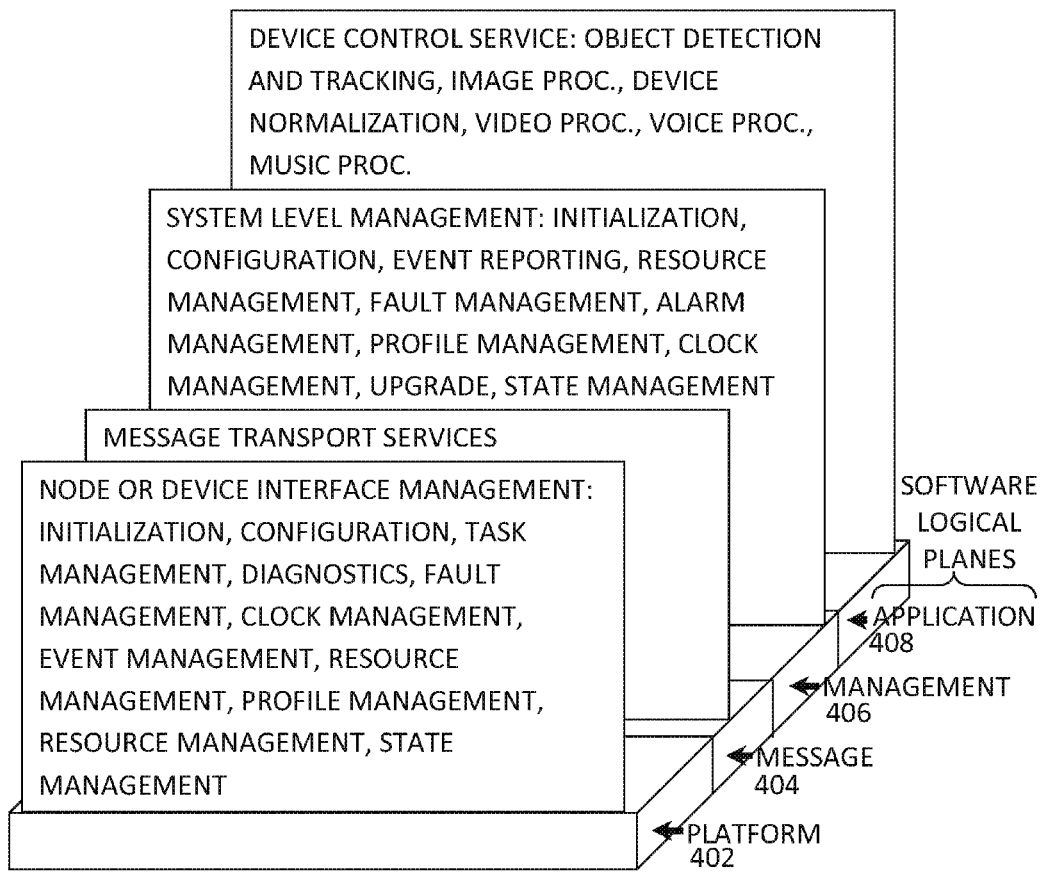
FIG. 4 illustrates an embodiment of a general overview of software logical planes for the control system.

FIG. 4 illustrates an embodiment of a general overview of software logical planes for the control system. FIG. 4 illustrates various software components of the vision-2-vision control system for a particular embodiment, but it should be understood that it does not represent a comprehensive view of such. In other embodiments, additional or different software components may be present. The software logical planes include a platform logical plane 402, a message logical plane 404, a management logical plane 406 and an application logical plane 408. The platform logical plane 402 may include node or device interface management functions including initialization, configuration, task management, diagnostics, fault management, clock management, event management, resource management, profile management and rend-state management. The message logical plane 404 includes message transport services. The management logical plane 406 includes system level management functions such as a initialization, configuration, event reporting, resource management, fault management, alarm management, profile management, clock management, upgrade and state management. The application logical plane 408 includes device control service functions such as object detection and tracking, image processing, device normalization, video processing, voice processing and music processing.

Figure 5:
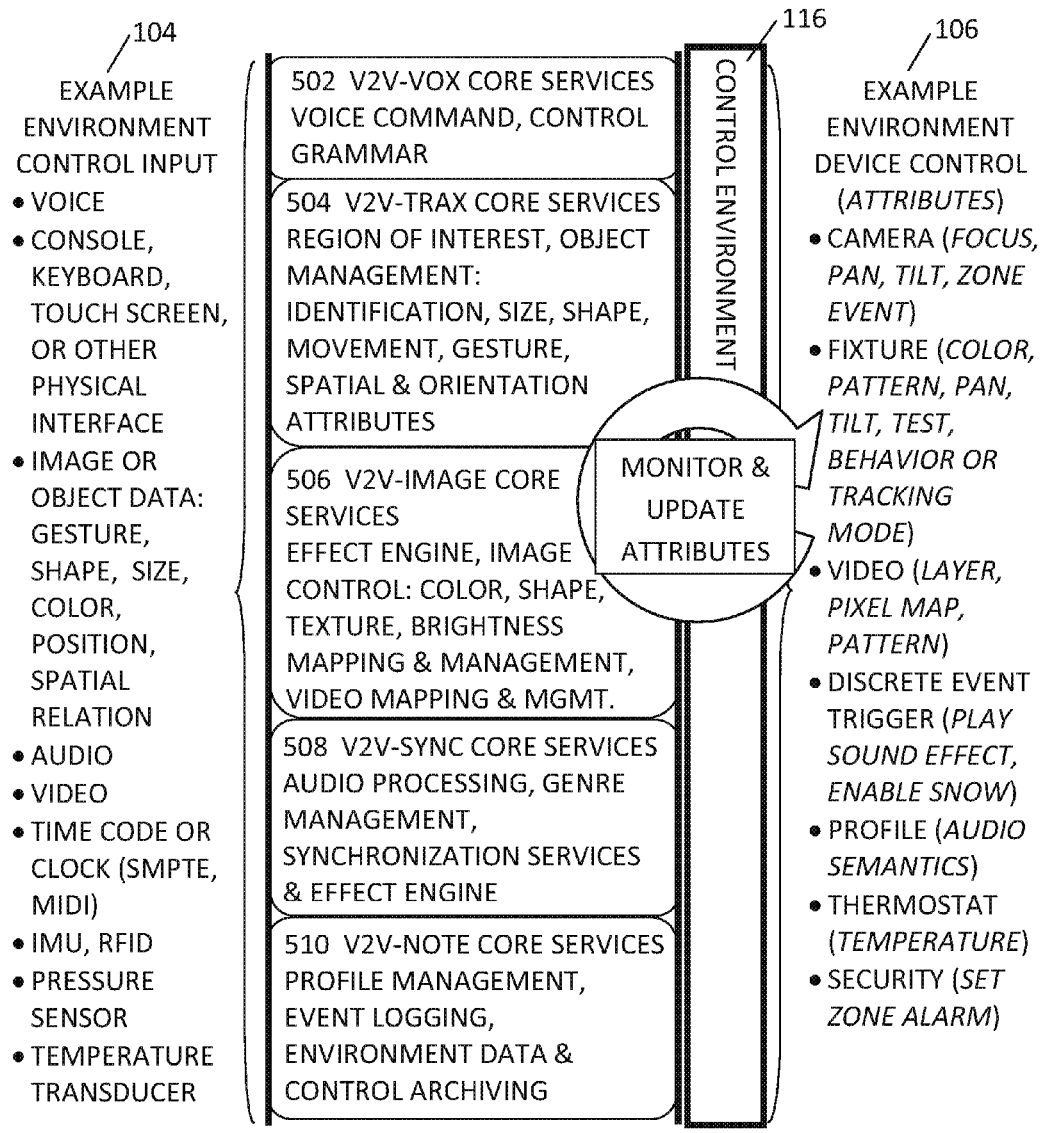
FIGS. 5-5' illustrate an embodiment of logical elements and sequences that represent key control services capability of the control system.
Figure 5:
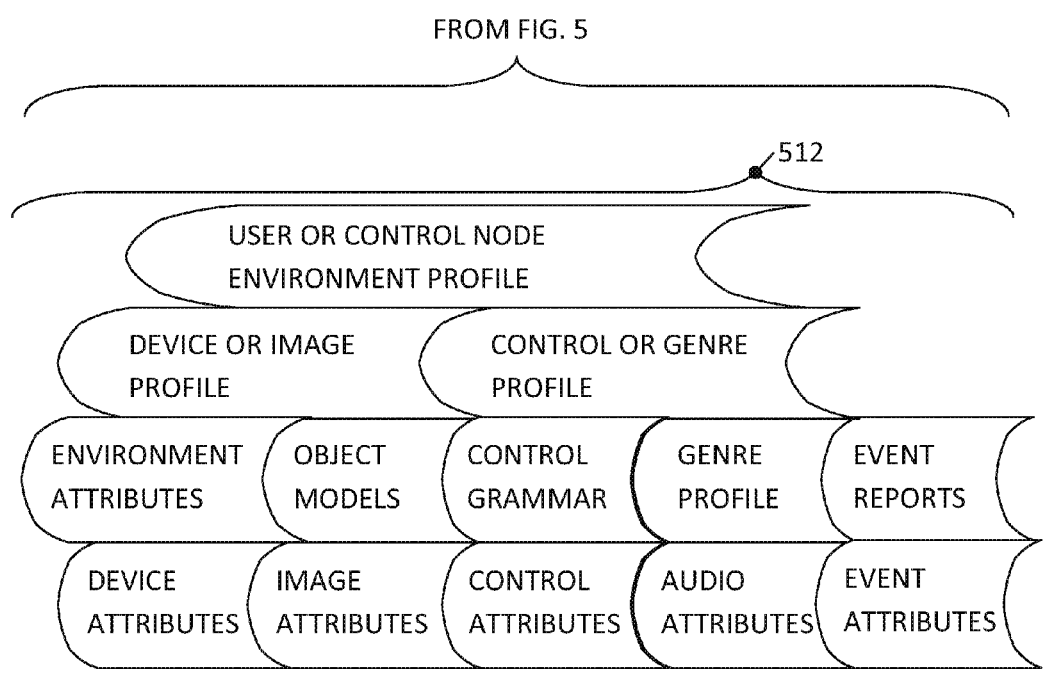

FIGS. 5-5' illustrate an embodiment of logical elements and sequences that represent key control services capability of the control system 100. It should be understood that FIGS. 5-5' does not represent a comprehensive view of the software components defined absolute grouping of capability to service, nor sequences managed in the vision-2-vision control system in all embodiments. In other embodiments, different services, groupings or sequences may be used. In the embodiment illustrated in FIGS. 5-5', the control system 100 includes a number of core services including V2V-VOX core services 502, V2V-TRAX core services 504, V2V-IMAGE core services 506, V2V-SYNC core services 508, and V2V-NOTE core services 510. The V2V-VOX core services 502 provide such services as voice command, and control grammar. The V2V-TRAX core services 504 includes services such as region of interest and object management. The object management may include identification, size, shape, movement, gesture, and special and orientation attributes. The V2V-IMAGE core services 506 may include an effect engine, and image control such as color, shape, texture, brightness mapping and management. The V2V-IMAGE core services 506 may further include video mapping and management. The V2V-SYNC core services 508 may include audio processing, genre management, synchronization services, and an effects engine. The V2V-NOTE core services 510 may include profile management, event logging, environment data and control archiving.

In various embodiments, the voice control capability design provided by V2V-VOX core services 502 is built around infrastructure that prevents the need for training the system for each user. In some embodiments, multiple language support is possible. The command grammar is based upon a set of fields that map to specific terms/tokens. The term may be an attribute of a fixture or desired operations against the active fixture(s). For example, if one says: "lights on", "turn the lights on", or simply "on", one or more fixtures will be turned on. The fixtures that will come on are based upon a number of factors. If no fixtures had ever been turned on, then all fixtures will come on. If a prior command had been issued that turned on a specific set of fixtures, then no action will occur as the prior command had already turned on fixtures.

In various embodiments, the system tracking control capability provided by V2V-TRAX core services 504 uses cameras for system computer vision control and leverages edge detection and motion detection algorithms to locate and identify objects as well as obtain object characteristics and attributes. Examples of edge detection algorithms that may be used in various embodiments are listed in the following table:

| Vision Algorithm or Technique | Associated Function or Task |
| --- | --- |
| Boosting, Random Trees, Expectation Maximization, K-nearest Neighbor | Machine Learning |
| Canny, Subtraction, Sobel | Edge Detection |
| Delaunay Triangulation | 3D Shape Rendering |

| Vision Algorithm or Technique | Associated Function or Task |
| --- | --- |
| Delaunay Triangulation | Tracking Objects |
| Distance Transform | Image Processing of Edge Detection |
| Frame Differencing, Codebook, Averaging Background Method | Background Subtraction: Isolating Image Objects |
| Gaussian, Laplacian of Gaussian | Edge Detection Filter |
| Gradient processing | Corner Detection |
| Haar Classifier | Machine Learning; Face Detection |
| Harris | Corner Finding: Extracting Geometric Measurements |
| Histogram Equalization | Image Processing for Better Contrast |
| Hough Transform | Circle Detection & Detection of other Simple Forms |
| Hough Transform | Line Detection |
| Inpainting | Image Repair |
| Line Fitting | 3D Point Analysis |
| Lucas-Kanade, Horn-Schunck | Optical Flow: Tracking & Motion |
| Morphology, Flood Fill, Threshold, Pyramid | Image Segmentation |
| Reprojection | Depth Map Generation; 3D Structure of Environment |
| SIFT | Key Feature Detection |
| SLAM | Simultaneous Localization and Depth Mapping |
| Structure From Motion | Camera Trajectory; 3D Structure of Environment |
| Subpixel Corners | Corner Finding: Extracting features |
| Time of Flight, Projected Light | Camera Type for Depth |
| Watershed Algorithm, Pyramid Mean-Shift, Pyramid Segmentation | Image Segmentation without a Background Image |

In a particular embodiment, a detection algorithm based upon a Harris type of edge detection is used. Images are cross-referenced via in-memory database searches that utilize search methods selected to return/locate data as efficiently and quickly as possible. In some embodiments, data/image matching is performed based upon evaluating the tracked object attributes against object images in a system database. System control parameters determine how many attributes, of an object observed by a camera, must match an object in the database for a consecutive set of frames to determine whether an object is one that should be tracked. Motion detection capability is leveraged to facilitate automatic selection of an object based upon its location and the period for which the object resides at a given location. For objects that are actively tracked, the system will return the object ID, object group ID, Cartesian coordinates, as well as the observed height and width of the object. Some attributes of a given objective can be derived directly from the systems image database based upon the object ID (e.g. color attributes, object complexity factor, etc). The data is used to update the value of the attributes sent in the fixture control signal to define the associated operation. In various embodiments, the system V2V-TRAX control is protocol agnostic so that any industry protocol can be supported at the hardware and/or device control layer (e.g. DMX, RDM, ACN). In still other embodiments, the system can support interaction with devices tracked via RFID methods.

The system will define the event (or object) space via several mechanisms. The data can be manually entered into the system database based upon data from the fixture plot and data associated with the dimensions from the stage that will be used for the event. Alternately, the system can obtain localization data by reference to a number of points obtained during load in or as part of the system init sequence during the product setup. Localization data is used to provide the master set of reference dimensions and data to be used for a given event. The data is stored with an event location name/ID for reference should a future event be done at the same location.

In various embodiments, image management capability provided by V2V-IMAGE core services 506 is based upon two key areas. One area is the video effect engine that applies effects to a provided video stream. Most systems to date utilize canned streams created prior to the event which complicates the ability for the lighting designer to mesh the video with the fixtures in real time. Embodiments of the new engine allow the user to create a cohesive look that ties fixture attributes to any projected video. The second area leverages computer vision principles associated with image database analysis. This subsystem is used to perform attribute analysis of an object so that fixture attributes can be defined based upon an observed object's attributes (e.g. use colors in the fixtures that compliment the color of a piece of material that will be used in a costume). Image mapping control parameters allow the artist to set how a fixture should map to the attributes of an object and what behavior is desired (e.g. compliment the attributes, use consistent attributes, use contrasting attributes, etc). In other embodiments, the image management capability is utilized to process and compare shapes or patterns control devices can create. This facilitates the ability to compare two different devices, evaluating all control capability and attributes of the device, to determine if one device would be a suitable replacement for the other.

In various embodiments, the audio synchronization subsystem provided by the V2V-SYNC core services 508 is based upon an audio processing engine that will split an audio stream out into specific data attributes. Analysis may be done via hardware or software utilizing Fast Fourier Transforms [FFTs] for spectrum analysis or any other suitable technique. In some embodiments, the data is accessible via software access methods defined on an industry standard protocol (e.g. XML). Various attributes can be collected and stored in audio attribute tokens—examples include: beat, pitch/frequency, key, time, volume/loudness, and harmony. Attributes may be cross linked to data that tracks/records changes across specific sampling periods—this allows the system to detect if there is a change in a given attribute. The audio attributes will then be available to the designer to map specific fixture behavior to a given sound characteristic. Sample applications include applications in which the designer configures a group of fixtures so that cues trigger based upon the audio sensitivity within a specified frequency, or the designer may associate how quickly a fixture pans or how bright the light is based upon the volume of sound. In various embodiments, the audio engine will be used to trigger operations against video panels to control which panels are turned on/off. The display panel control interface will be based upon a user defined panel matrix that maps the installed location of the panels against their associated control address—for a set of panels used to construct a video wall, the panel matrix could look something like a checker board.

In various embodiments, the journaling subsystem provided by the V2V-NOTE core services 510 is based upon detailed table structure definitions and relationships coupled with efficient search algorithms and tools. In some embodiments, templates are used, based upon an industry standard software language (e.g. XML), for fixture definition and music semantic data storage. In some embodiments, the templates may be offered to fixture vendors for defining library plug-ins of their fixture set. The V2V-NOTE subsystem supports the capability of storing video streams observed during a rehearsal or live event. In such embodiments, the system may require additional storage devices to prevent burdening the control system with the overhead of the associated storage. Notes taken during rehearsals/live events can be coupled to a live video stream. In various embodiments, a table structures is defined and utilized to generate numerous system, event/show, configuration, status, and equipment reports. Some reports may be based upon a cross-section of system events that were posted/reported for a specified period of time.

The example environmental control input 104 may include: voice, console, keyboard, touch screen, or other physical interface control signals, audio, video, time code or clock (SMPTE, MIDI), signals from a inertial motion unit (IMU), a signal from an RFID, a pressure sensor or a temperature transducer. The example environmental control input 104 may further include image or object data such as a gesture, shape, size, color, position, and spatial relation.

Examples of environment device control 106 attributes may include: camera attributes such as focus, pan, tilt, zoom, zone event, fixture attributes such as color, pattern, pan, tilt, test behavior, or tracking mode, video attributes such as layer, pixel map, and pattern, discrete event attribute triggers such as playing a sound effect enabling snow effects, etc., a profile containing audio semantics, a thermostat used to manage temperature in the environment, and or security control attributes such as camera pan, tilt, zoom, or zone alarms.

The environment control inputs 104 are provided to the various core services, which are processed by the core services and used to monitor and update environment device control attributes within the control environment 116. The control system may further generate data 512 that is stored in the database 112, which may include user or control mode environment profiles, device or image profiles, control or genre profiles, event reports, genre profiles, controlled grammar, object models, environment attributes, device attributes, image attributes, control attributes, audio attributes, event attributes, and system logs.

Figure 6:
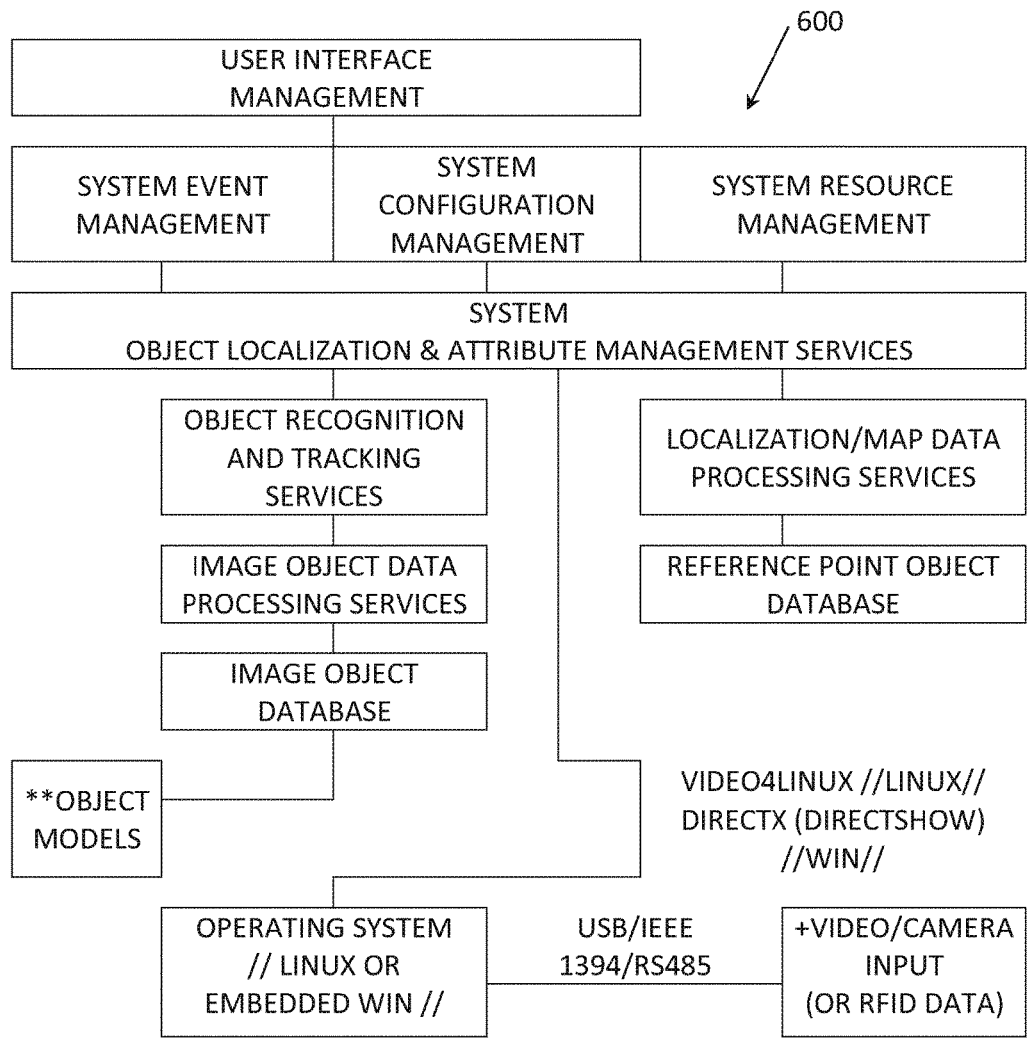
FIG. 6 illustrates a particular embodiment of software components of the V2V-TRAX core services.

FIG. 6 illustrates a particular embodiment of software components 600 of the V2V-TRAX core services 504. In various embodiments, a complex object may have one or more models associated with it. Each model may contain specific details of an object. For an object to be observed by the system, a user defined number of details is observed for a user defined set of consecutive frames. Simple objects will have fewer details/models as the object will be defined more so by its edges than specific image details of the object. In particular embodiment, a laser can be used to set fixture focus. Additionally, the color of the laser as well as the shape of the image projected by the laser can be used to define/set fixture attributes. An input device to the system in this particular embodiment is a camera, which will see the laser beam and associated shape. When a camera is present, some embodiments may utilize the observed shape of a fixture's projected beam of light to manage system initialization operations as well as attribute management to various environment control devices. Other embodiments leverage the observed objects width and height to manage what attributes to update in the various control devices within the environment. Given the control system 100, comprehends volumes of space, the system will have a 3D effects engine which defines default control attributes values that generate specific 3D looks/effects—effects can be dynamic and change in relation to predetermined objects within the space. For example, the system may provide a collection of 3-D effects based upon these object's attributes such as a wave, teardrop, heartbeat and many more.

Figure 7:
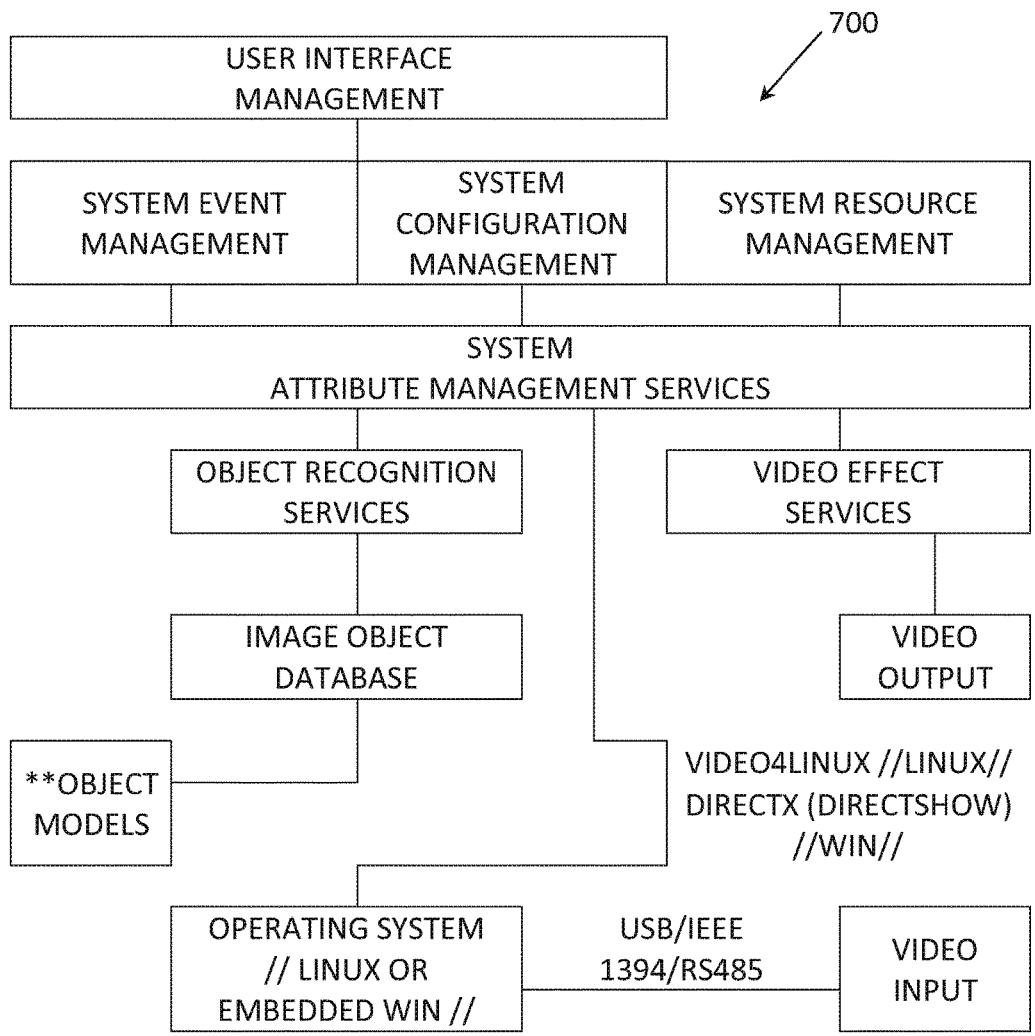
FIG. 7 illustrates a particular embodiment of software components of the V2V-IMAGE core services.

FIG. 7 illustrates a particular embodiment of software components of the V2V-IMAGE core services 506. In particular embodiments, a complex object may have one or more models associated with it. Each model contains specific details of an object for an object to be observed by the system, a user defined number of details may be observed for a user defined set of consecutive frames. Simple objects will have fewer details/models as the object will be defined more so by its edges than specific image details of the object. Image processing services may provide facilities to search object models for matching characteristics across multiple objects. This allows the system to normalize gobo selection of cross fixtures by finding similar images. A gobo is a physical template which is slotted inside or placed in front of a lighting source and is used to control the shape of emitted light. A gobo may have a particular color or shape, such as a star, a spiral, a flower, etc., or other shapes and colors as are known in the art.

Figure 8:
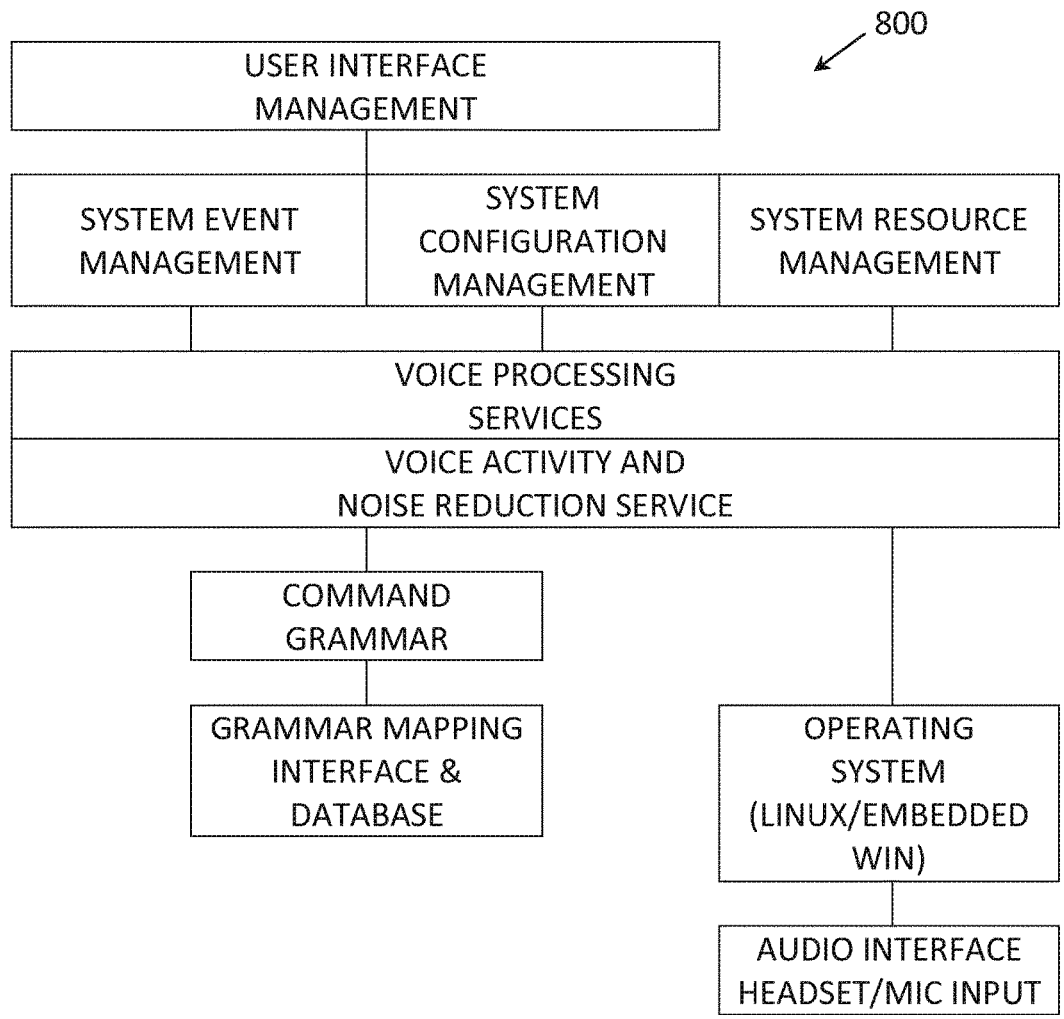
FIG. 8 illustrates a particular embodiment of software components for the V2V-VOX core services.

FIG. 8 illustrates a particular embodiment of software components 800 for the V2V-VOX core services 502. The V2V-VOX software components provide voice control of the control system 100. In a particular embodiment, V2V-VOX services have a setting to control which fixtures a particular voice command will apply to. The interface processes command strings constructed from a set of terms that are used to form command grammar for the system. The user is able to reorder the sequence and which terms are used to alter the command grammar. For example, this allows the user to determine/configure the system to either accept the command "turn on the Martin Macs" or "turn the Martin Macs on" by simply changing the order of the action and device terms used in the command grammar. In the particular embodiment described herein, Martin Macs are a particular type of lighting fixture. Other embodiments of the V2V-VOX software provide methods where devices can be categorized into device types (e.g. Martin Mac is device type lighting or profile lighting), this allows the system to apply actions on different devices based upon the device type. An example of grammar terms and values includes:

| | |
|---|---|
| ACTION | On, off, dim, intensity, pan, tilt, focus, strobe, frost |
| DETAIL | Up, down, percentage, upstage, downstage, stage right, stage left, reference point 1, reference point 2 and laser |
| DEVICE | Fixture name, name for group of fixtures, name for a group of fixtures based upon location, and name of a group of fixtures based upon fixture type. |

In various embodiments, the V2V-VOX core services 502 may support a number of different languages including English, Canadian French, Spanish, German, Arabic and any other dialect. Supported languages may be further broken down such that English may be broken down into U.S. English, U.K. English, Australia English, and New Zealand English. Spanish may be broken down into Mexican Spanish, South American Spanish, and European Spanish.

Figure 9:
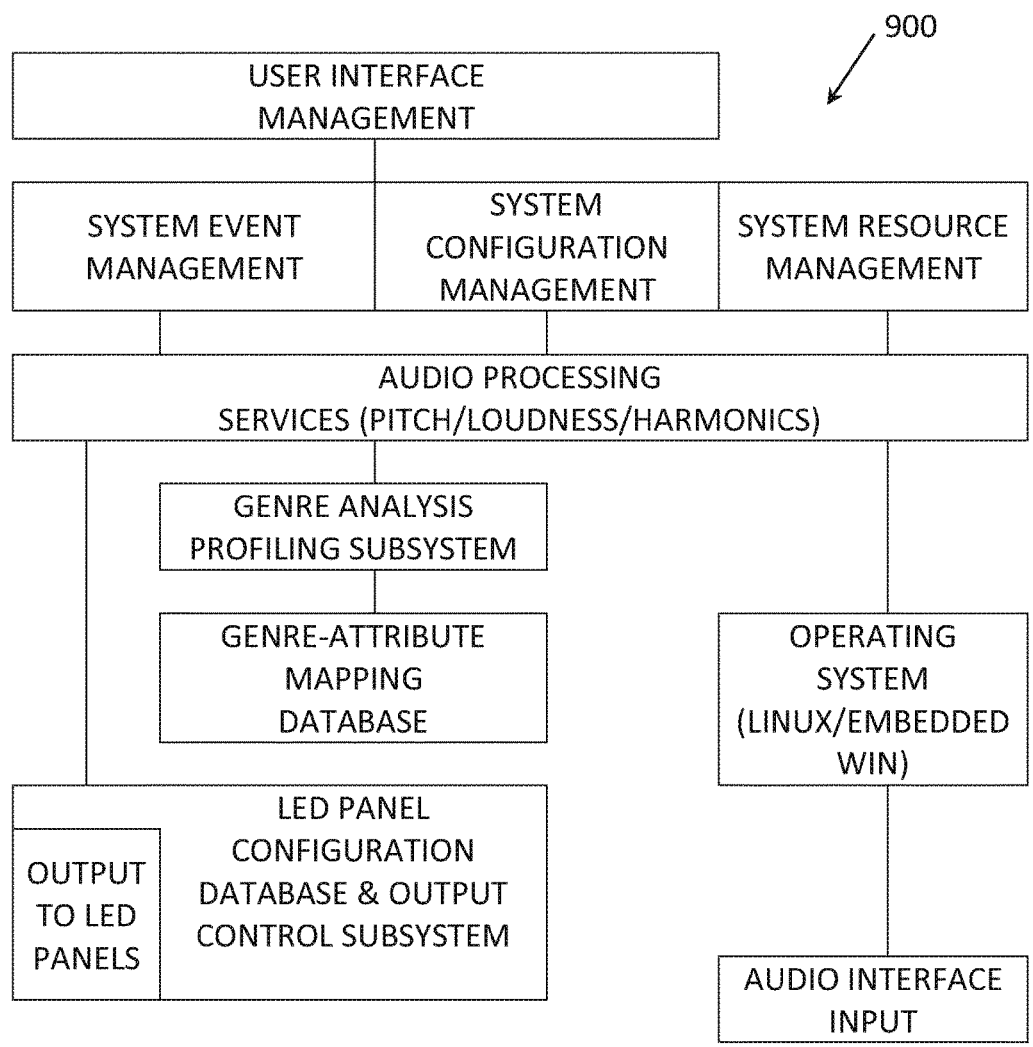
FIG. 9 illustrates a particular embodiment of software components for the V2V-SYNC core services.

FIG. 9 illustrates a particular embodiment of software components 900 for the V2V-SYNC core services 508. The components 900 allow music genres to be associated to fixture attribute profiles such as those used in prior events or from a genre system default database to quickly create different looks by setting up the system to utilize a music genre to define fixture behavior and attribute usage. For example, a particular genre of music may be used to control a particular light pattern, color, movement, etc. In a particular embodiment, a projection system or video panel may be used such that it can appear to sync to music attributes by utilizing the audio processing services to control when the output to specific panels will be enabled.

FIG. 10 illustrates an embodiment of an example of a 4×4 LED panel matrix under control of the V2V-SYNC software components 900. In the first example illustrated in FIG. 10, the panels of the 4×4 LED matrix will be enabled in columns from left to right with the panels being turned on in sequence based upon the sync trigger parameters. In this example, each tick mark added to the letter "A" represents a consecutive display step (e.g., A" would follow A'). In the second example, the panels are enabled in columns from right to left. Panels will be turned on in sequence based upon the sync trigger parameters. In the third example, the panels will be enabled from left to right by selecting odd numbered panels. Panels will be turned on in sequence based upon the sync trigger parameters. In the fourth example, panels will be enabled from left to right selecting even numbered panels. Panels will be turned on in sequence based upon the sync trigger parameters.

Figure 11:
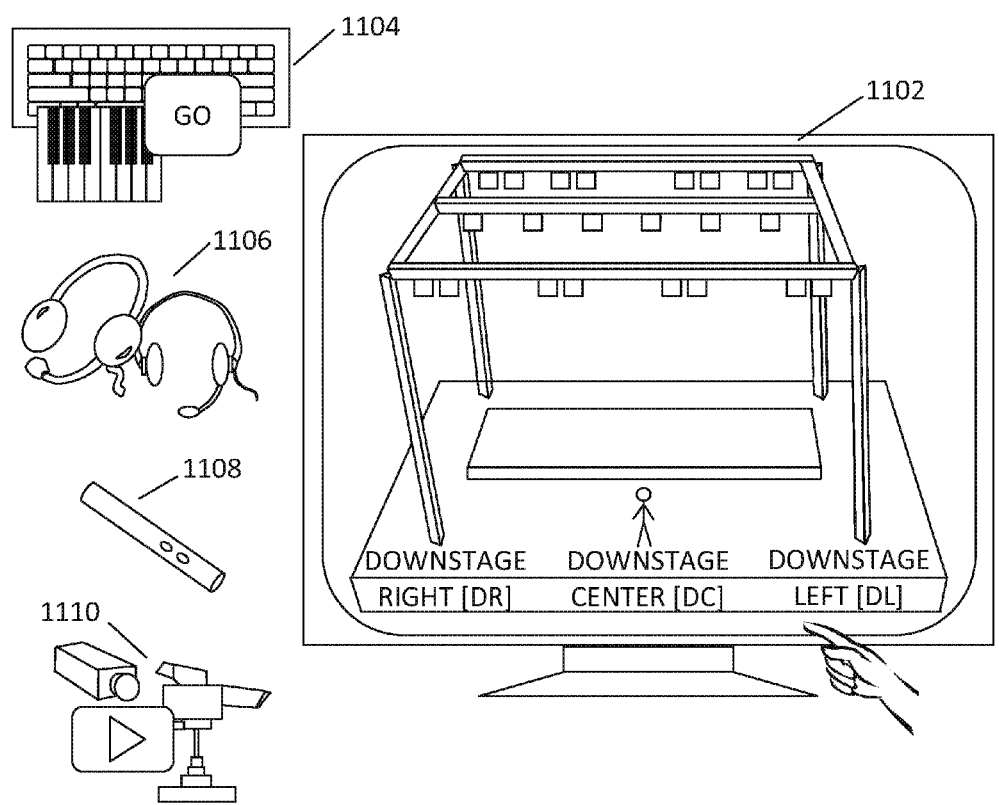
FIG. 11 illustrates an embodiment of a user interface of the control system.

FIG. 11 illustrates an embodiment of a user interface of the control system 100. The user interface includes a touch screen 1102, a physical interface 1104, a voice interface 1106, a laser pointer interface 1108, and a camera interface 1110. The touch screen 1102 allows an operator to interface with the control system 100 such as designating objects for tracking, designating a region of interest, controlling a fixture shown in the touch screen display or any other functions of the control system 100. The physical interface 1104 may include a keyboard, one or more buttons, sliders, control panels or any other physical interface which may be used to control various aspects of the control system 100. The voice interface 1106 may include a microphone or headset used to issue voice commands to the control system 100. Different embodiments of the system will utilize different types and combinations of cameras such as local control cameras or environmental control cameras. The local control camera 1110 is used not to capture images of the environment itself but instead used as a local input control interface for the operator. For example, the operator may make gestures at the local control camera to control the various aspects of the control system 100. In another example the operator may hold up a card printed with an image of a specific: color, shape, colored shape, or any other object which will then be recognized by the camera and used to control various aspects of the control system 100. The laser pointer 1108 may be used to point to a particular location within the controlled environment. For example, the laser pointer 1108 may be used to point to a specific location upon the stage and the control system 100 may recognize the focus of the laser pointer using the cameras which capture images of the environment and designate the particular area pointed to as a region of interest to be used in further control of devices such as lighting fixtures. Although various embodiments have been described as using a laser pointer 1108, it should be understood that other embodiments may use any type of light source such as a fixture, laser, or laser pointer.

Figure 12A:
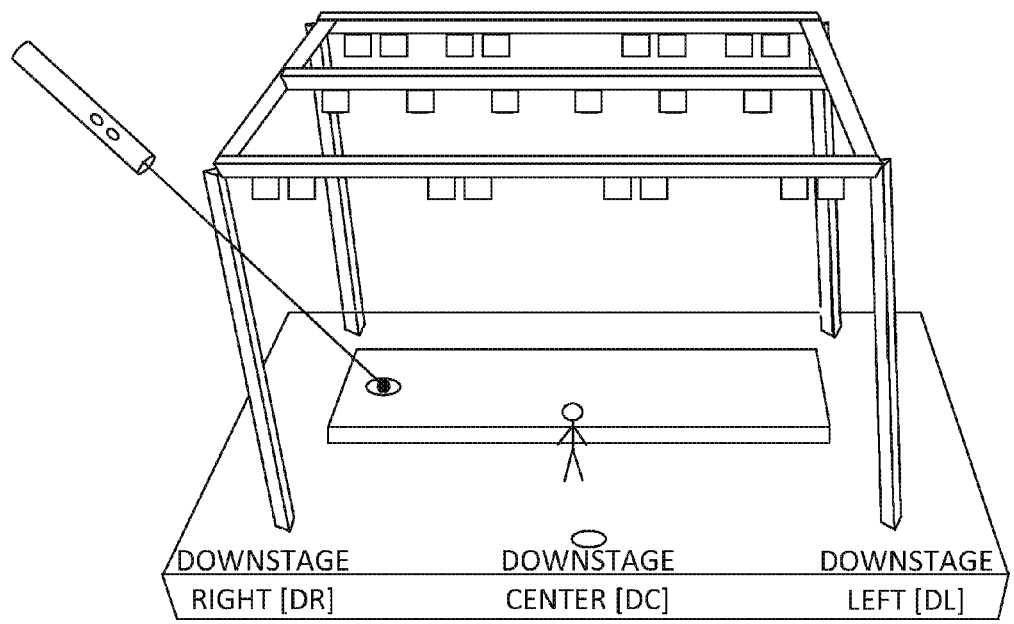
FIG. 12a illustrates a particular example embodiment of an operator using a laser pointer to designate a particular region of interest.
Figure 12B:
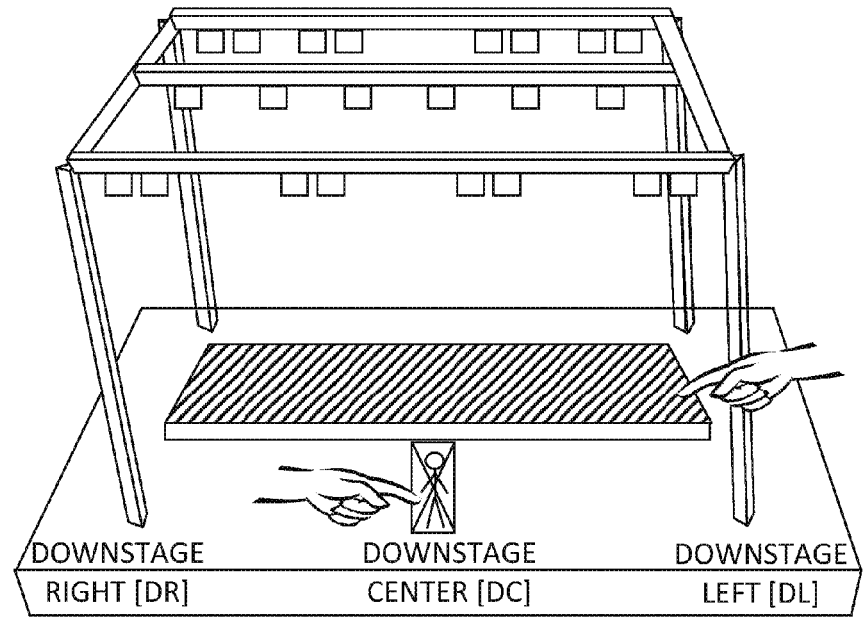
FIG. 12b illustrates an embodiment of a user interface system with a touch screen where a user selects an object or object region of interest by touching the area on the screen interface.

FIGS. 12a-12b illustrate a particular embodiment of an operator using the laser pointer 1108 to designate a particular region of interest. Referring to FIG. 12a, the operator points a laser to a location on the stage of the entertainment environment and in response the area defined by the laser pointer as an area or region of interest will be identified on the user interface. In the particular example illustrated in FIG. 12a, the area is identified on the user interface by an oval shape. In another example, the operator may issue a voice command of "downstage center." In response the control system will identify the downstage center portion of the stage as an region of interest on the user interface using an oval shape. Referring now to FIG. 12b, in another example of a selection or identification of an object or region of interest, the user selects an object displayed on the touch screen 1102 and the selected object will be identified using image processing and will be designated as a selected object in the user interface on the touch screen 1102. In the particular embodiment illustrated in FIG. 12b, the selected object, which in this case is a person, is identified as being selected by the object being surrounded by a rectangle with a cross sectioned with an X. In still another example, an operator may touch or select a particular area displayed on the touch screen. The area selected will now be identified on the touch screen 1102 of the user interface as a region of interest. In the particular embodiment illustrated in FIG. 12b, the entire upper stage is designated as a region of interest by the selection of a portion of the upper stage by the operator. In other embodiments, a particular laser image shape or color can be mapped to control other attributes such that different laser pointers and/or laser pointer colors may be used to control different aspects of the control system 100. In still other embodiments, the operator may select a portion of the environment displayed on the touch screen 1102 by drawing a border around the desired region of interest using the touch screen interface or circling the object of interest in the control environment via a laser pointer. The mechanisms and associated attributes used to provide feedback to the user regarding a defined location, region, or object of interest may vary. The use of an oval to represent a location, a rectangle cross sectioned with an X for an object, or filling an area with lines are shown as possible examples.

Figure 13A:
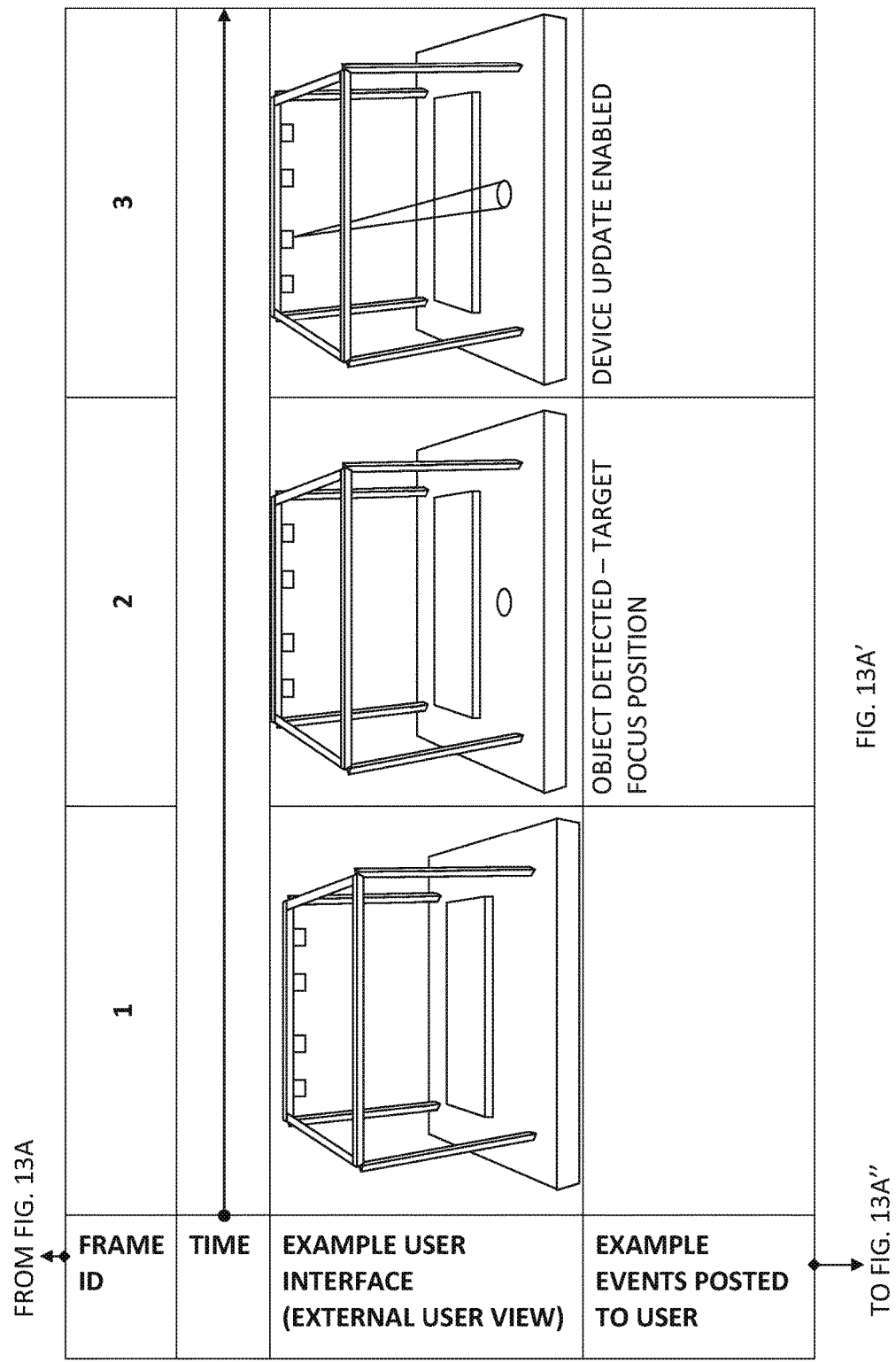
FIGS. 13a-13a" and 13b-13b" illustrate an example embodiment of an operator using a focus behavior function of the V2V-TRAX software component, FIGS. 13a-13a" show an example sequence of setting fixture focus using a laser pointer, if the system is setup for focus validation, the system can validate focus attribute data using a system positioning laser, as represented in example FIGS. 13b-13b"

FIGS. 13a-13a" and 13b-13b" illustrate an embodiment of a sequence of an operator using a focus behavior function of the V2V-TRAX software component. The focus behavior function allows the control system 100 to update the attributes of devices and the control environment based upon the position of an object, the color or shape of an object, or both the position and color or shape of an object. For example, the function allows an operator to set a pan and tilt value of a particular light or group of lights such that the light is positioned to focus at the location where an object is observed. Further detail of the V2V-TRAX Focus Behavior function is described in the following table:

| Control System Service Tool Service Operation | V2V-TRAX Focus Behavior | |
|---|---|---|
| Example Control Capability Introduced | Update the attributes of devices in the control environment based upon The position of an object or both the position and color or shape of an object (e.g. set a lights pan and tilt values such that the light is positioned to focus at the location where an object is observed) | |
| Key Components | *Control System: Provides computational power, storage, and user interfaces<br>Camera(s): Provides video and image input to computer vision pipeline tasks May be packaged with IMU, pressure, laser, and or GPS<br>Laser Pointer: Used to point to a location in the environment where tool operation is mapped; Used to point to or select (e.g. circle) an object in the environment | |
| Example Additional Components Utilized Based Upon Desired System Services and Control Capability | Additional Data Storage Units: Used to archive video and or audio streams<br>Head Set: Used to tell the system a location in the environment (e.g. Don's office, Downstage Center) where tool operation is mapped<br>Laser Pointer: Used to point to a location in the environment where tool operation is mapped; Used to point to or select (e.g. circle) an object in the environment<br>Touch Panel: Used as a control interface to select objects, zones, locations, and lines<br>Sensors: IMU, pressure, RFID, color, and temperature sensors may be used for additional attributes of devices in the environment | |
| Example Devices Controlled by the System | Lighting Fixtures, LED Panels, Cameras | |
| Example General Tool Service Provisioning Steps | Map the tool service, Focus Behavior, to a control device or group of devices (e.g. Lighting Fixture(s)) and to one or more of the given control device's attributes (e.g. Light Fixture(s) pan, tilt, and iris size) | |
| Example Tool Control Parameters | Behavior Type: Test, Automatic, Manual<br>Activation Type: Automatic, Manual, Validate, Test<br>Activation Threshold: Control parameter used to control how long a device's parameters are updated<br>Sequence Control: Control parameter used to manage how the system moves between control devices contained in a group (e.g. automatically, manually, by type, by location, for system)<br>Control Threshold: Control parameter used to manage timing associated with when the system moves to a new device in a group | |
| | Service Tool Type & Control Device Update Criteria | Example Service Tool Type Provisioning Methods |
| Example Tool Control Behavior Types | Test: After position data is determined to focus a device to a location, sequence through testing other attributes used on the device (e.g. color)<br>Automatic: Once a device(s) is/are mapped to focus behavior, automatically turn on the device, set the focus position, and based upon other control parameters, move to another device<br>Manual: Once a device(s) is/are mapped to focus behavior, automatically turn on the device, and wait for the operator to accept or modify then accept the data | Focus can be configured via a system control interface; the target focus position can be manually entered, specified via a voice command, or set using a laser pointer |

FIGS. 13*a*-13*a*" and 13*b*-13*b*" illustrate an embodiment of a sequence for setting the focus position using a laser pointer. The sequence is illustrated as using frame IDs to indicate the progression of time. It should be understood that a particular frame ID may not refer just to one frame but may, in fact, include multiple frames of a video sequence. In frame ID 1, a baseline image of the entertainment environment is captured in a video frame and processed to provide an image of the environment to the user interface. In frame ID 2, the user shines a laser pointer in the environment to a desired target focus position. It should be noted that the laser beam is shown in the figure for clarity, however, in actual use, only the beam point may be visible. The control system detects the position of the laser pointer and sets a location object at that point. In the user interface, the operator is provided with an indication that the system has selected the particular location.

Figure 13B:
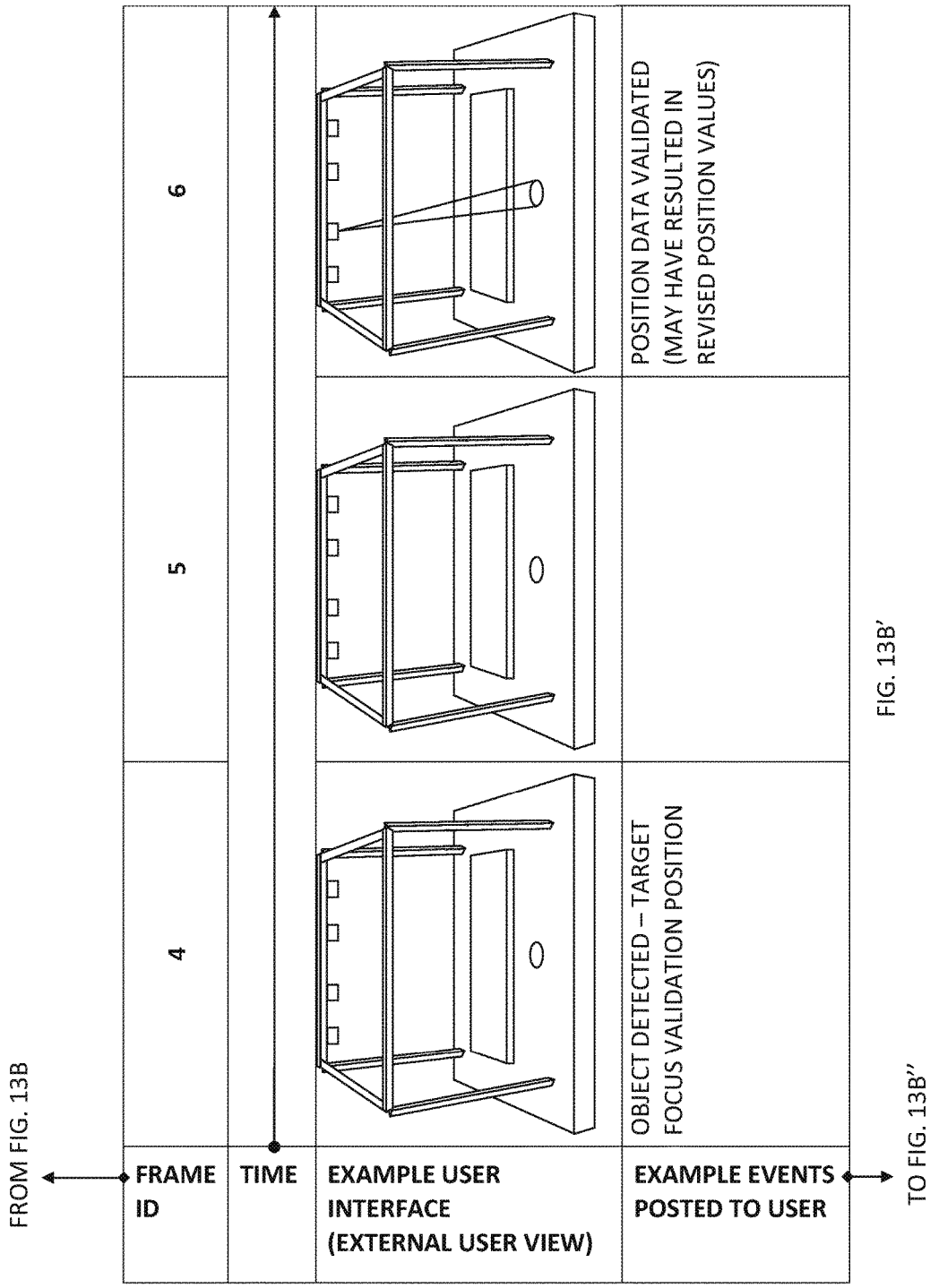
FIGS. 13c-13c" show an example sequence for automatically setting fixture focus utilizing a system positioning laser.
FIGS. 13d-13d" illustrate an embodiment of a flow diagram for focus behavior.

In the particular embodiment illustrated in FIGS. 13a-13a", the position is indicated by an oval. In frame ID 3, the location is mapped to a control device or group of devices such as a lighting fixture or fixtures and to one or more of the given control device's attributes such as light fixture, pan, tilt and iris size. In the user interface, a particular light fixture is shown as enabled for that location. In a particular embodiment, the control system may generate an internal log including an indication that the criteria have been met and the devise attribute updates have been initiated. The device control attributes of the control system are updated to indicate that mapped environment light focus data has been updated. Continuing to FIGS. 13b-13b", additional frames continue to illustrate the scenario for a sequence where the positioning laser is present and focus type activation is validated. In frame ID 4, the system enables a positioning laser and location data for the positioning laser is obtained. The control system provides a validation of the target focus position to the user through the user interface. In frame ID 5, the location is compared to a prior value. In frame ID 6, the position data is validated by the user interface displaying an indication that the location is mapped to the particular light fixture. As before, an internal log may be generated indicating that the criteria has been met and that devices attribute updates have been initiated. In the prior step of the position data being validated, if the focus position has changed from the prior value, the position data may be updated with the revised position values. The environment device control attributes are updated to reflect the new mapped environment light focus data. FIGS. 13c-13c" illustrate another example sequence for focus behavior.

The embodiment illustrated in FIGS. 13c-13c" show an example sequence for automatically setting fixture focus utilizing a system positioning laser. In frame ID 1, the system enables the positioning laser and location data for the positioning laser is obtained. The detected object is then shown as a target focus position to the user. In frame ID 2 the system turns on the first lighting fixture in the device control group. The control system then focuses the first lighting fixture at the positioning laser location that indicates to the user that position data has been obtained and updates the map environment light focus and relative position data for the first lighting fixture. In frame ID 3 the system turns off the lighting fixture and prepares to move to the next unit.

Figure 13D:
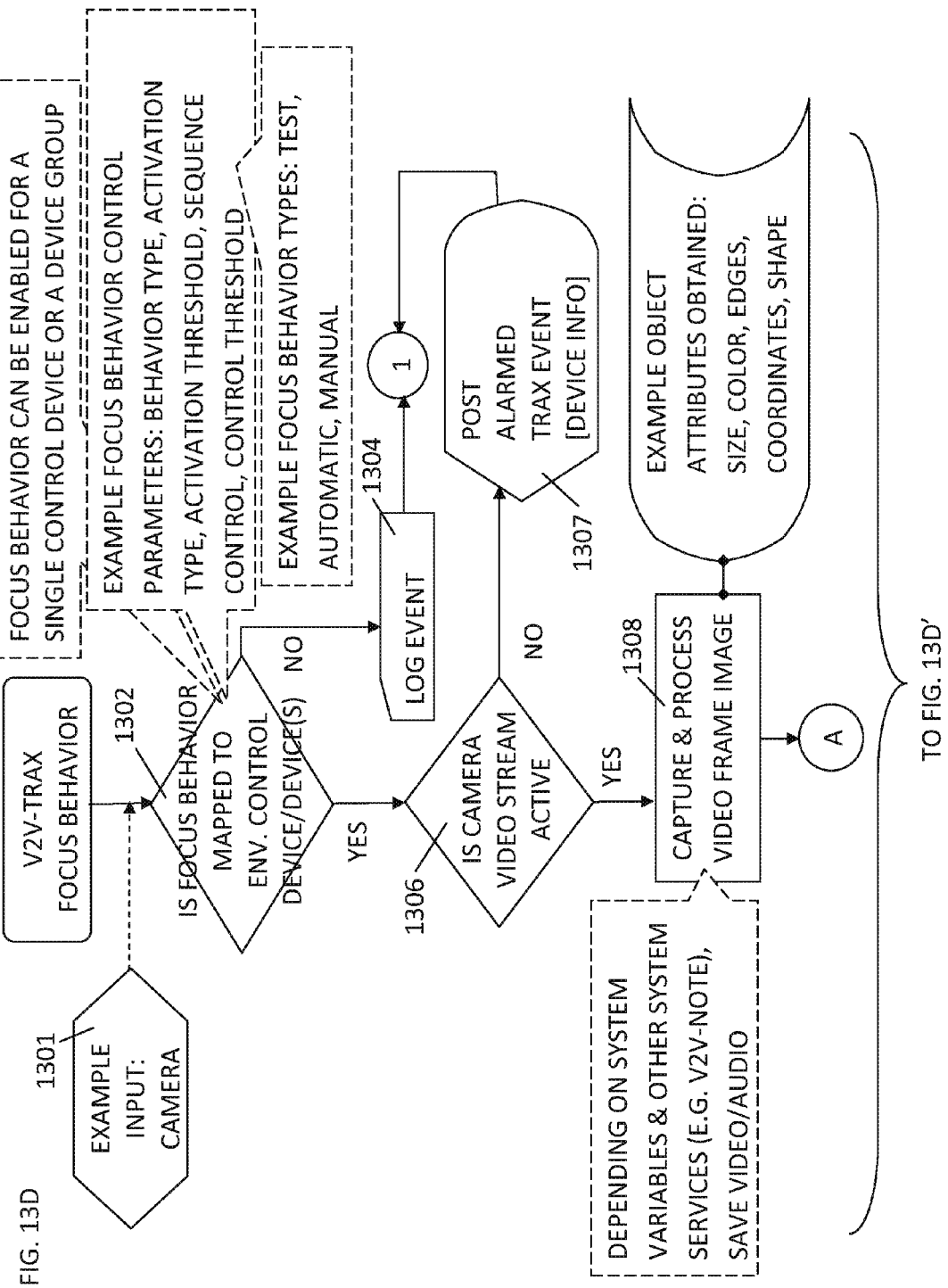
Figure 13D:
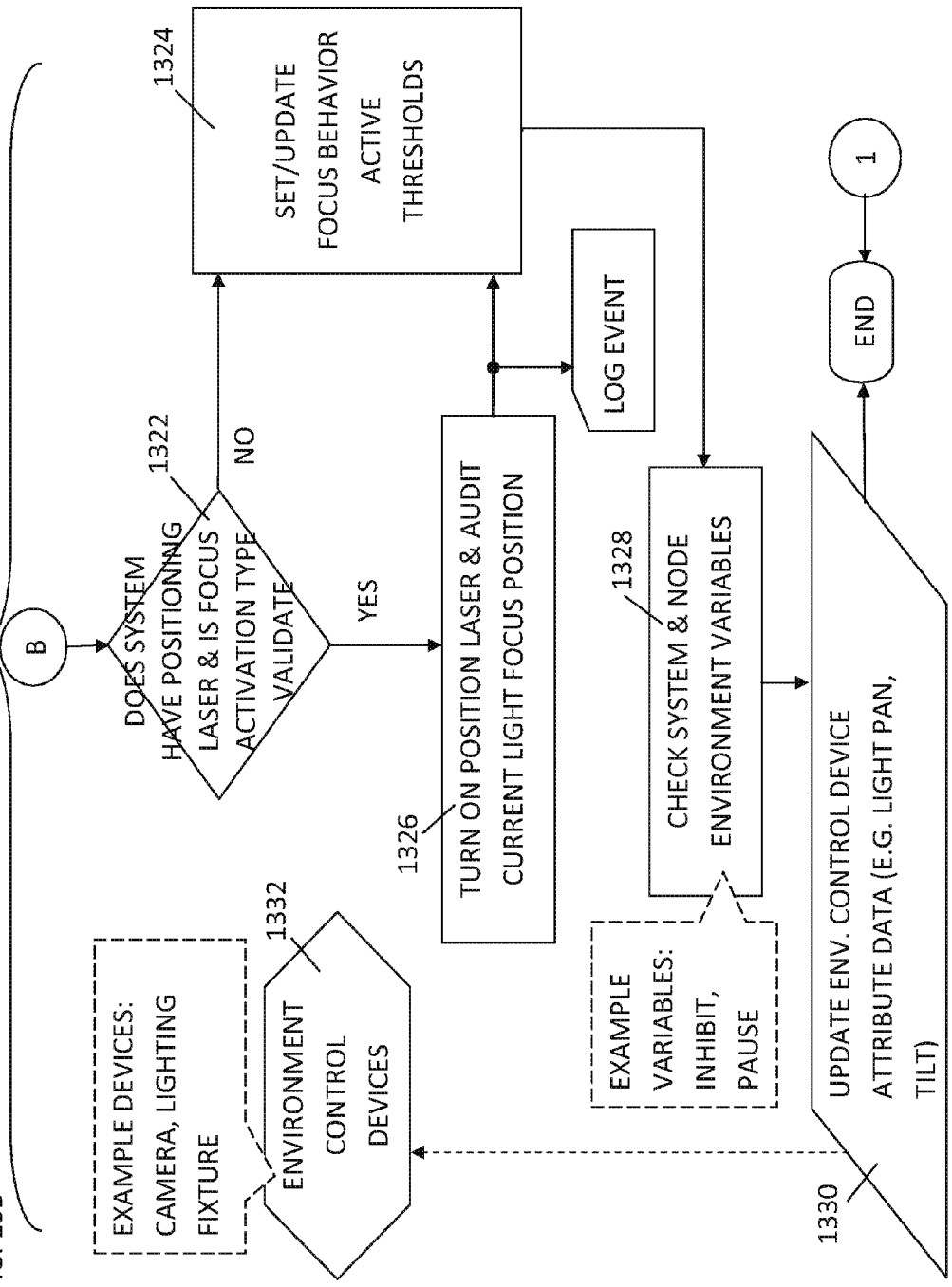

FIGS. 13d-13d" illustrate an embodiment of a flow diagram for focus behavior. Focus behavior can be enabled for a single control device or a device group. Example focus behavior control parameters include behavior type, activation type, activation threshold, sequence control and control threshold. Example focus behavior types include test mode, automatic mode or manual mode. In step 1301 a camera input is provided to the control system. In step 1302 it is determined if focused behavior is mapped to environmental control devices. If not, a log event is generated in step 1304 and the procedure ends. If yes, the procedure continues to step 1306 in which it is determined whether a camera or video stream is active. If not, a TRAX event alarm is posted providing device information in step 1307 and the procedure ends. If yes, the video frame image is captured and processed in step 1308. Example object attributes that may be obtained in step 1308 include size, color, edges, coordinates or shape of an object. In step 1310, it is determined if an object is observed in the video image frame. If yes, the image frame is evaluated against prior frames and feedback to this effect is provided as output in step 1312. In step 1316 the control system 100 may optionally receive environment monitoring control device input. This input may include data output from an RFID, monitored temperature, a monitored volume level, or any other parameter of the environment which may wish to be monitored. In step 1318, if enabled, the environmental data is merged with the data received from the evaluation of the image frame in step 1312. If in step 1310 it is determined that there is no object observed in the video image frame, the procedure continues to step 1311 in which it is determined if a target focus position has been provided. If no, a log event is generated and the procedure ends. If yes, the procedure proceeds to the aforedescribed step 1318. In step 1320 the control device, such as a lighting fixture is turned on, the iris setting is set to small, and pan and tilt values of the device are set to match the position of the observed object or specified location. In step 1322 it is determined if the system has a position laser and if focus activation type is validated. If no, the focus behavior active thresholds are set or updated. In particular embodiments, the focus behavior active thresholds include a setting of a predetermined time period for which mapped control device attributes are to be updated. If in step 1322 it is determined that the system does have a position laser and that focus activation type is validated, the procedure continues to step 1326 in which the position laser is turned on and the current light focus position is audited. The system then returns to step 1324. In step 1328 the system and node environment variables are checked. An example of such a variables are inhibit and pause. In step 1330 the environmental control device attribute data is updated. This environmental control device attribute data may include light pan and tilt. In step 1332 a particular environment control device is controlled. An example of such devices include a camera or a lighting fixture.

Figure 14A:
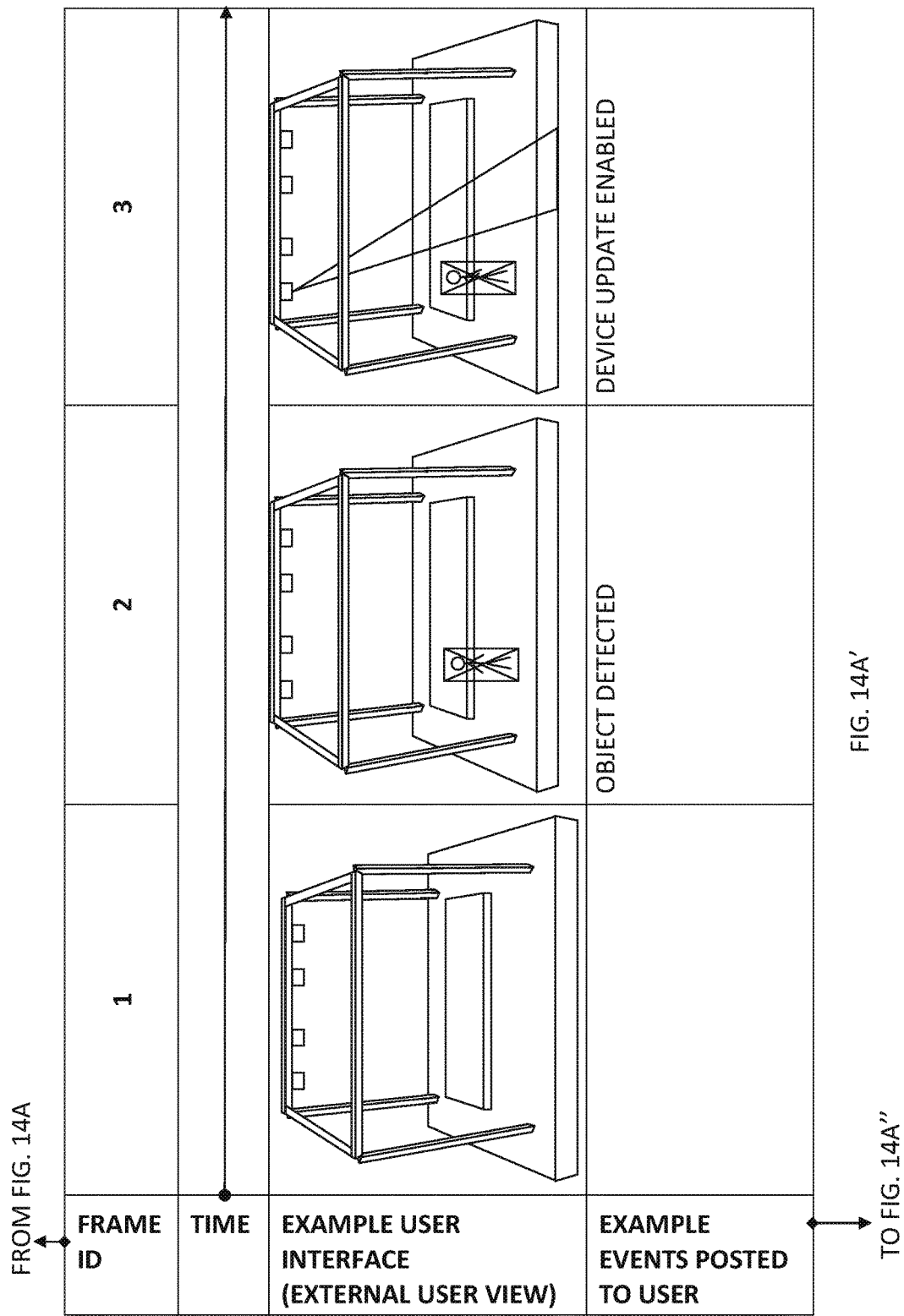
FIGS. 14a-14a" illustrate an example sequence for a gesture behavior function of the V2V-TRAX software module: environment attributes are updated based upon the observed objects gesture of pointing (other possible gestures include clap, jump, sit, stand, lay down)

FIGS. 14a-14a" illustrate an embodiment of a sequence for a gesture behavior function of the V2V-TRAX software module. Using such a function, an operator may update the attributes of devices in the control environment based upon the gesture, color, size, and/or shape of an object. For example, the control system 100 may be configured to strobe a particular light if an object gesture is a clap. In still other embodiments, the gesture, color and/or shape of an object at a given location may be used to update the attributes of devices in the control environment. For example, the control system may be configured to change the color of a light if an object gesture is a jump and the object is located in the area of center stage. In still other embodiments, the control system may be configured to trigger events in the environment based upon a gesture, color and/or shape of an object. For example, the system may be configured to change the color of a light in use if the object observed is a circle. Other examples of devices which may be controlled by the system include lighting fixtures, LED panels, cameras, security systems, and thermostats. The gesture behavior function may be used to map a particular gesture to a control device or group of devices such as lighting fixtures and to one or more of the given control devices attributes such as a light fixture's color and iris size. Examples of gestures include jumping, clapping, pointing, sitting, standing or laying down. An individual gesture may be a gesture observed relative to an individual object, an object in a given area, or as a group gesture where a gesture observed is relative to a group of objects or objects in a given area. Further detail of the V2V-TRAX Gesture Behavior function is described in the following table:

| | |
|---|---|
| Control System Service | V2V-TRAX |
| Tool Service Operation | Gesture Behavior |
| Example Control Capability Introduced | Update the attributes of devices in the control environment based upon<br>    The gesture, color, and or shape of an object (e.g. strobe a light if an object gesture is a clap)<br>    The gesture, color, and or shape of an object at a given location (e.g. change color of light if an object gesture is a jump and the object is located in the area of center stage)<br>Trigger events in the environment based upon<br>    The gesture, color, and or shape of an object (e.g. change the color of light in use if the object observed is a circle) |
| Key Components | *Control System: Provides computational power, storage, and user interfaces<br>Camera(s): Provides video and image input to computer vision pipeline tasks<br>    May be packaged with IMU, pressure, laser, and or GPS |
| Example Additional Components Utilized Based Upon Desired System Services and Control Capability | Additional Data Storage Units: Used to archive video and or audio streams<br>Head Set: Used to tell the system a location in the environment (e.g. Don's office, Downstage Center) where tool operation is mapped<br>Laser Pointer: Used to point to a location in the environment where tool operation is mapped; Used to point to or select (e.g. circle) an object in the environment<br>Touch Panel: Used as a control interface to select objects, zones, locations, and lines<br>Sensors: IMU, pressure, RFID, color, and temperature sensors may be used for additional attributes of devices in the environment |
| Example Devices Controlled by the System | Lighting Fixtures, LED Panels, Cameras, Security Systems, Thermostats |
| Example General Tool Service Provisioning Steps | Map the tool service, Gesture Behavior, to a control device or group of devices (e.g. Lighting Fixture(s)) and to one or more of the given control device's attributes (e.g. Light Fixture(s) color and iris size) |
| Example Tool Control Parameters | Behavior Type: Individual, Group<br>Activation Type: Automatic, Manual, Copy, Auto-Specific, Rotation/Angle<br>Activation Threshold: Control parameter used to qualify when attribute updates are qualified for posting/sending<br>Clear Threshold: Control parameter used to qualify when attribute updates should stop<br>Duration Type: Control parameter used to specify complex or linked operations<br>Duration Threshold: Control parameter used to manage duration of updates or control based upon duration type<br>Gesture: Control parameter used to specify the gesture type for an object (examples: jump, clap, point, sit, stand, lay down) |

| Service Tool Type & Control Device Update Criteria | Example Service Tool Type Provisioning Methods |
|---|---|
| Example Tool Control Behavior Types | Individual: Gesture observed relative to an individual object or object in a given area<br>Group: Gesture observed relative to a group of objects or objects in a given area | Gesture recognition can be configured via a system control interface |

Referring to FIGS. 14a-14a", in a frame ID 1, the system has mapped the object gesture pointing to represent a person holding their arm out in a given direction. In frame ID 2, an object is detected and an indication of the detected object is shown in the user interface. In frame ID 3, the observed object holds his or her arm out towards the audience and points in a particular direction. In response the system obtains a gesture pointing object attribute. The control system then updates the device associated with that gesture by positioning the lighting fixture in the direction pointed to by the observed object. This is performed by mapping the environment attribute gesture to send pan, tilt and focus data to the selected control lighting fixture.

Figure 14B:
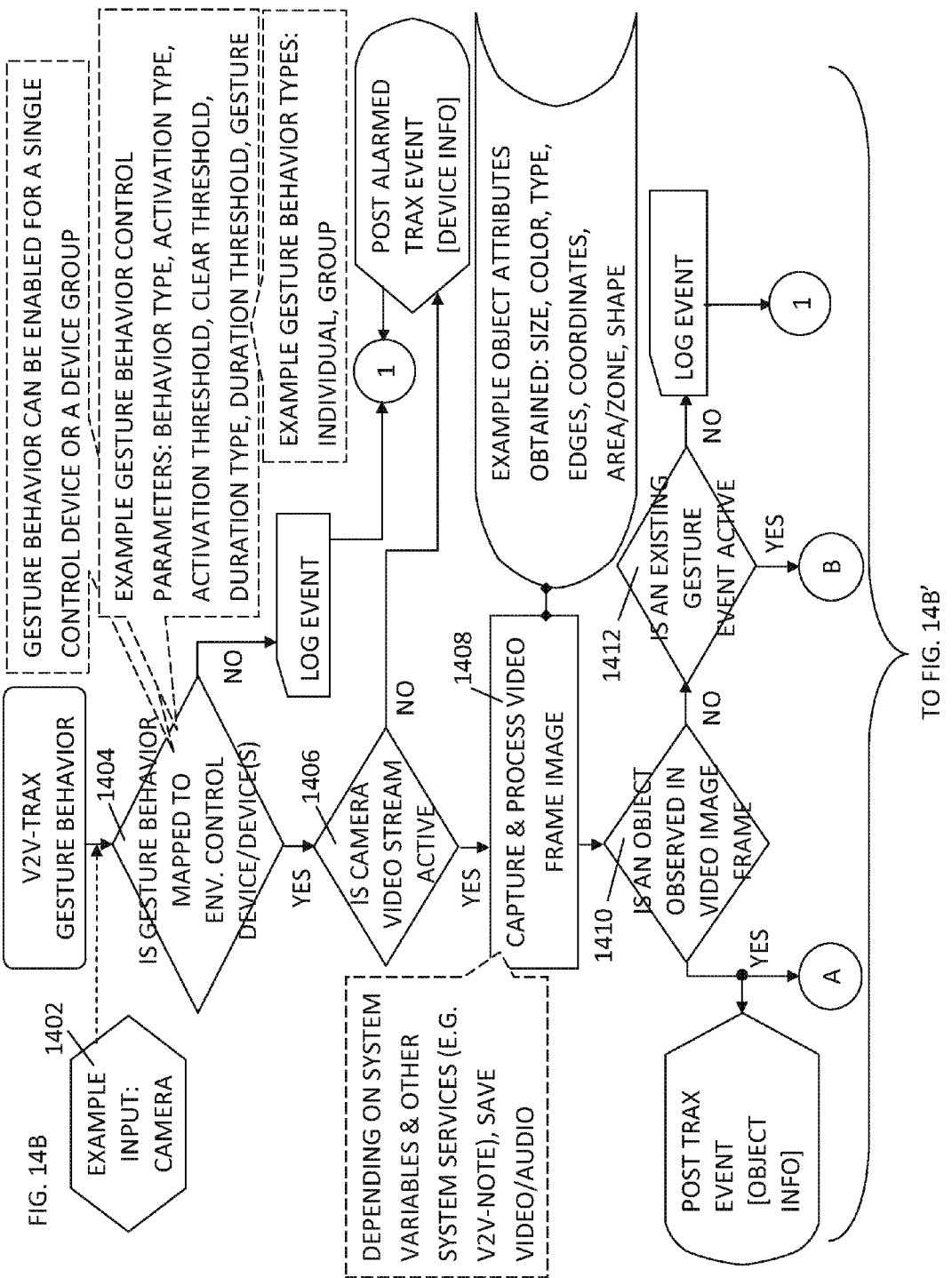
FIGS. 14b-14b' illustrate a flow chart of an embodiment of the gesture control behavior.
Figure 14B:
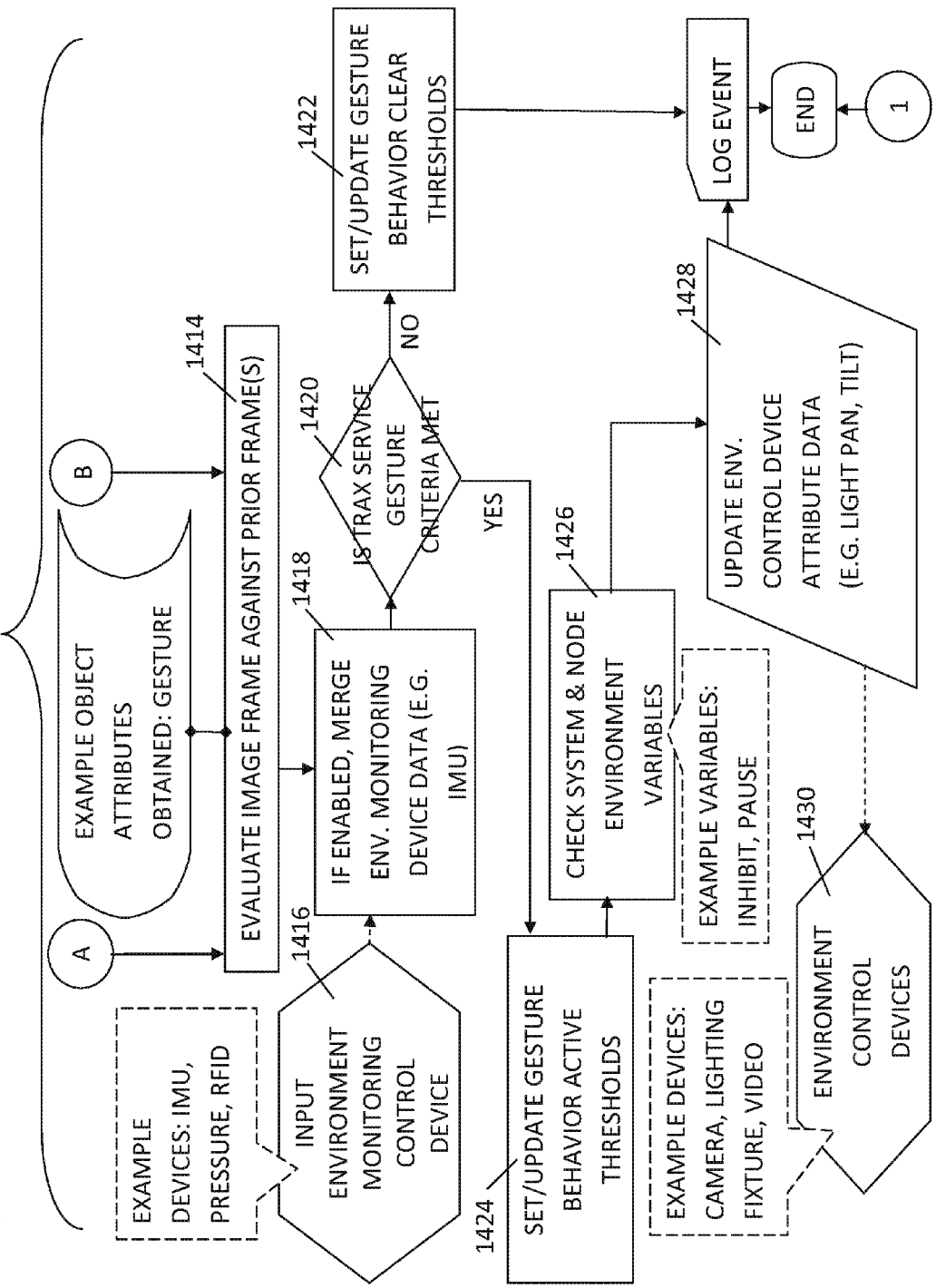

FIGS. 14b-14b' illustrate a flow chart of an embodiment of the gesture control behavior. In step 1402, the control system 100 receives a camera input which includes one or more images of the control environment. In step 1404 it is determined whether there is gesture behavior mapped to environmental control devices. Gesture behavior can be enabled for a single control device or a device group. Examples of gesture behavior control parameters include behavior type, activation type, activation threshold, clear threshold, duration type, duration threshold and gesture. Example gesture behavior types may include individual or group behavior types. If the answer is determined to be no in step 1404, a log event is generated and the procedure ends. If it is determined to be yes in step 1404, the procedure continues to step 1406 in which it is determined whether the camera video stream is active. If the camera video stream is not active, a TRAX event alarm is posted related device information is generated and the procedure ends. If the camera video stream is indicated as active, the procedure continues to step 1408 in which the video frame image is captured and processed to determine whether there are any objects observed in the frame. Example object attributes which may be obtained during the processing include size, color, type, edges, coordinates, area/zone and shape.

In step 1410 it is determined if there is an object observed in the video frame image. If the answer is no then in step 1412 it is determined whether there is an existing gesture event active. If not, a log is generated and the procedure ends. If yes, the procedure continues to step 1414. If in step 1410 it is determined that an object is observed in the video image frame, the procedure also continues to step 1414 and a TRAX event is posted indicating that an object has been found may be generated and output to the user. In step 1416 optional environment control device data may be put into the system and in step 1418, if enabled, the environmental monitoring device data may be merged with the information obtained from processing the video frame image. An example of environmental monitoring device data may include data from an IMU. In step 1420 it is determined whether criteria for a certain gesture has been met. If not, the process continues to step 1422 in which gesture behavior clear thresholds are either set or updated and a log event is generated and a procedure ends. If it is determined in step 1422 that gesture criteria have been met, the system continues to step 1424 in which gesture behavior active thresholds are either set or updated. In step 1426 system and node environment variables are checked. Examples of variables include inhibit and pause. In step 1428 environmental control device attribute data is updated. Examples of attribute data include light pan and tilt parameters. In step 1430, environment control devices are controlled in accordance with the device attribute data. Example devices include cameras, lighting fixtures and video streams.

FIGS. 15a-15d'' illustrate an embodiment of sequences of a proximity behavior function of the V2V-TRAX software module. The proximity behavior function allows the update of attributes of devices in the control environment based upon the relationship, i.e., distance, between objects observed in the environment. For example, light behavior like color or intensity can be controlled based upon the distance between objects. The proximity behavior function can also update attributes of control devices based upon the distance between an object and a reference point or area or based upon the size, color, shape, motion and/or direction of an object observed in the environment. For example, selecting a particular light color based upon the height or color of an observed object. In other embodiments the attributes of devices in the control environment can be updated based on parameters that define a space or operational containment area. For example, a dark zone could represent an area where a television camera may reside so light beams should not take a direct path across the area to prevent camera spot blindness.

The attributes of devices in the control environment may also be updated based upon attributes defined for devices in a specified zone. For example, based upon attributes defined for devices in a specified reference zone, the attributes for devices specified in the target zone may be mirrored, copied, inverted or other changes may be applied. For example, attributes can be updated to use the same colors present in the specified reference zone in other environment target zones by performing a copy operation. The proximity behavior function may also be used to trigger events in the environment based upon the location of an object observed in the environment. For example, a trigger event may be set to turn on lights when an object reaches a specific location or to change LED panel colors based upon the location of an object relative to a given panel or to a set of panels. A trigger event may be set based upon a relationship, i.e., distance, between objects observed in the environment. For example, the system may be configured to turn off particular lights when selected objects are more than five feet apart. The distance relationship can be relative to two objects or between an object and a reference point or area. Other trigger events may be set based upon the size, color, shape, motion and/or direction of an object observed in the environment. For example, the system may be configured to dim lights when motion of a particular object is detected upstage. In still other embodiments, a trigger event may be set based upon an objects relationship to a specific line. For example, the system may be configured to start a snow effect when an actor walks past a door threshold. Further description of the V2V-TRAX Proximity Behavior function is described in the following table:

| | |
|---|---|
| Control System Service | V2V-TRAX |
| Tool Service Operation | Proximity Behavior |
| Example Control Capability Introduced | Update the attributes of devices in the control environment based upon<br>    The relationship (i.e. distance) between objects observed in the environment<br>    (e.g. light behavior, like color or intensity, can be controlled based upon the<br>    distance between objects; relationship can also be based on the distance<br>    between an object and a reference point or area)<br>    The size, color, shape, motion, and or direction of an object observed in the<br>    environment (e.g. light color can be selected based upon the height or color<br>    of an object observed)<br>    The parameters that define a space or operational containment area (e.g. a<br>    dark zone can represent the area where a television camera may reside so<br>    light beams should not take a direct path across the area to prevent camera<br>    spot blindness)<br>    The attributes defined for devices in a specified zone<br>        Mirror, copy, invert, or apply other changes to devices in the control<br>        environment based upon the attributes defined for the specified zone<br>        (e.g. use the same colors present in the specified zone in other<br>        environment zones by performing a copy operation)<br>Trigger events in the environment based upon<br>    The location of an object observed in the environment (e.g. turn on lights<br>    when an object reaches a specific location, change LED panel colors based<br>    upon the location of an object relative to a given panel or set of panels)<br>    The relationship (i.e. distance) between objects observed in the environment<br>    (e.g. turn off lights when objects more than 5' apart); the distance<br>    relationship can be relative to two objects or between an object and a<br>    reference point or area |

-continued

| | |
|---|---|
| Control System Service | V2V-TRAX |
| Tool Service Operation | Proximity Behavior |

| | |
|---|---|
| | The size, color, shape, motion, and or direction of an object observed in the environment (e.g. dim lights when motion of object is upstage) |
| | Object relationship to a specific line (e.g. start snow when actor walks past door threshold) |
| Key Components | * Control System: Provides computational power, storage, and user interfaces |
| | Camera(s): Provides video and image input to computer vision pipeline tasks May be packaged with IMU, pressure, laser, and or GPS |
| Example Additional Components Utilized Based Upon Desired System Services and Control Capability | Additional Data Storage Units: Used to archive video and or audio streams |
| | Head Set: Used to tell the system a location in the environment (e.g. Don's office, Downstage Center) where tool operation is mapped |
| | Laser Pointer: Used to point to a location in the environment where tool operation is mapped; Used to point to or select (e.g. circle) an object in the environment |
| | Touch Panel: Used as a control interface to select objects, zones, locations, and lines |
| | Sensors: IMU, pressure, GPS, RFID, color, and temperature sensors may be used for additional attributes of objects in the environment |
| Example Devices Controlled by the System | Lighting Fixtures, LED Panels, Cameras, Security Systems, Thermostats |
| Example General Tool Service Provisioning Steps | Map the tool service, Proximity Behavior, to a control device or group of devices (e.g. Lighting Fixture(s)) and to one or more of the given control device's attributes (e.g. Light Fixture(s) Focus Parameters = Pan and Tilt) |
| Example Tool Control Parameters | Behavior Type: Zone, Location, Trip Line, Object |
| | Activation Type: Automatic, Manual, Copy, Auto-Specific, Rotation/Angle |
| | Activation Threshold: Control parameter used to qualify when attribute updates are qualified for posting/sending |
| | Clear Threshold: Control parameter used to qualify when attribute updates should stop |
| | Duration Type: Control parameter used to specify complex or linked operations |
| | Duration Threshold: Control parameter used to manage duration of updates or control based upon duration type |
| | Control Curve: Control parameter used to manage operation across a group of devices to normalize or smooth the capability (e.g. pan or tilt control curve value smoothing) |

| | Service Tool Type & Control Device Update Criteria | Example Service Tool Type Provisioning Methods |
|---|---|---|
| Example Tool Control Behavior Types | Zone: An object has entered a defined zone or area in the control environment and the control constraints have been met (e.g. the object stayed within the zone the required amount of time) | A zone can be a predefined region of space, defined by outlining the area with a laser pointer, by telling the system the name of a zone, or by specifying an area via a control interface |
| | Location: An object is at a defined location in the control environment and the control constraints have been met (e.g. the object stayed at the location for required time) | A location can be a predefined spot, defined by pointing a laser pointer to a location, by telling the system a specific location, or by specifying the location via a control interface |
| | Trip Line: An object has crossed a line that delimits or defines a given location in the environment | A trip line can be a predefined line location, drawn with a laser, specified by telling the system a line location, or specifying the location via a control interface |
| | Object: An object is at a defined distance from another object, zone, location, or trip line and the control constraints have been met | An object can be predefined to the system, selected by the user telling the system which object to use, or by selecting an object via a control interface |

FIGS. 15a-15a" illustrate an embodiment of an example sequence showing a light group operation mapped to an observed objects predefined target location. In frame ID 1, a baseline image of the entertainment environment is displayed. In frame ID 2, an object is detected within the environment and the size, location, color, shape or edges of the object are acquired as object attributes. In the user interface, an indication is provided that an object has been detected. In frame ID 3 as the object moves across the stage, object attributes including trajectory, motion, angle and location are obtained. When the object moves to a predefined location, a light group mapped to that specific location is turned on. In this example, the predefined target location for the object is represented by an oval.

Figure 15B:
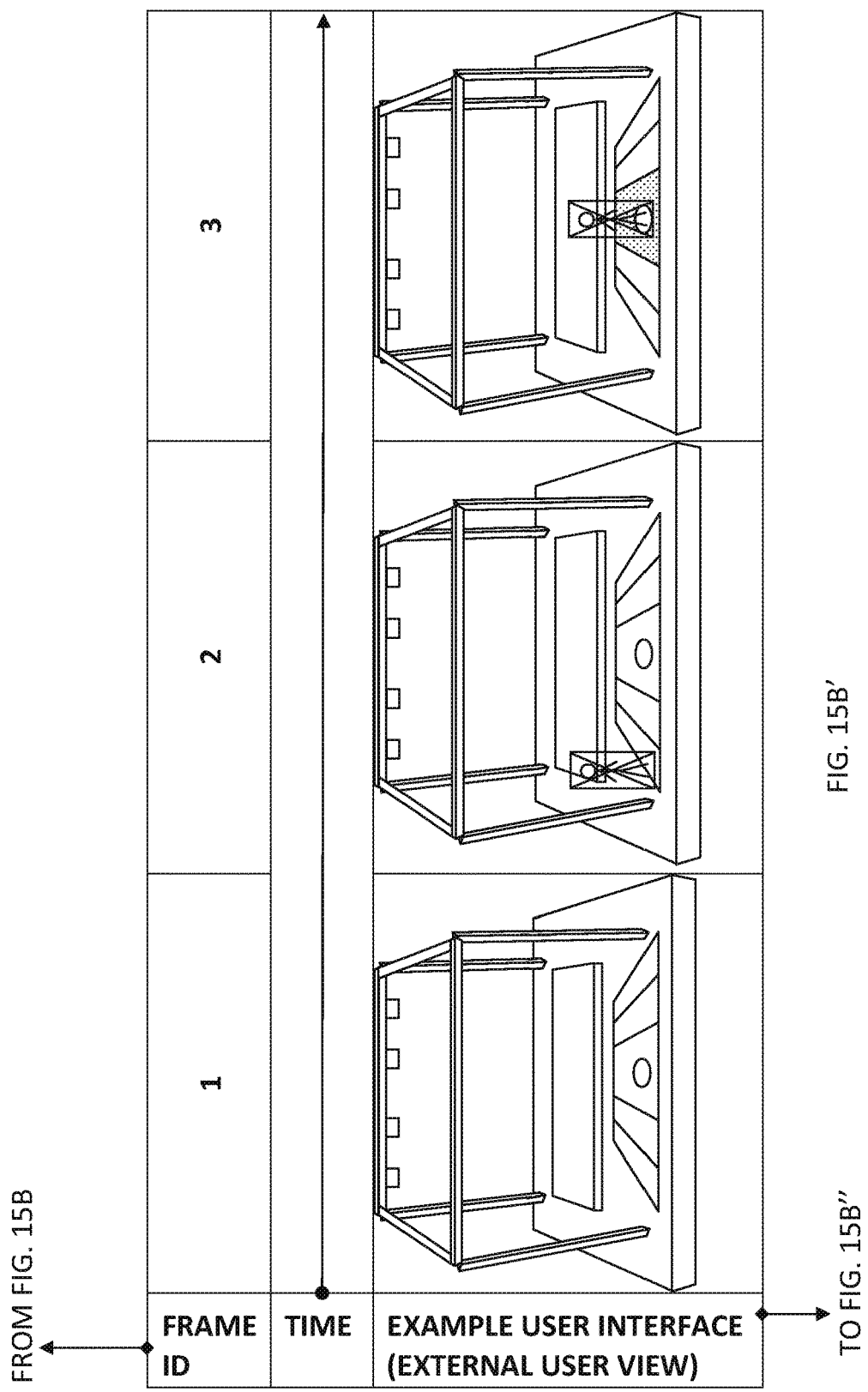
FIGS. 15b-15b" illustrate an example sequence of the proximity behavior function of the V2V-TRAX software module where an environment LED panel is updated based the relationship of an observed object and a predefined zone or area.

FIGS. 15b-15b'' illustrate an embodiment of a sequence for updating LED panels based upon the location of an observed object relative to a predefined area or zone. In some embodiments, the location of an observed object could be determined from pressure sensors assuming the floor structure of the stage was equipped with them. In the embodiment illustrated in FIGS. 15b-15b'', LED panels are placed on the stage. When a detected object moves into an enabled target area or zone, one or more LED panels are enabled causing them to light up. In this example, the predefined target location for the object is represented by an oval.

Figure 15C:
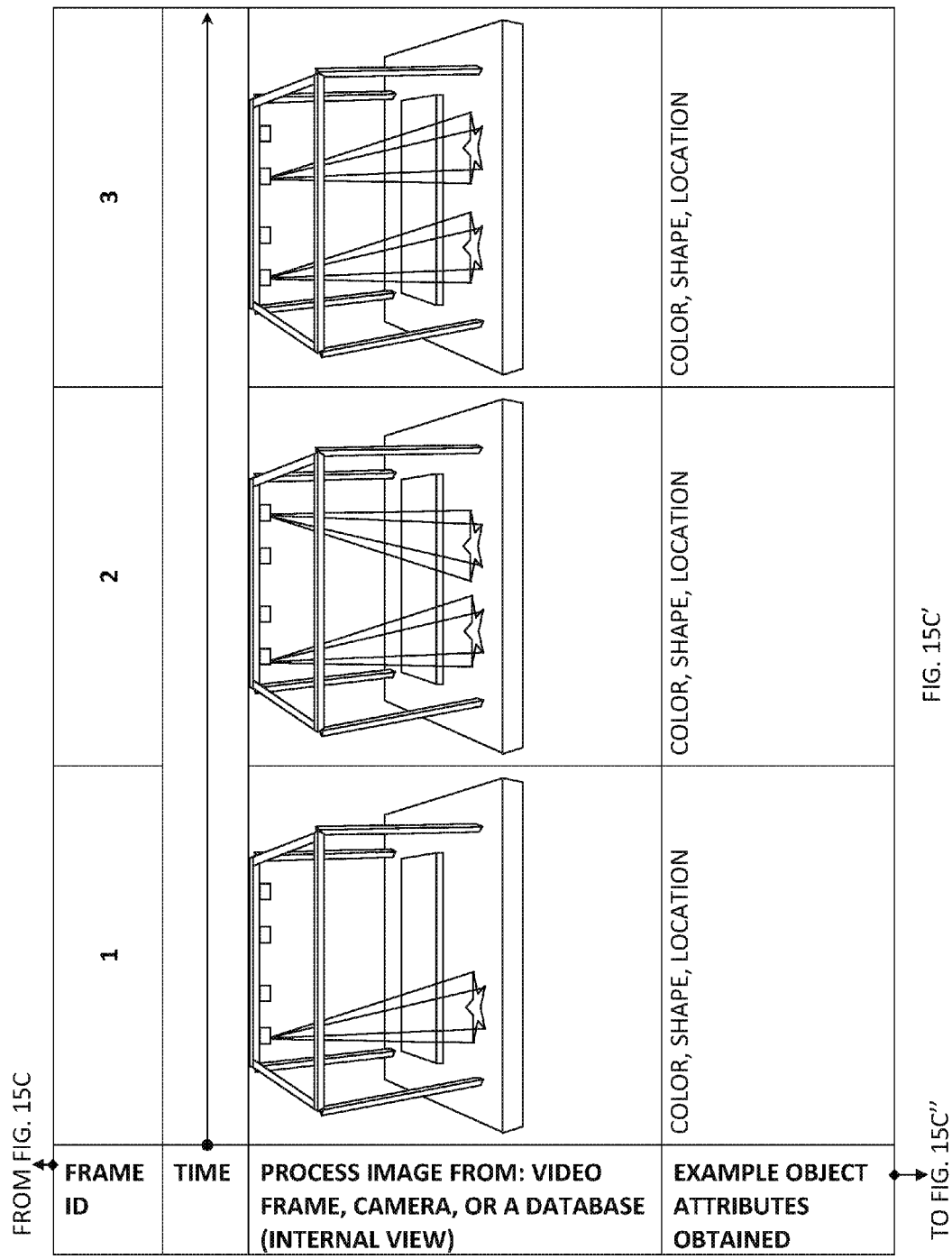
FIGS. 15c-15c'" illustrate an example sequence of the proximity behavior function of the V2V-TRAX software module where a light, located in a predefined target zone, has its attributes updated based the attributes of an observed device (light) located in a predefined reference zone.
Figure 15C:
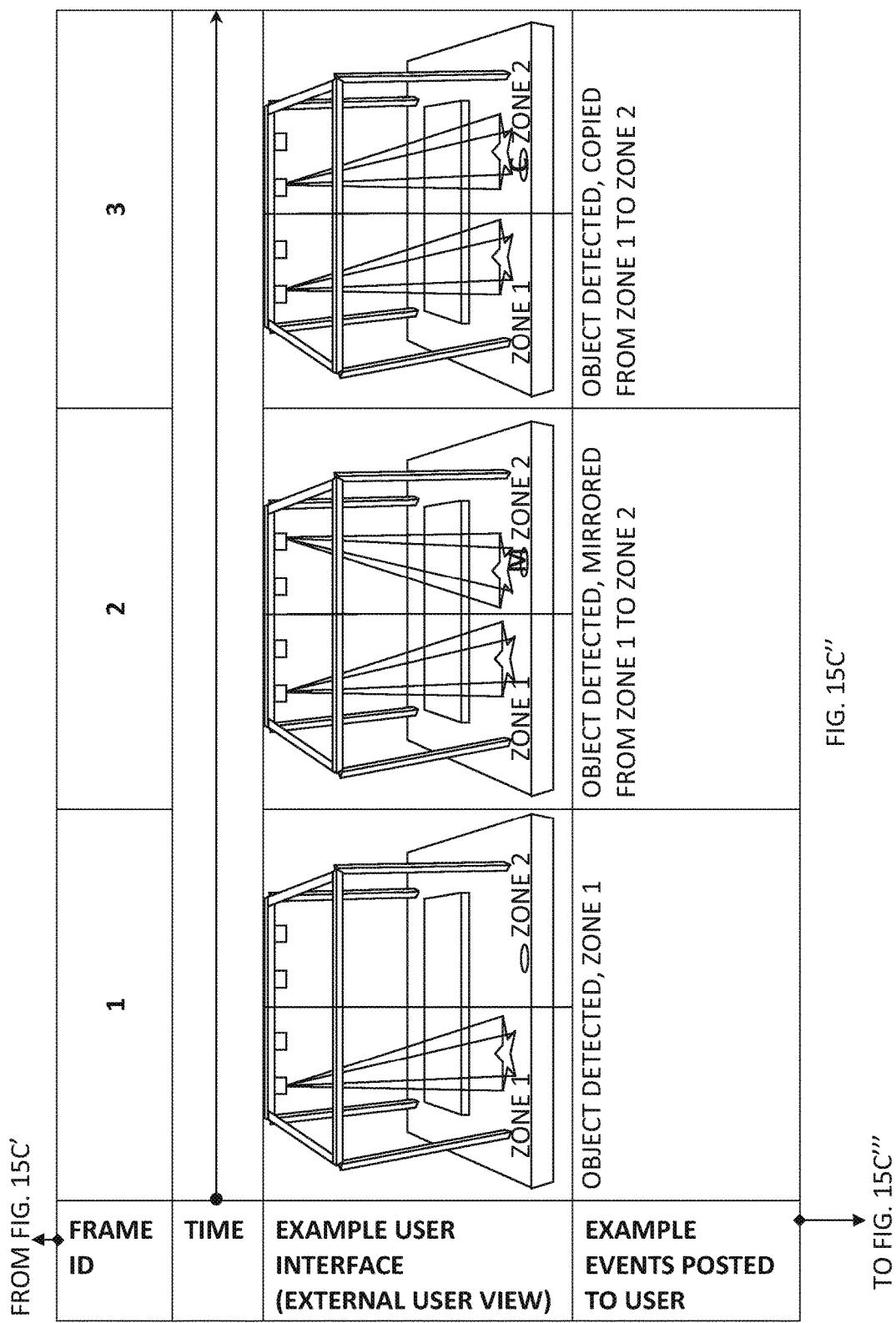

FIGS. 15c-15c' illustrate an embodiment of a sequence for managing how attributes are set on a mapped lighting fixture based upon the attributes of a fixture in a preselected reference zone or area. In frame ID 1 a user turns on a light and sets the color, location and shape of the light. In the particular illustration, the light is located in a Zone 1 and is shaped as a star. The star is detected as an object and attributes of color, shape and location are obtained. An indication is given to the user that the object has been detected in Zone 1. In frame ID 2, the user sets a zone mapping mode and sets a function to mirror Zone 1 to Zone 2. The system then mirrors the settings from Zone 1 to Zone 2. In frame ID 3, the user sets the zone mapping mode to copy Zone 1 to Zone 2 and a user is given an indication that the object has been detected and copied from Zone 1 to Zone 2.

Figure 15D:
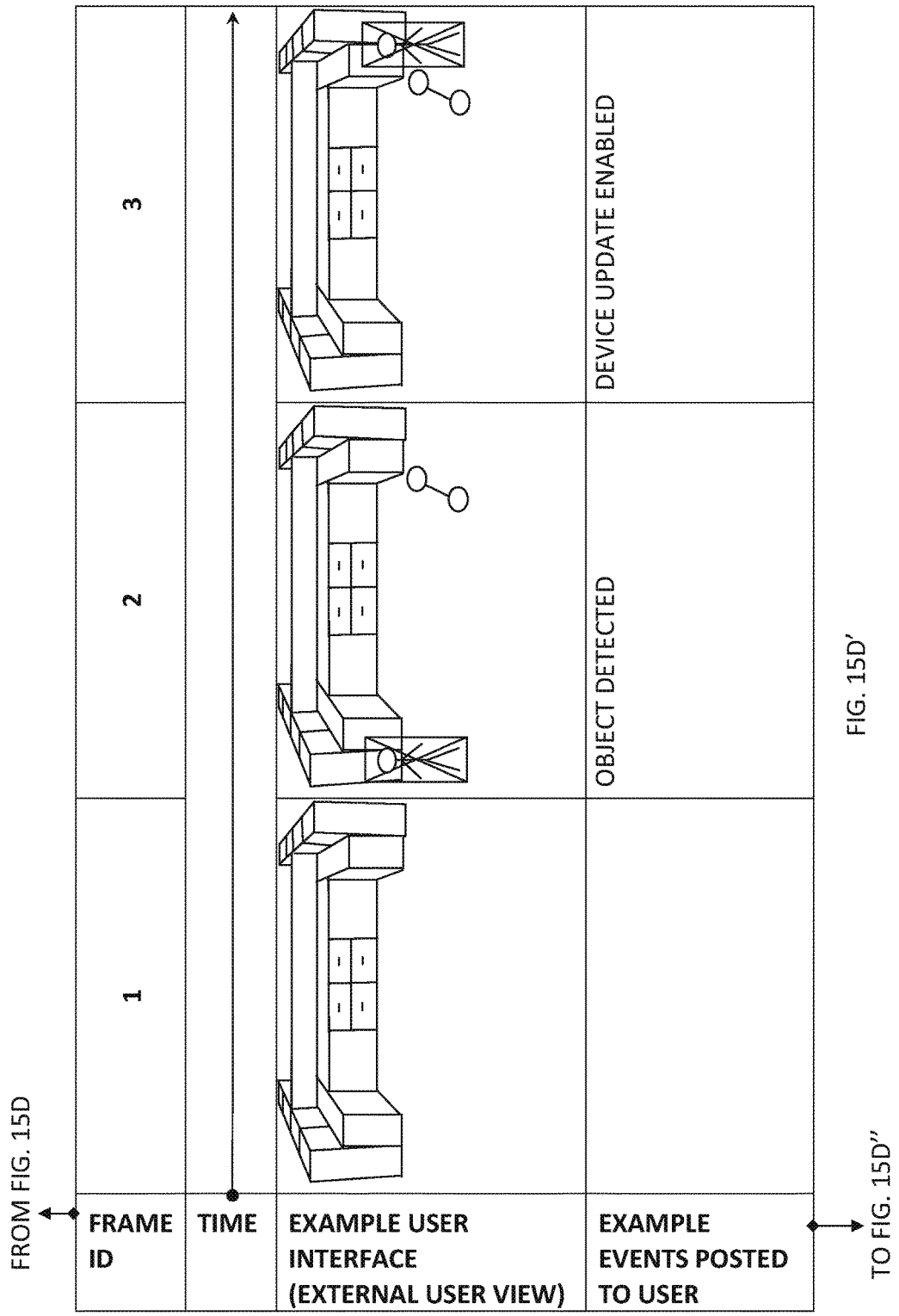
FIGS. 15d-15d" illustrate an example sequence of the proximity behavior function of the V2V-TRAX software module where a discrete environment control device (e.g. alarm) attribute is updated based upon an observed object's relationship to a predefined trip line location.

FIGS. 15d-15d'' illustrate an embodiment of a sequence showing how a trip line location may be utilized to trigger an alarm indicator if an object moves past the defined trip line. In frame ID 1 a baseline image of an office environment is shown. In frame ID 2 the user defines a trip line location using the user interface and maps the trip line location to a device alarm attribute. An object is detected in frame ID 2-attributes of the object include location size, shape, and location. When an objected detected within the environment moves to a location past the trip line based on object attributes such as trajectory, motion and location, a trip line alarm is enabled.

Figure 15E:
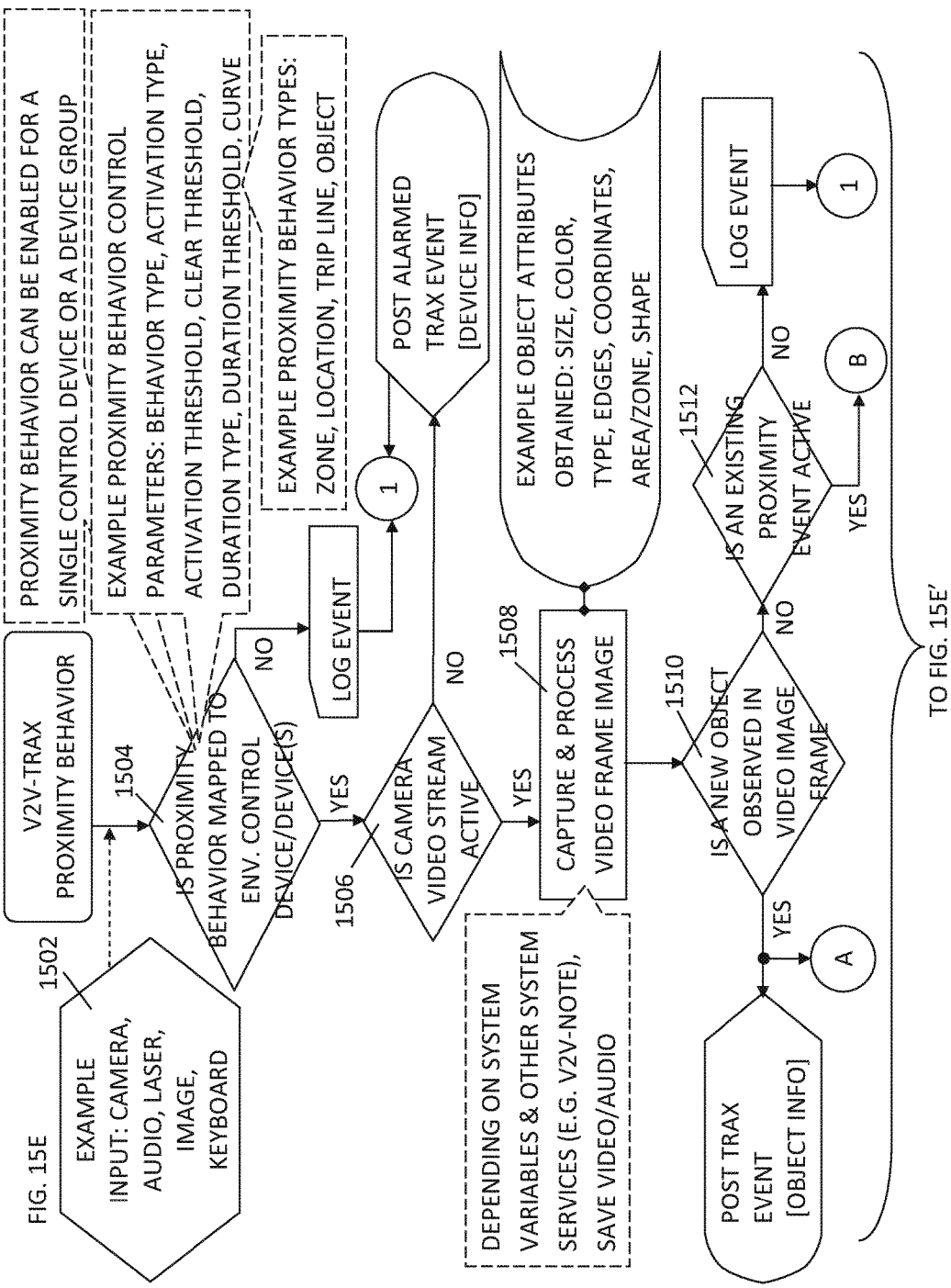
FIGS. 15e-15e' illustrate an embodiment of a flow chart for the proximity behavior function of the V2V-TRAX.
Figure 15E:
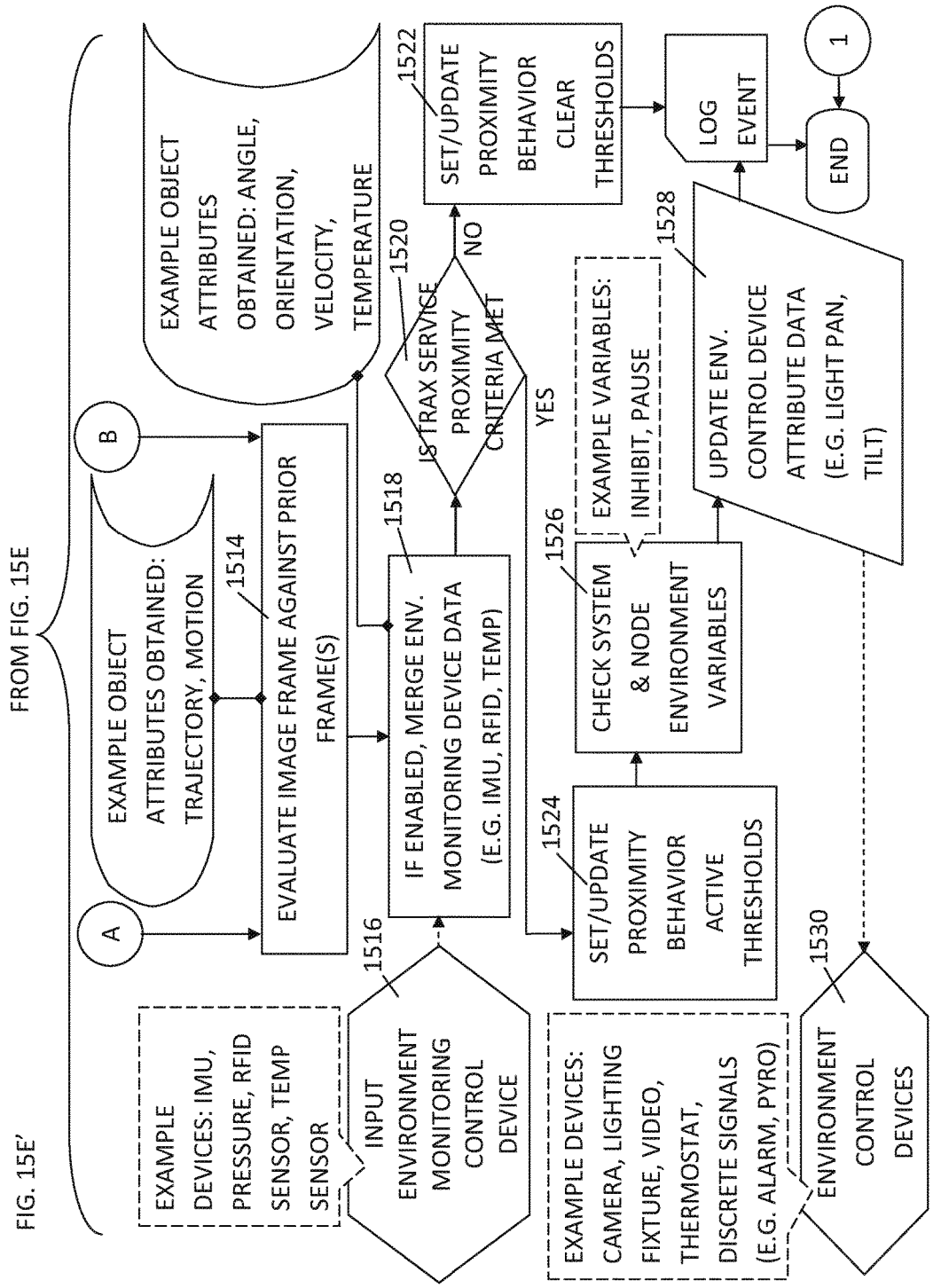

FIGS. 15e-15e' illustrate an embodiment of a flow chart for the proximity behavior function of the V2V-TRAX software module. In step 1502 an input, such as from a camera, audio, laser, image or keyboard, is obtained by the control system 100. In step 1504 it is determined whether a proximity behavior has been mapped to environmental control devices. Proximity behavior can be enabled for a single control device or a device group. Example proximity behavior control parameters include behavior type, activation type, activation threshold, clear threshold, duration type, duration threshold and curve. Example proximity behavior types may include zone, location, trip line or object. If in step 1504 it is determined that the answer is no, a log event is generated and the procedure ends. If the answer in step 1504 is yes, the process continues to step 1506 in which it is determined whether the camera video stream is active. If no, a TRAX alarm event is posted and the procedure ends. If yes, the procedure continues to step 1508 in which a video frame image is captured and processed. During processing the attributes of any objects within the video frame image are obtained. These object attributes may include size, color, type, edges, coordinates, area/zone or shape. In step 1510 it is determined whether a new object is observed in the video frame image. If not, the procedure continues to step 1512 in which it is determined whether an existing proximity event is active. If no, a log event is generated and the procedure ends. If yes, the procedure continues to step 1514. If the answer in step 1510 is yes, then the procedure also continues to step 1514. In step 1514 the image frame is evaluated against prior frames to determine additional object attributes such as trajectory and motion. In an optional step, 1516, environment monitoring control device data may be input. If enabled, in step 1518, this environmental monitoring device data may be merged with the object attributes previously obtained. Additional object data that may be obtained by the environment monitoring control device includes angle, orientation, velocity and temperature of an object. In step 1520 it is determined whether proximity criteria has been met. If not, the procedure continues to step 1522 in which proximity behavior clear thresholds are set or updated. A log event is then generated and the procedure ends. If in step 1520 the proximity criteria has been met, the procedure continues to step 1524 in which proximity behavior active thresholds are set or updated. In step 1526 system and node environment variables are checked. Examples of environment variables include inhibit and pause. In step 1528 the environment control device attribute data such as light pan and tilt is updated. In step 1530 environment control devices are controlled in accordance with the proximity data obtained by the procedure. Examples of control devices include cameras, lighting fixtures, video, thermostats and other discrete signals such as alarms and the activation of pyrotechnic displays.

Figure 16A:
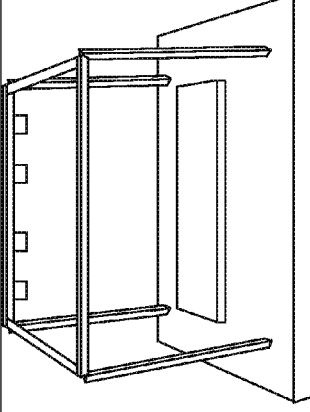
FIGS. 16a-16a" illustrate an embodiment of tracking behavior function for the V2V-TRAX software module where lights in the environment are updated based upon the observation of an object and its associated position.
Figure 16B:
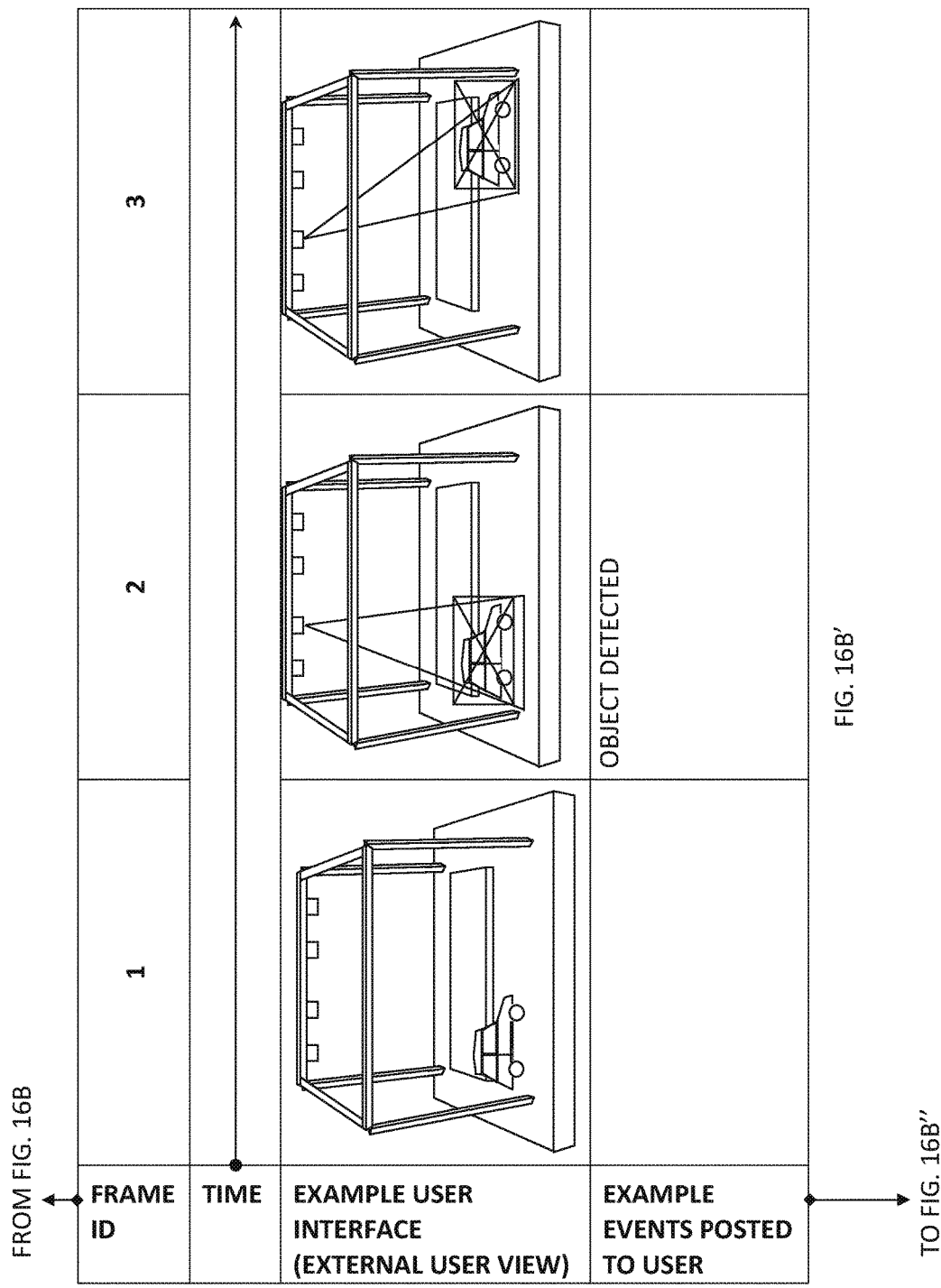
FIGS. 16b-16b" illustrate an embodiment of tracking behavior function for the V2V-TRAX software module where lights are being updated relative to the position of an object in the environment where object selection was done by circling the object with a laser.

FIGS. 16a-16b'' illustrate an embodiment of a tracking behavior function for the V2V-TRAX software module. Using the tracking behavior function, the attributes of the devices in the control environment may be updated based upon the location of an object observed in the environment. For example, moving lights will track an object similar to the operation of follow spots. In other embodiments, the attributes of devices may be updated based upon the relationship, i.e., distance, between objects observed in the environment. For example, light tracking can be conditionally controlled based upon the distance between objects. Relationships can also be based upon the distance from the object and a reference point or area. The attributes of devices in the control environment can be updated based upon the size, color, shape, motion and/or direction of an object observed in the environment. For example, a tracking light color can be selected based upon the height or color of an object observed. The tracking behavior function may be also used to set trigger events advancing environment attributes based upon the location of an object observed in the environment. For example, a system can be configured to begin tracking and turn on lights when an object reaches a specified location or change LED panel colors based upon the location of an object relative to a given panel or several panels.

In other embodiments, trigger events in an environment may be based upon the relationship, i.e., distance, between objects observed in the environment. For example, the system may be configured to turn off lights, i.e., stop tracking when objects are more than five feet apart. The distance relationship can be relative to two objects or between an object and a reference point or area. In still other embodiments, trigger events in the environment may be based upon the size, color, shape, motion and/or direction of an object observed in the environment. For example, a system may be configured to dim lights when motion of an object is upstage. Further description of the V2V-TRAX Tracking Behavior function is described in the following table:

| | |
|---|---|
| Control System Service | V2V-TRAX |
| Tool Service Operation | Tracking Behavior |
| Example Control Capability Introduced | Update the attributes of devices in the control environment based upon<br>    The location of an object observed in the environment (e.g. moving lights will track an object similar to the operation of follow spots)<br>    The relationship (i.e. distance) between objects observed in the environment (e.g. light tracking can be conditionally controlled based upon the distance between objects; relationship can also be based upon the distance between an object and a reference point or area)<br>    The size, color, shape, motion, and or direction of an object observed in the environment (e.g. the tracking light color can be selected based upon the height or color of an object observed)<br>Trigger events in the environment based upon<br>    The location of an object observed in the environment (e.g. begin tracking and turn on lights when an object reaches a specific location, change LED panel colors based upon the location of an object relative to a given panel or set of panels)<br>    The relationship (e.g. distance) between objects observed in the environment (e.g. turn off lights (i.e. stop tracking) when objects more than 5' apart); the distance relationship can be relative to two objects or between an object and a reference point or area<br>    The size, color, shape, motion, and or direction of an object observed in the environment (e.g. dim lights when motion of object is upstage) |
| Key Components | *Control System: Provides computational power, storage, and user interfaces<br>Camera(s): Provides video and image input to computer vision pipeline tasks<br>    May be packaged with IMU, pressure, laser, and or GPS |
| Example Additional Components Utilized Based Upon Desired System Services and Control Capability | Additional Data Storage Units: Used to archive video and or audio streams<br>Head Set: Used to tell the system a location in the environment (e.g. Don's office, Downstage Center) where tool operation is mapped<br>Laser Pointer: Used to point to a location in the environment where tool operation is mapped; Used to point to or select (e.g. circle) an object in the environment<br>Touch Panel: Used as a control interface to select objects, zones, locations, and lines<br>Sensors: IMU, pressure, RFID, color, and temperature sensors may be used for additional attributes of devices in the environment |
| Example Devices Controlled by the System | Lighting Fixtures, LED Panels, Cameras, Security Systems, Thermostats |
| Example General Tool Service Provisioning Steps | Map the tool service, Tracking Behavior, to a control device or group of devices (e.g. Lighting Fixture(s)) and to one or more of the given control device's attributes (e.g. Light Fixture(s) Focus Parameters = Pan and Tilt) |
| Example Tool Control Parameters | Behavior Type: Continuous, Contingent<br>Activation Type: Automatic, Manual, Copy, Auto-Specific, Rotation/Angle<br>Activation Threshold: Control parameter used to qualify when attribute updates are qualified for posting/sending<br>Clear Threshold: Control parameter used to qualify when attribute updates should stop<br>Duration Type: Control parameter used to specify complex or linked operations<br>Duration Threshold: Control parameter used to manage duration of updates or control based upon duration type<br>Control Curve: Control parameter used to manage operation across a group of devices to normalize or smooth the capability (e.g. pan or tilt control curve value smoothing) |

| | Service Tool Type & Control Device Update Criteria | Example Service Tool Type Provisioning Methods |
|---|---|---|
| Example Tool Control Behavior Types | Continuous: Tracking, once triggered, will operate continuously | Continuous tracking can be configured via a system control interface |
| | Contingent: The trigger to track an observed object is contingent upon a control parameter (e.g. distance to another object, or location in environment) | Contingent tracking can be configured via a system control interface |

FIGS. 16a-16a" illustrates an embodiment of a sequence showing light beams tracking the position of an object. In frame ID 1 a baseline image is obtained. In frame ID 2 an object is detected and a group update is enabled to set the device attributes to map a light group to the object. Environment device control attribute updates are sent to update the pan, tilt and focus data on each of the lights within the light group to focus their respective lights on the detected object. As illustrated in frame ID 3, as the object moves across the stage, the lights continue to track it.

FIGS. 16b-16b" illustrates an embodiment of a sequence in which a user selects moving scenery as an object to track by circling it with the laser pointer. If the moving scenery is comprised of one piece with clear boundaries the laser can simply be pointed to the piece of scenery. In frame ID 1 the user places scenery in the environment. In the particularly illustrated embodiment, the scenery is a car. In frame ID 2 the user circles the car scenery with a laser pointer. In response the control system 100 detects the object and maps light focus data such as pan and tilt to the detected object. As can be seen in frame ID 3, as the object moves through the environment the light focus is updated to follow the object based upon trajectory and motion attributes obtained from the object.

Figure 16C:
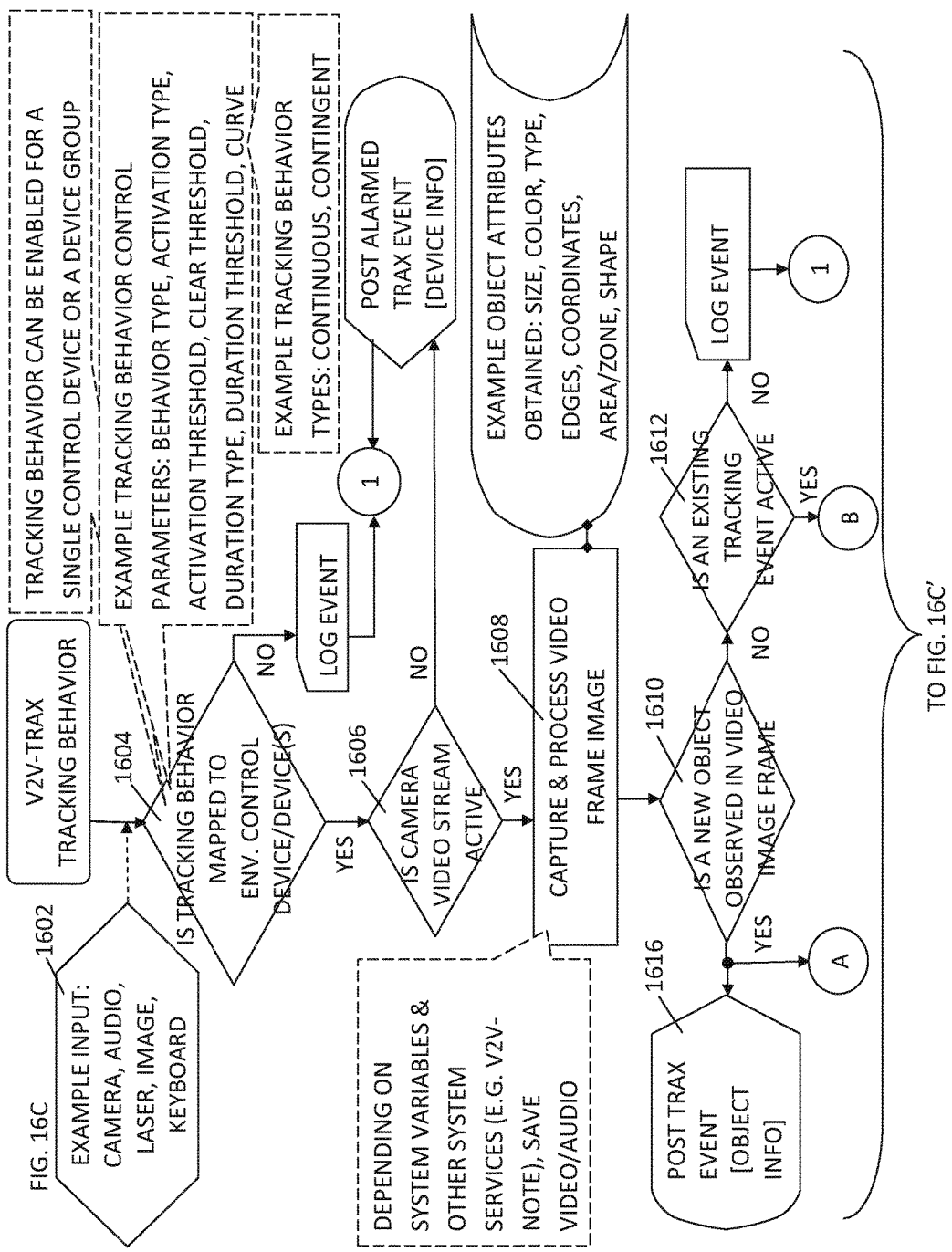
FIGS. 16c-16c' illustrate an embodiment of a flow chart for the tracking behavior function of the V2V-TRAX.
Figure 16C:
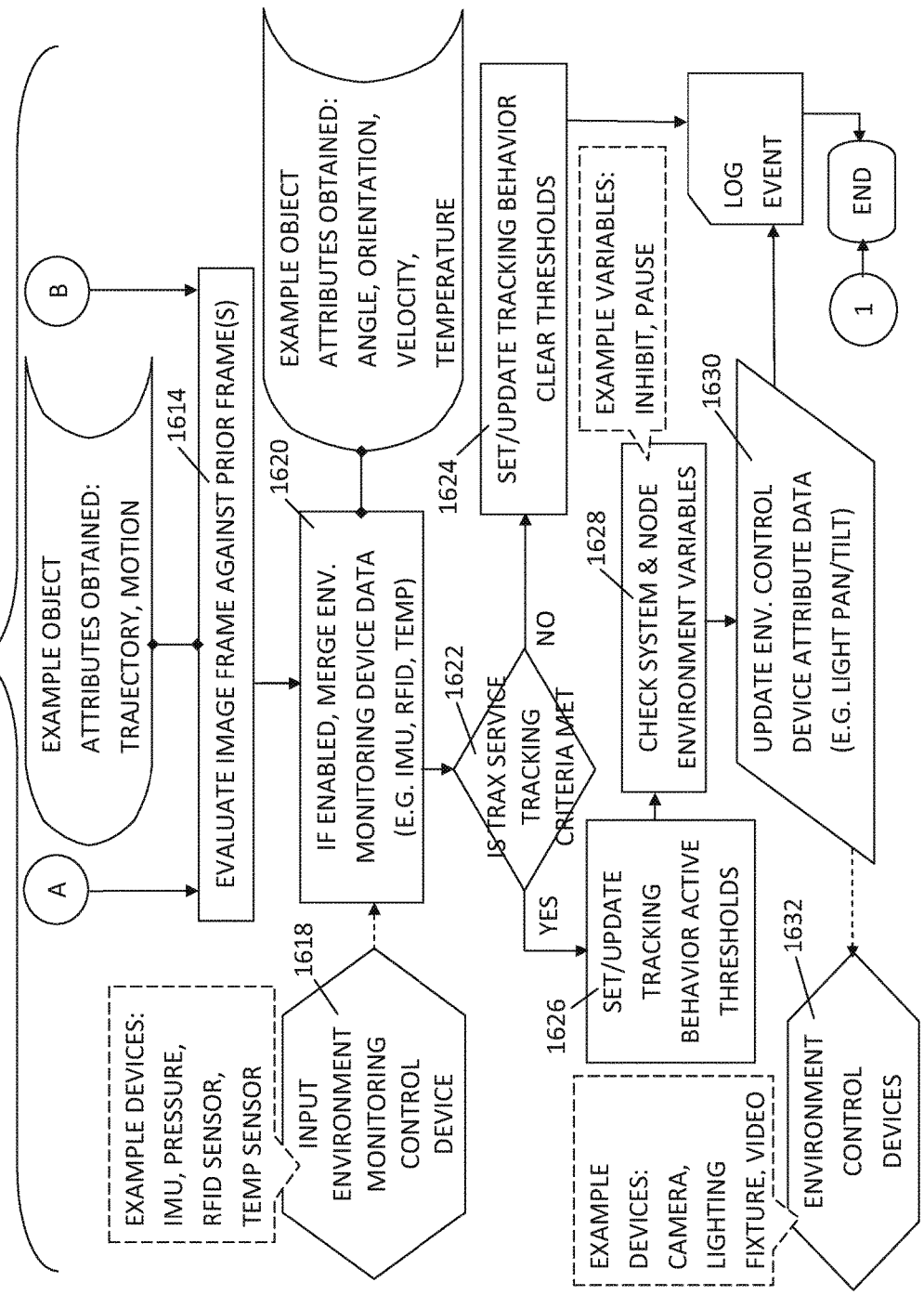

FIGS. 16c-16c' illustrates an embodiment of a procedure for the tracking function behavior of the V2V-TRAX software module. In step 1602, the control system 100 receives an input for example, from a camera, audio input, laser, image or keyboard. In step 1604 it is determined whether tracking behavior is mapped to environmental control devices. The tracking behavior can be enabled for a single control device or a device group. Example behavior control parameters include behavior type, activation type, activation threshold, clear threshold, duration type, duration threshold and curve. Example tracking behavior types include continuous and contingent. If the answer in step 1604 is no, a log event is generated and the procedure ends. If the answer in step 1604 is yes, the procedure continues to step 1606 in which it is determined whether the camera video stream is active. If not, a TRAX alarm event is generated and the procedure ends. If yes, the procedure continues to step 1608. In step 1608 the video frame image is captured in process to obtain object attribute data of any object detected within the video frame image. The object attributes may include, for example, size, color, type, edges, coordinates, area/zone or shape. In step 1610 it is determined if a new object is observed in the video image frame. If no new object is observed in the video image frame, the procedure continues to step 1612 where it is determined if an existing tracking event is active. If not, a log event is generated and the procedure ends. If an existing tracking event is active, the procedure continues to step 1614 in which the image frame is evaluated against prior image frames to obtain object attribute data such as trajectory and motion. If the answer to step 1610 is yes, the procedure still continues to step 1614. In step 1616 a TRAX event is posted, indicating the detection of a new object, is provided to the user. In step 1618 environment monitoring control device inputs may optionally be obtained. In step 1620, if it is enabled and there is environment monitoring control device data present, it is merged with the previously obtained object attribute data. Examples of environment monitoring control device data may include data from an IMU, RFID or temperature. This additional object data obtained from the environment monitoring control devices may include angle, orientation, velocity and temperature. In step 1622 it is determined whether the tracking criteria has been met. If not, the procedure continues to step 1624 which sets or updates the tracking behavior clear thresholds. A log event is generated, and the procedure ends. If tracking criteria is met in step 1622, the procedure continues to step 1626 in which tracking behavior active thresholds are set or updated. In step 1628 system and node environment variables are checked. Examples variables may include an inhibit or pause variable. In step 1630 control device attribute data, such as light pan and tilt, is updated. In step 1632 environment control devices are controlled in accordance with the control device attribute data to correspond with any behavior tracked within the environment.

Figure 17A:
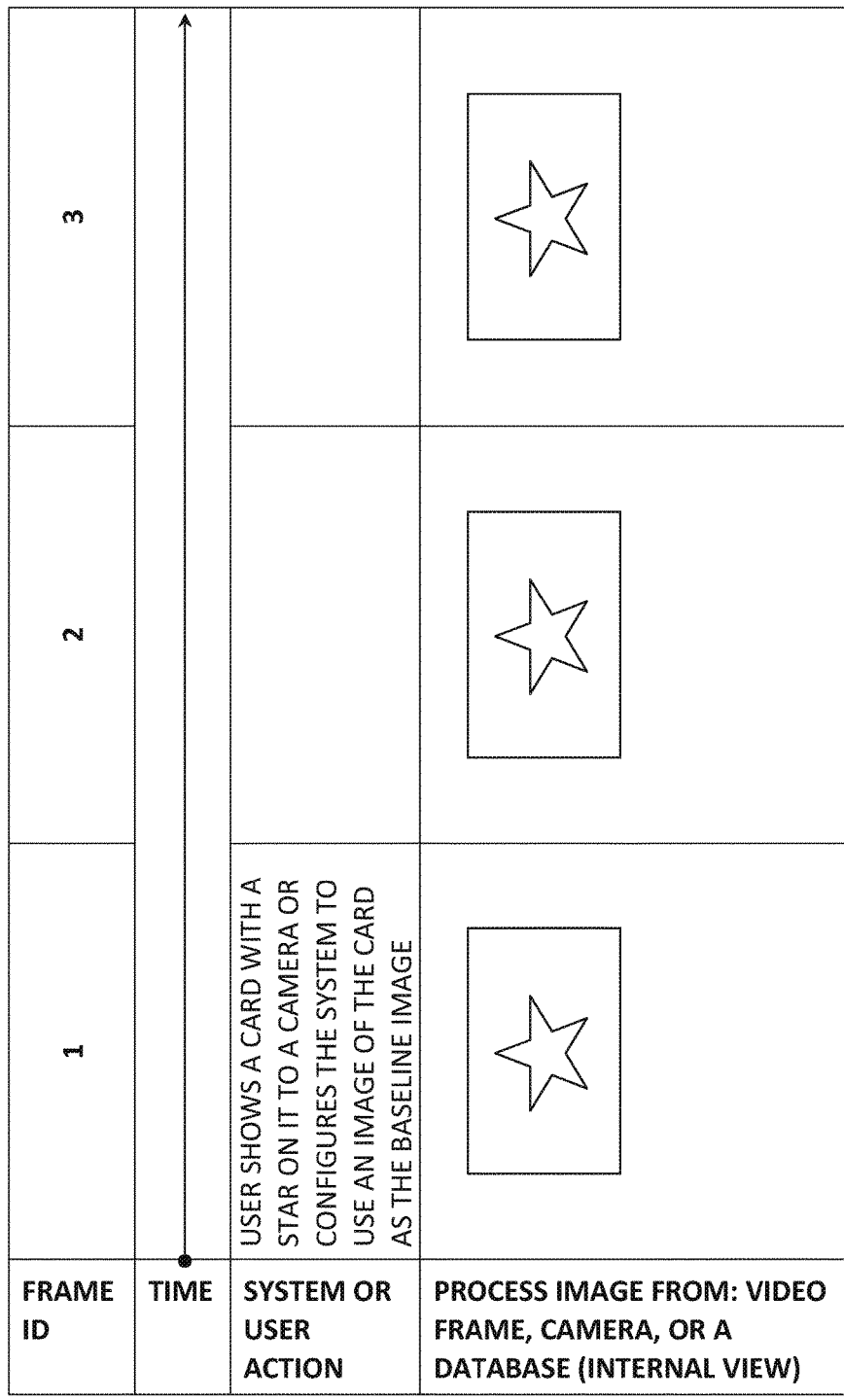
FIGS. 17a-17a", 17b-17b', 17c-17c", 17d-17d", 17e-17e", and 17f-17f' illustrate embodiments of a compare behavior function of a V2V-IMAGE software component.

FIGS. 17a-17a'', 17b-17b', 17c-17c'', 17d-17d'', 17e-17e'', and 17f-17f illustrate embodiments of a compare behavior function of a V2V-IMAGE software component. The compare behavior function allows for update of the attributes of devices in the control environment based upon the color of an image defined or shown to the system by an operator or user. For example, the color of a light beam can be set to match, compliment or contrast the color of an image shown to the system. The compare behavior function further allows updates of the attributes of devices in the control environment based upon the shape or pattern of an image defined or shown to the system. For example, the shape or color may be mapped to an LED panel, a video stream layer or be used to set the GOBO pattern of a light based upon comparison to the image shown to the system. The compare behavior function also allows the comparison of device attributes identifying devices with similar or matching capability. When device inventory changes, it can be used to determine which devices are best suited to replace the original equipment inventory. For example, by comparing colors, GOBO patterns, pan and tilt capability and other attributes. Further description of the V2V-IMAGE Compare Behavior function is provided in the following table:

| Control System Service Tool Service Operation | V2V-IMAGE Compare Behavior |
| --- | --- |
| Example Control Capability Introduced | Update the attributes of devices in the control environment based upon The color of an image defined or shown to the system (e.g. set the color of a light beam to match, compliment, or contrast the color of an image shown to the system) The shape or pattern of an image defined or shown to the system (e.g. map the shape or color to an LED panel, a video stream layer, or to set the gobo pattern of a light based upon comparison to the image shown to the system) Compare device attributes to find devices with similar or matching capability When inventory changes, determine which devices are best suited to replace the original equipment inventory (e.g. compare colors, gobo patterns, pan and tilt capability, and other attributes) |
| Key Components | *Control System: Provides computational power, storage, and user interfaces Camera(s): Provides video and image input to computer vision pipeline tasks May be packaged with IMU, pressure, laser, and or GPS |
| Example Additional Components Utilized Based Upon Desired System Services and | Additional Data Storage Units: Used to archive video and or audio streams Head Set: Used to tell the system a location in the environment (e.g. Don's office, Downstage Center) where tool operation is mapped Laser Pointer: Used to point to a location in the environment where tool operation is mapped; Used to point to or select (e.g. circle) an object in the environment Touch Panel: Used as a control interface to select objects, zones, locations, and lines |

-continued

| Control System Service<br>Tool Service Operation | V2V-IMAGE<br>Compare Behavior | |
|---|---|---|
| Control Capability | Sensors: IMU, pressure, GPS, RFID, color, and temperature sensors may be used for additional attributes of objects in the environment | |
| Example Devices Controlled by the System | Lighting Fixtures, LED Panels, Cameras, Video Streams | |
| Example General Tool Service Provisioning Steps | Map the tool service, Compare Behavior, to a control device or group of devices<br>Obtain environment control device capability profiles or descriptions<br>Obtain images of reference control shapes, colors, or patterns | |
| Example Tool Control Parameters | Behavior Type: Color, Shape, Pattern, Combination<br>Max Match Threshold: Control parameter used to define the maximum target match comparison value required<br>Min Match Threshold: Control parameter used to define the minimum target match comparison value required<br>Operation Mode: Set, Normalize, Match<br>Match Time Threshold: Control parameter used to manage the duration for comparing objects<br>Best Match: Parameter used to maintain an index of the top matches | |
| | Service Tool Behavior Type | Example Service Tool Type Provisioning Methods |
| Example Tool Control Behavior Types | Color: The color of the baseline object is compared to the supported color pallet in a device or is used to set the mapped device to a similar color, complimentary color, or contrasting color<br>Shape: The shape of the baseline object is compared to the supported shapes in a device or is used to set the mapped device to a similar shape<br>Pattern: The pattern of the baseline object is compared to the supported patterns in a device or is used to set the mapped device to a similar pattern<br>Combination: The type is used when normalizing or looking for similar devices - indicates a suite of attributes will be compared | Compare behavior type can be configured via a system control interface |

FIGS. 17*a*-17*a*" illustrate an embodiment of a sequence for setting a light GOBO pattern and color on a mapped device based upon an object shown to the system by a user. In frame ID 1, the user shows a card with a star on it to a camera or alternately configures the system to use an image of the card as a baseline reference image. The image of the card is processed to determine color and shape object attributes. In frame ID 2, the system has successfully detected the object and compared it to an object stored in the database which is mapped to a particular light GOBO pattern. In frame ID 3, the light GOBO pattern associated with the detected object is enabled and environment device control attributes are updated to map the environmental light shape and color set.

FIGS. 17*b*-17*b*' illustrates an embodiment of a sequence for defining the baseline image without requiring a user to touch the user interface. In frame ID 1, the user shows a card with a star on it to the camera. In frame ID 2, the user begins to rotate the card and the system detects object attributes including color, shape and texture. In addition, the user is notified that the object has been detected. In frame ID 3 the user continues to rotate the card and the object attributes of color, shape and texture are obtained therefrom. In response to the rotation of the card by the user, the image on the card is configured as a baseline.

FIGS. 17*c*-17*c*" illustrate an embodiment of a sequence for setting a light GOBO pattern and color on a mapped device based upon the object observed by the system by an enabled light fixture. In frame ID 1, the system sets a pattern and color on a light fixture and turns it on. The control system then obtains the color and shape of the pattern from the captured video image and indicates to the user that the pattern has been detected as an object. In frame ID 2, the object has been detected and successfully compared to a matching object within a database. In frame ID 3, the control system turns off the light fixture and enables the device having a light GOBO pattern and color matching that of the first light fixture.

Figure 17D:
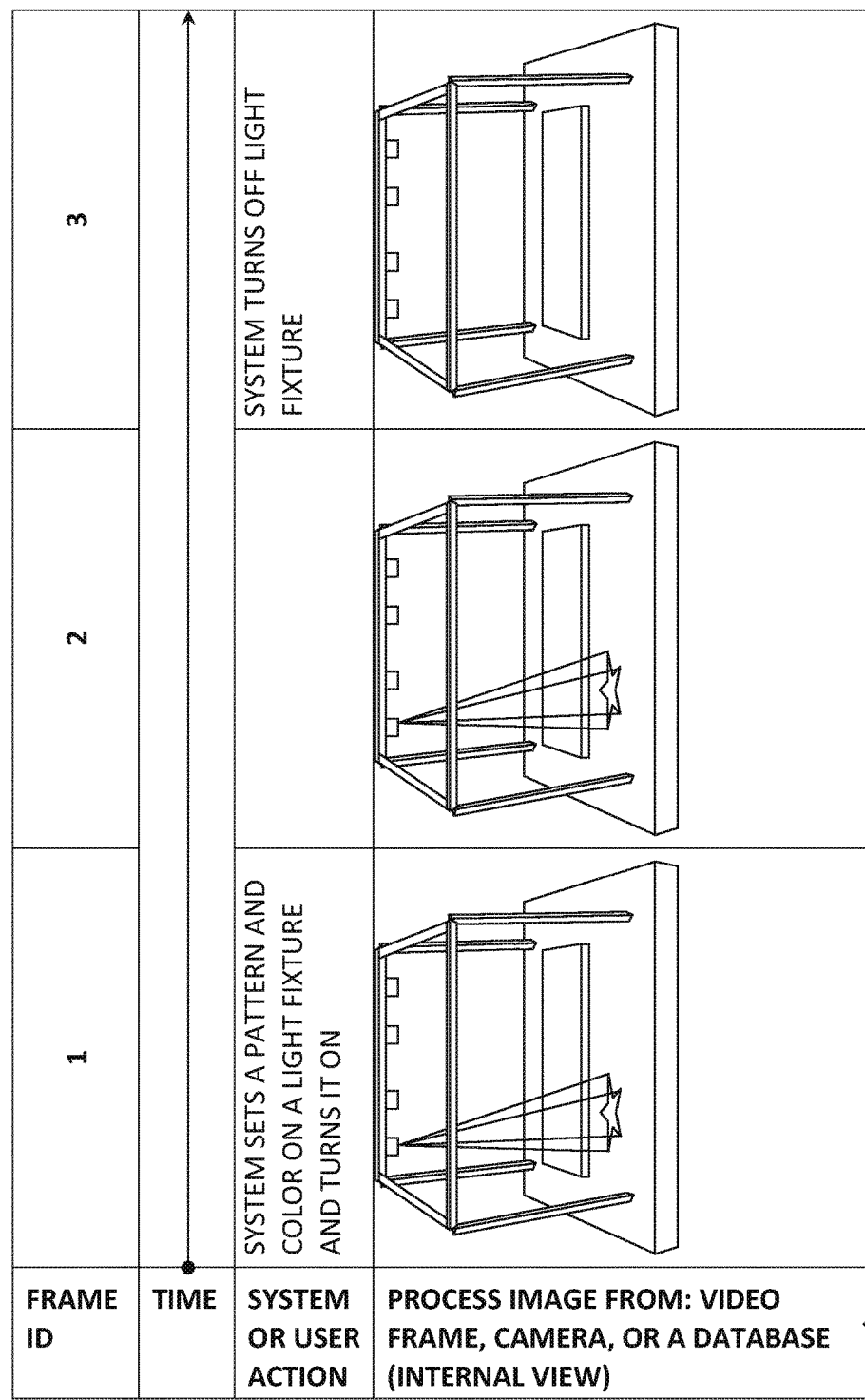

FIGS. 17*d*-17*d*" illustrate an embodiment of a sequence for setting a light GOBO pattern, color and beam position on a mapped device based upon the object observed by the system via an enabled light fixture. This example sequence is similar to that of FIGS. 17*c*-17*c*" except that the system, in addition to obtaining object attributes of color and shape, also obtains an object attribute of location of the pattern of the first light fixture. Upon successful object detection and comparison of the light pattern with a matching light pattern of another light pattern of another fixture within the database, the matching light fixture is enabled and the environmental device controller attributes are updated to set the shape, color and position that the light fixture is directed to be the same as that of the first light fixture.

FIGS. 17*e*-17*e*" illustrate an embodiment of a sequence for setting an LED panel video layer pattern and color on a mapped device based upon an object observed by the system via an enabled light fixture. In frame ID 1, the system sets a pattern and color on a light fixture and turns it on. The control system then processes a video image of the environment to obtain color and shape object attributes of the pattern. In frame ID 2, the control system compares the detected object with other patterns in a database. In frame ID 3, the system turns off the light fixture. The system then enables device updating for the LED panel video layer pattern and sets the LED video panel layer shape and color to display one or more patterns corresponding to the pattern projected by the light fixture.

Figure 17F:
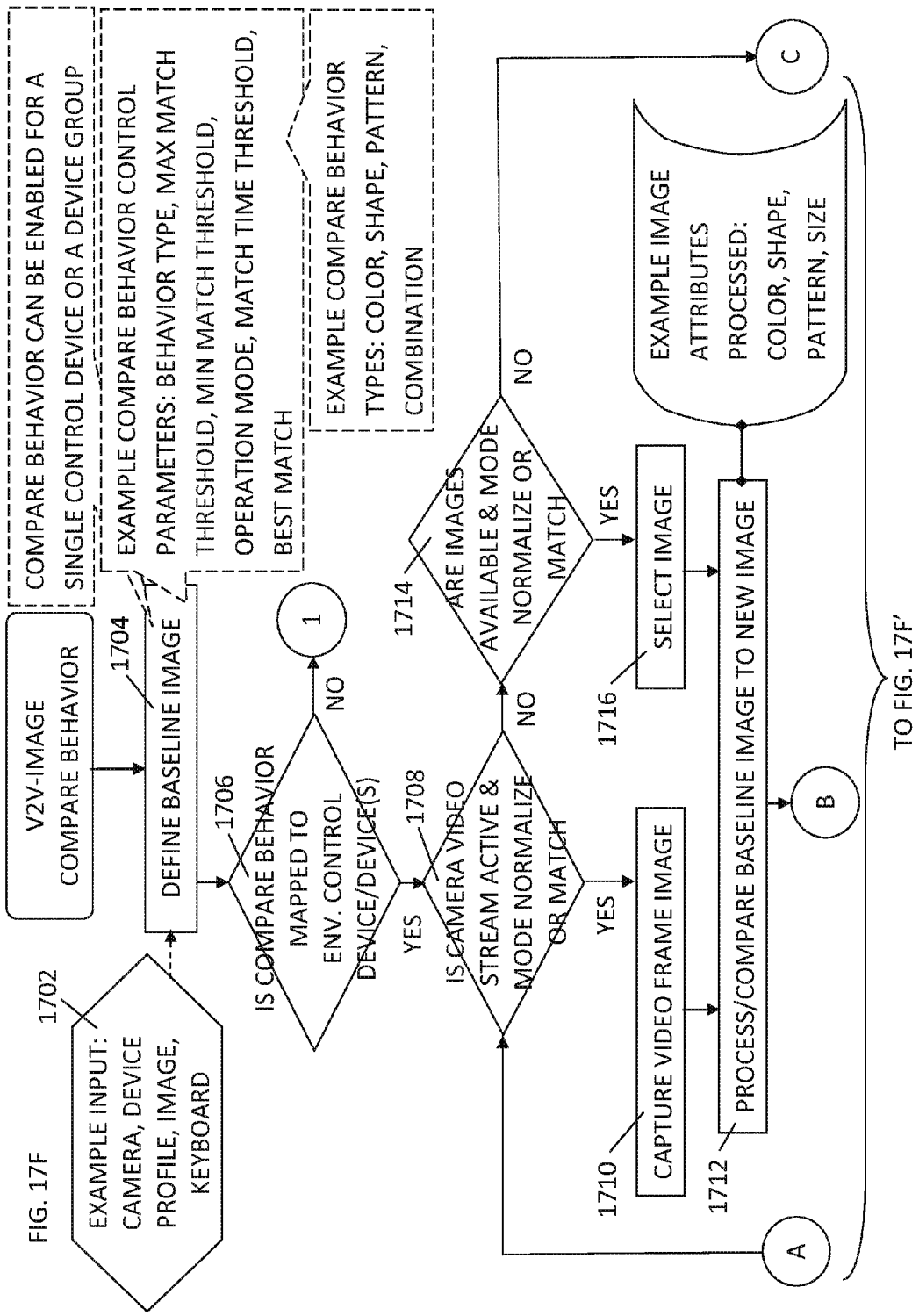

FIGS. 17*f*-17*f'* illustrate an embodiment of a procedure for the compare behavior function of the V2V-IMAGE software component. In step 1702, the control system receives an input containing a designation of an image which is desired to be defined as a baseline image. The input may include an input from a camera, an input of a device profile, a stored image, or a command from a keyboard. In step 1704, a baseline image is defined based upon the input data. In some embodiments, the compare behavior can be enabled for a single control device or in other embodiments for a device group. Example compare behavior control parameters may include behavior type, maximum match threshold, minimum match threshold, operation mode, match time threshold or best match. Example compare behavior types may include color, shape, pattern or a combination of these. In step 1706, it is determined whether compare behavior has been mapped to one or more environmental control devices. If the answer is no, the procedure ends. If the answer is yes, the procedure continues to step 1708 in which it is determined whether the camera video stream is active and the current mode is a normalized or match mode. If the answer in step 1708 is yes, the process continues to step 1710 in which the video frame image is captured. Then, in step 1712, the baseline image is processed and compared to the new image. If, in step 1708, it is determined that the camera video stream is not active, the process continues to step 1714 in which it is determined whether there are images available for matching and the mode is set to normalize or match. If the answer to step 1714 is yes, the process continues to step 1716 in which an image is selected. From step 1716 the process continues to step 1712 as previously described. Example image attributes that may be processed in step 1712 include color, shape, pattern and size. If it is determined in step 1714 that there are no images available, the procedure continues to step 1718 in which the baseline image is processed and attributes are applied to control one or more devices. The attributes may include, for example, shape, color, pan or tilt. From step 1712 the procedure continues to step 1720 in which control parameters are updated. In step 1722 it is determined whether the operation mode is set to normalize device. Normalizing devices can be used to compare attributes to different devices in a control environment to identify devices with comparable capability. For example, comparative capability may include devices that have comparable colors, patterns, pan and tilt or strobe support. If the answer in step 1722 is no, the procedure continues to step 1718 which has been previously described above. If the answer to step 1722 is yes, the procedure continues to step 1724 in which it is determined whether the current device is the last device to be normalized. If this is the last device to be normalized, the procedure returns to the aforementioned step 1718. If this is not the last device to be normalized, the procedure continues to step 1726 in which a new device can be selected and then to the previously described step 1708. After step 1708 is performed, the procedure continues to step 1728 in which an environment control device is controlled. Example devices which may be controlled may include lighting fixtures and video streams.

FIGS. 18*a*-18*a*', 18*b*-18*b*', 18*c*-18*c*', and 18*d* illustrate embodiments of command behavior for the V2V-VOX software module. The command behavior function allows the attributes of the devices in the control environment to be updated based upon a valid command spoken to the system via a microphone or headset. Example commands may include "lights on," "Don's office," and "downstage center." Further description of the V2V-VOX Command Behavior function is provided in the following table:

| Control System Service | V2V-VOX |
|---|---|
| Tool Service Operation | Command Behavior |
| Example Control Capability Introduced | Update the attributes of devices in the control environment based upon A valid command spoken to the system via a microphone or headset (e.g. command "lights on", "Don's office", "downstage center") |
| Key Components | *Control System: Provides computational power, storage, and user interfaces<br>Voice user interface |
| Example Additional Components Utilized Based Upon Desired System Services and Control Capability | Additional Data Storage Units: Used to archive video and or audio streams<br>Head Set: Used to tell the system a location in the environment (e.g. Don's office, Downstage Center) where tool operation is mapped<br>Laser Pointer: Used to point to a location in the environment where tool operation is mapped; Used to point to or select (e.g. circle) an object in the environment<br>Touch Panel: Used as a control interface to select objects, zones, locations, and lines<br>Sensors: IMU, pressure, GPS, RFID, color, and temperature sensors may be used for additional attributes of objects in the environment |
| Example Devices Controlled by the System | Lighting Fixtures, LED Panels, Cameras, Video Streams |
| Example General Tool Service Provisioning Steps | Map the tool service, Command Behavior, to a control device or group of devices |

-continued

| Control System Service | V2V-VOX |
|---|---|
| Tool Service Operation | Command Behavior |
| Example Tool Control Parameters | Language Mode: Control parameter used to set default language mode - example options: automatic, English, French, Spanish<br>Privilege Level: Control parameter used to manage the user privilege level for the capability<br>Operation Mode: Control parameter used to manage general command operations - example options: audible feedback, feedback tone, feedback message<br>Match Time Threshold: Control parameter used to manage the duration for searching for a valid command grammar<br>Noise Threshold: Control parameter used to set audio filter levels |

FIGS. 18a-18a' illustrate an embodiment of a sequence for voice activation of devices based upon device manufacturer. Beam position is also set by voice activation in this example. The user says a voice command of "turn on Martin Macs." It should be noted that Martin Macs is a particular manufacturer of a control device that is a control device having a type of a lighting fixture. The control system 100 then performs a grammar check on the spoken command to identify an action token of "on" and a device token of "Martin Macs." In response, the default voice command device is set to the Martin Macs. In addition, the environment device control attributes are updated to set the Martin Macs shutter or iris to open. The user next issues a command of "center stage." The control system then performs a grammar check on the command to indentify a detail token of "center stage". The device token is the default previously set. In this case, the Martin Macs. In response to this command, the light pan and tilt values are updated on the Martin Macs to position the beam of the Martin Macs to the center stage. The user may then issue a command of "turn lights off." The control system 100 performs a grammar check on the command to identify an action token of "off" and a device token of the default, the default being the Martin Macs. In response to this command, the Martin Macs shutter or iris are set to close.

Figure 18B:
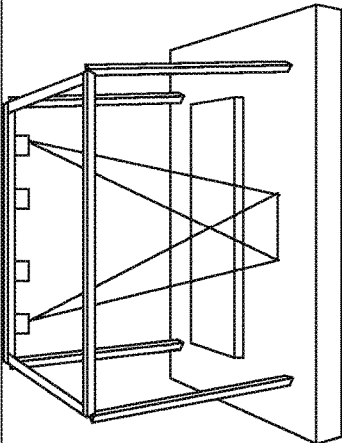
FIGS. 18a-18a' 18b-18b', 18c-18c', and 18d illustrate embodiments of command behavior function for the V2V-VOX software module.
Figure 18B:

FIGS. 18b-18b' illustrate an embodiment of a sequence for voice activation based upon device manufacturer in which multiple types of devices are commanded. Beam position is also set by voice activation. In the particular embodiment illustrated in FIGS. 18b-18b', the lighting fixture control devices include Martin Macs and VL1000s, which are another type of lighting fixture. The user first issues a command of "turn on Martin Macs." The control system 100 performs a grammar check to identify an action token of "on" and a device token of "Martin Macs." The default voice command device is set to Martin Macs, and the environment device control attributes are updated to set the shutter or iris on the Martin Macs to open. The user then issues another voice command of "center stage" followed by a voice command of "turn on VL1000s." In response, the control system 100 performs a grammar check to identify a detail token first of "center stage" and a device token of the default, the default being the Martin Macs. In addition, an action token of "on" and a device token of "VL1000s" is identified. In response to the center stage command, the environment device control attributes are updated on the Martin Macs to set the light pan and tilt values to center stage. In addition, the VL1000s shutter or iris is set to open and the default voice command device is set to the VL1000s. The user then gives a voice command of "turn lights off." The control system 100 performs a grammar check to identify an action token of "off" and a device token of default, the default devices now being the VL1000s. In response to the command, the VL1000s shutter or iris is set to close.

FIGS. 18c-18c' illustrate an embodiment of a sequence for voice activation of multiple devices based upon device manufacturer as well as the setting of beam position and a video layer by voice activation. In the example illustrated in FIGS. 18c-18c', control devices of Martin Macs and VL1000s lighting fixtures as well as a layer 1 control device which is a video fixture. A user first says a command of "turn on Martin Macs" and the control system 100 performs a grammar check to identify an action token of "on" and a device token of "Martin Macs." In response the environment device control attributes are updated such that the Martin Macs shutter or iris is set to open. In addition, the default voice command device is set to Martin Macs. In a next time period, the user says a command of "center stage" followed by a command of "turn on VL1000s," then followed by another command of "turn on video layer 1." For the first command the control system 100 performs a grammar check to identify a detail token of "center stage" and a device token of the default, that is the Martin Macs. For the second command an action token of "on" is identified followed by a device token of VL1000. For the third command, an action token of "on," a device token of "video" and a detail token of "layer 1" is identified. In response to these commands, the light pan and tilt values of the Martin Macs are updated to direct the Martin Macs to the center stage. In response to the turn on VL1000s command, the VL1000 shutter or iris is set to open and the default voice command device is sent to the VL1000s. In response to the command of turn on video layer 1, the video layer 1 stream is turned on and the default voice command video device is set to layer 1. In a next time period, the user says the command "turn lights off." The control system 100 performs a grammar check to identify an action token of off and a device token of the default, which, in this case, is the VL1000s. In response to the command "turn lights off," the VL1000 shutter or iris is set to close.

FIG. 18d illustrates an embodiment of a procedure for the command behavior of the V2V-VOX software component. In step 1802 a voice command is received by the control system 100. The voice command in some embodiments may include, for example, a voice command input into a microphone, a headset or a command type for the keyboard. In step 1804 command grammar is defined. By default, the command behavior is applied to the current active device or group of devices. Example command behavior control parameters include language mode, privilege level, operation mode, match time threshold and noise threshold. In step 1806 it is determined whether a voice has been detected. If a voice has not been detected the procedure ends. If a voice has been detected, the procedure continues to step 1808 in which the words of the voice command are processed against the command grammar defined in the system. In step 1810 it is determined whether a valid command has been identified. If the answer is no, the procedure continues to step 1812 in which it is determined whether a match threshold has elapsed. If the matched threshold has not elapsed, the procedure returns to step 1808 in which the words continue to be processed against the command grammar. If it is determined that the match threshold has elapsed, the procedure continues to step 1814 in which it is determined whether the operation mode is set to audible feedback. Referring again to step 1810, if a valid command is identified, a log message is generated and the procedure continues to the aforementioned step 1814. In step 1814, if it is determined that the operation mode is audio feedback, the procedure continues to step 1816 in which a feedback tone or confirmation audio is played back to the user to confirm that a valid command has been identified. The procedure then continues to step 1818 in which system and node environment variables are checked. Examples of variables that may be checked include an inhibit variable and a pause variable. If it is determined in step 1814 that the operation mode is not set to audible feedback, the procedure also continues to step 1818. In step 1820, the environment control device attribute data of the device identified by the command is updated and a VOX event is posted. Examples of the environment control device attribute data may include an iris setting, pan and tilt. In step 1822 the updated environment control device attribute data is used to control one or more environment control devices. Examples of environment control devices may include lighting fixtures and video stream boards.

Figure 19:
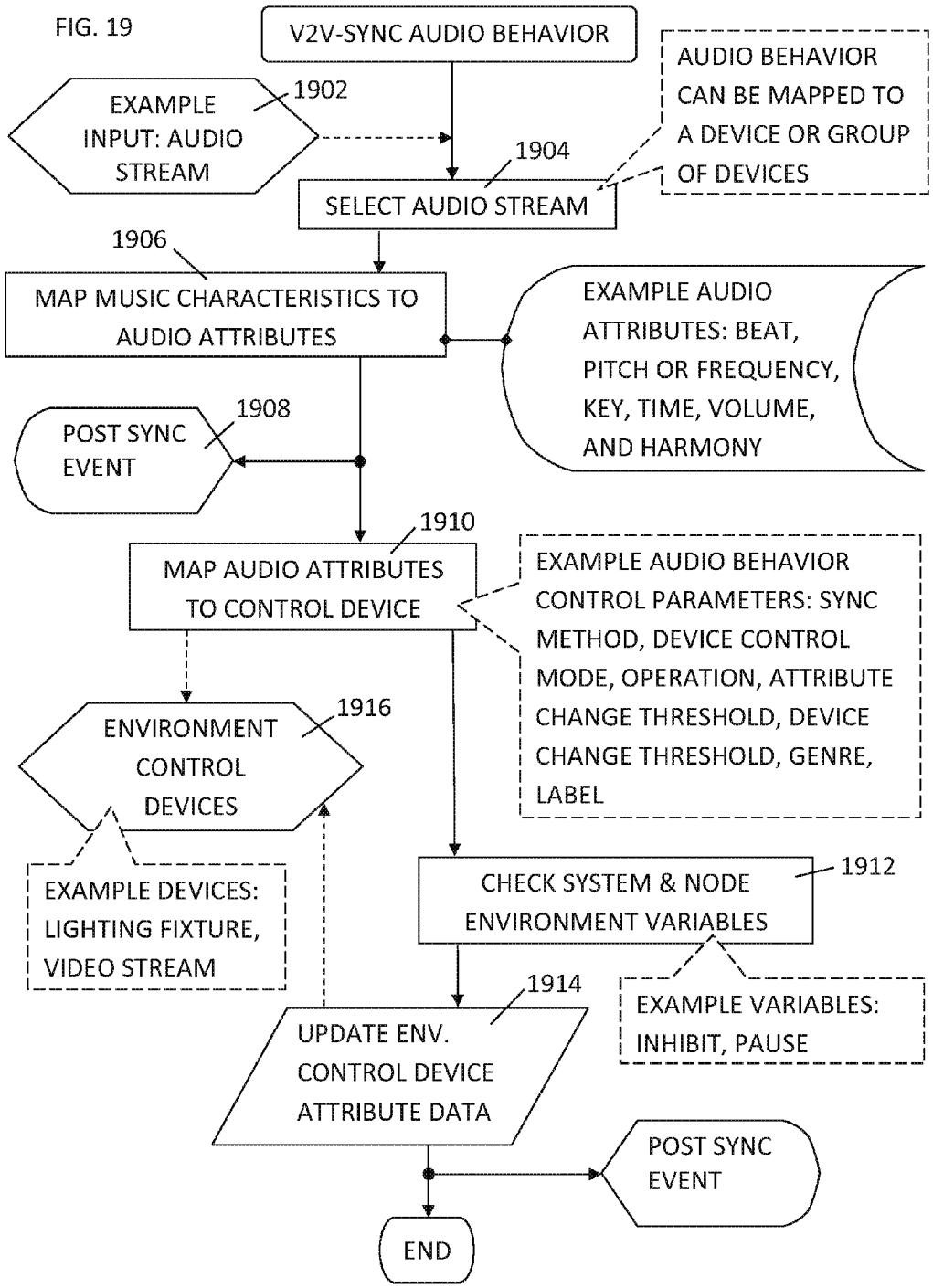
FIG. 19 illustrates an embodiment of the audio behavior function of the V2V-SYNC software module.

FIG. 19 illustrates an embodiment of the audio behavior function of the V2V-SYNC software module. The audio behavior function allows the attributes of devices in the control environment to be updated based upon an audio profile associated with a specific genre of music, or one or more discrete audio attributes. For example, the video streams on a given video layer may be changed based upon the beat of an audio stream. In another example, the light fixture intensity may be set based upon the volume changes in an audio stream. In step 1902, an audio stream is received by the control system 100. In step 1904 the audio stream is selected by the user. Audio behavior can be mapped to a device or group of devices. In step 1906 the music characteristics of the audio stream are mapped to audio attributes. Example audio attributes may include beat, pitch or frequency, key, time, volume and harmony.

In step 1908 an indication is output to the user to indicate the mapping. In at least one embodiment, the mapping of the music characteristics to audio attributes may be performed by the user. As to other embodiments, the mapping of the musical characteristics to audio attributes may be automatically performed by the system. In step 1910, the audio attributes are mapped to a control device. The mapping of the audio attributes to the control device may be performed by the user, or alternately automatically performed by the system. Example audio behavior control parameters may include sync method, device control mode, operation, attribute change threshold, device change threshold, genre and label. In step 1912, the system and node environment variables are checked. Example environment variables include inhibit and pause. In step 1914, the environment control device attribute data is updated for the particular control devices and a SYNC event is posted. In step 1916, the environment control devices are controlled according to the updated environment control device attribute data. Example environment control devices may include lighting fixtures and video streams.

Further description of the V2V-SYNC Audio Behavior function is provided in the following table:

| Control System Service | V2V-SYNC |
|---|---|
| Tool Service Operation | Audio Behavior |
| Example Control Capability Introduced | Update the attributes of devices in the control environment based upon the audio profile associated with a specific genre of music Based upon one or more discrete audio attributes (e.g. change the video streams on a given layer based off of the beat or set the light fixture intensity based upon the volume changes) |
| Key Components | *Control System: Provides computational power, storage, and user interfaces Audio stream or recorded music |
| Example Additional Components Utilized Based Upon Desired System Services and Control Capability | Additional Data Storage Units: Used to archive video and or audio streams Head Set: Used to tell the system a location in the environment (e.g. Don's office, Downstage Center) where tool operation is mapped Laser Pointer: Used to point to a location in the environment where tool operation is mapped; Used to point to or select (e.g. circle) an object in the environment Touch Panel: Used as a control interface to select objects, zones, locations, and lines Sensors: IMU, pressure, GPS, RFID, color, and temperature sensors may be used for additional attributes of objects in the environment |
| Example Devices Controlled by the System | Lighting Fixtures, LED Panels, Video Streams |
| Example General Tool Service Provisioning Steps | Map the tool service, Audio Behavior, to a control device or group of devices |
| Example Tool Control Parameters | Sync Method: Control parameter used to track the audio attributes mapped to a given device Device Control Mode: Control parameter that defines the type of sync control data management - examples include profile, cross linked, mapped, threshold Operation Mode: Control parameter used to define the method used to trigger updates to a mapped device - examples include random, sequential, static |

| Control System Service | V2V-SYNC |
|---|---|
| Tool Service Operation | Audio Behavior |

Figure 20B:
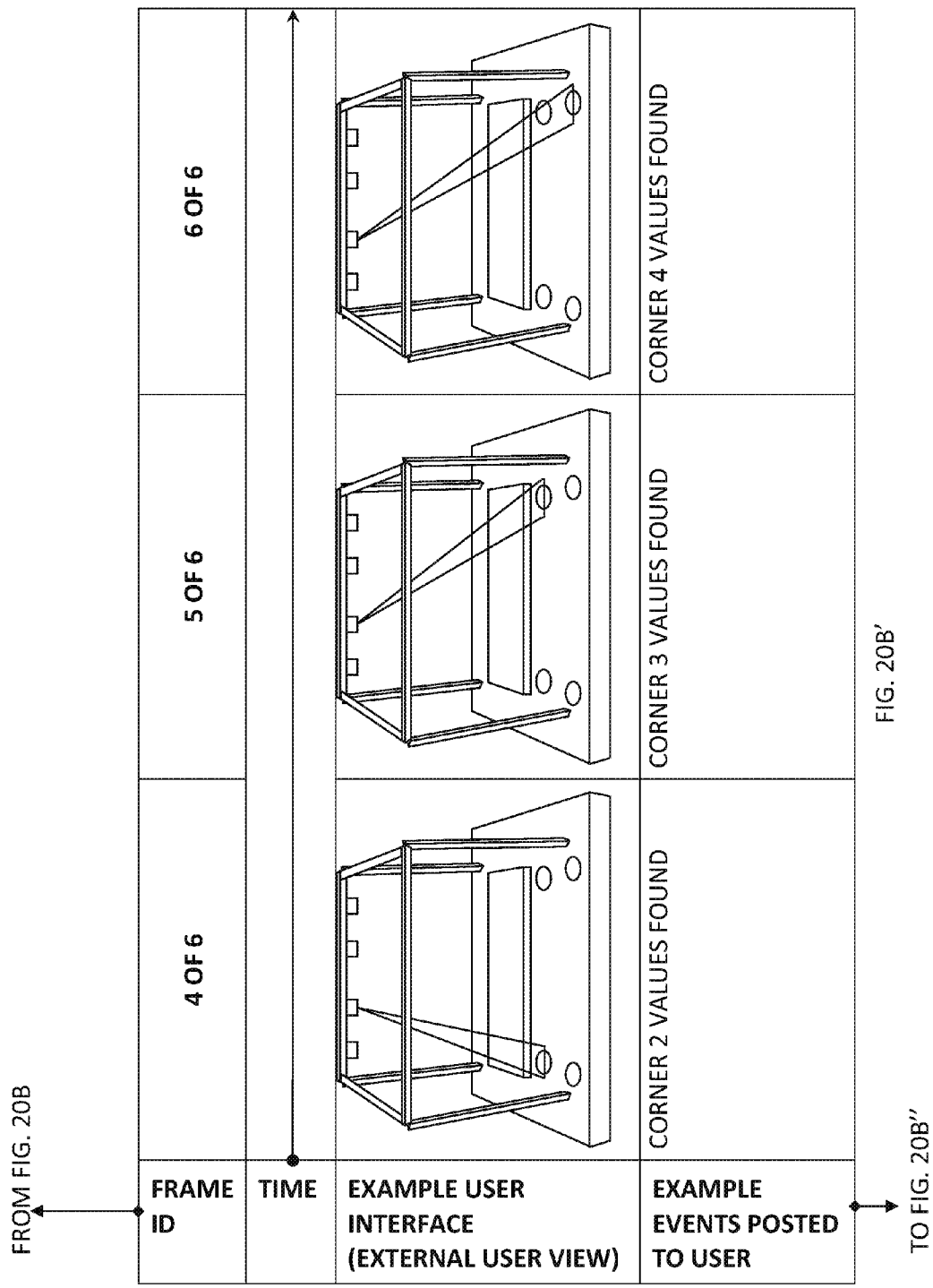
FIGS. 20a-20a", 20b-20b", and 20c-20c' illustrate embodiments of a 2D_INIT mode behavior function of the V2V-TRAX software module.

> Attribute Change Threshold: Parameter used with operational mode to manage when sync operations may move to a new audio attribute value or used as the threshold value to control when to trigger updates on the mapped device (e.g. volume increases 10 decibels over a 10 second period)
> Device Change Threshold: Parameter used with operational mode to manage time interval between control device updates
> Genre: Audio category assigned based off of the characteristics of the audio stream
> Label: Parameter used to store an alternate genre or user specified label FIGS. 20a-20a", 20b-20b", and 20c-20c' illustrate embodiments of a 2D_INIT mode behavior function of the V2V-TRAX software module. The 2D_INIT mode behavior function allows for updating of the pan and tilt attributes of devices in the control environment based upon pan and tilt values initialized in the 2D_INIT mode operations. FIGS. 20a-20a" and 20b-20b" illustrate an example sequence of initializing a light fixture for the environment. In this particular operation, system control parameters to define area shape are used to set the shape equal to a square or alternately a rectangle and the plane of control is set to the XY plane. In a first frame ID, the user defines four corner locations in a baseline image. The four defined corners define an area to which a particular light fixture is to be limited in its travel relative to the associated plane. During the process, focus points used to populate device system parameter corner data (i.e. device pan and tilt values) are obtained for each corner of the shape defined in the target control plane. In frame ID 2, the user triggers the 2D_INIT sequence for a particular light fixture. In response, the system turns on the fixture and the system detects the beam as an object. In addition, object attributes are obtained of size, shape and location of the beam. In frame ID 3, the system updates the pan and tilt values to move the fixture beam over the first corner. As a result the system obtains motion and location object attributes of the beam. Having found the first corner location, the system maps the light pan and tilt of the current position of the light fixture for corner 1 into the device corner data system control parameters.

In frame ID 4 the system updates the fixture pan and tilt values to move the fixture beam over to the second corner. The system monitors the beam and obtains object attributes of motion and location and the current light pan and tilt values. Once the beam has reached corner 2, the light fixture pan and tilt values are mapped as corner 2 system control parameters. Similarly, in frame ID 5, the system updates the fixture pan and tilt values to move the fixture beam over the third corner. The system obtains the object attributes of motion and location associated with the current position of the beam and the current light pan and tilt values. Once the beam has reached the location for corner 3, the device's pan and tilt values are stored in the system corner control parameters. Finally, in frame ID 6, the system updates the fixture pan and tilt values to move the fixture beam over to the fourth corner and the system detects the location of the beam to obtain the object attributes of pan and tilt, having found the fourth corner. The system maps the light pan and tilt values of the current position of the beam to the corner 4 system control parameters. Having stored the values which represent the 4 corners of the defined control space in the XY plane for a given mapped control fixture, the system can utilize the data to position the associated fixture within the plane.

Further description of the V2V-TRAX 2D_InitMode Behavior function is provided in the following table:

| Control System Service | V2V-TRAX |
|---|---|
| Tool Service Operation | 2D_InitMode Behavior |
| Example Control Capability Introduced | Update the pan and tilt attributes of devices in the control environment based upon<br>   The 2D_InitMode operations pan and tilt values |
| Key Components | *Control System: Provides computational power, storage, and user interfaces<br>Camera(s): Provides video and image input to computer vision pipeline tasks<br>   May be packaged with IMU, pressure, laser, and or GPS<br>Laser: Used to define the corners of the initialization region |
| Example Additional Components Utilized Based Upon Desired System Services and Control Capability | Additional Data Storage Units: Used to archive video and or audio streams<br>Head Set: Used to tell the system a location in the environment (e.g. Don's office, Downstage Center) where tool operation is mapped<br>Laser Pointer: Used to point to a location in the environment where tool operation is mapped; Used to point to or select (e.g. circle) an object in the environment<br>Touch Panel: Used as a control interface to select objects, zones, locations, and lines<br>Sensors: IMU, pressure, RFID, color, and temperature sensors may be used for additional attributes of devices in the environment |
| Example Devices Controlled by the System | Lighting Fixtures, Cameras |

| | |
|---|---|
| Control System Service | V2V-TRAX |
| Tool Service Operation | 2D_InitMode Behavior |
| Example General Tool Service Provisioning Steps | Map the tool service, 2D_InitMode Behavior, to a control device or group of devices (e.g. Lighting Fixture(s)) and to one or more of the given control device's attributes (e.g. Light Fixture(s) Focus Parameters = Pan and Tilt) |
| Example Tool Control Parameters | Behavior Type: Continuous, Contingent<br>Activation Type: Automatic, Manual, Single Step, Group Based<br>Device ID: Control parameter used when initialization is based upon a group (i.e. activation type is Group Based)<br>Device Corner Data: Array of data used to store device pan and tilt values for a given corner location<br>On-Off Mode: Control parameter used to manage how a fixture beam is turned on or off (example values: power, iris, shutter)<br>Area Shape: Control parameter used to capture the shape defined by the corners (e.g. square)<br>Plane: Control parameter used to capture the plane in which the corners reside (e.g. X-Y) |
| | Service Tool Type & Control Device Update Criteria / Example Service Tool Type Provisioning Methods |
| Example Tool Control Behavior Types | Continuous: 2D_InitMode, once triggered, will operate continuously / Parameter can be configured via a system control interface<br>Contingent: The trigger the 2D_InitMode is contingent upon the value of the activation type |

Figure 20C:
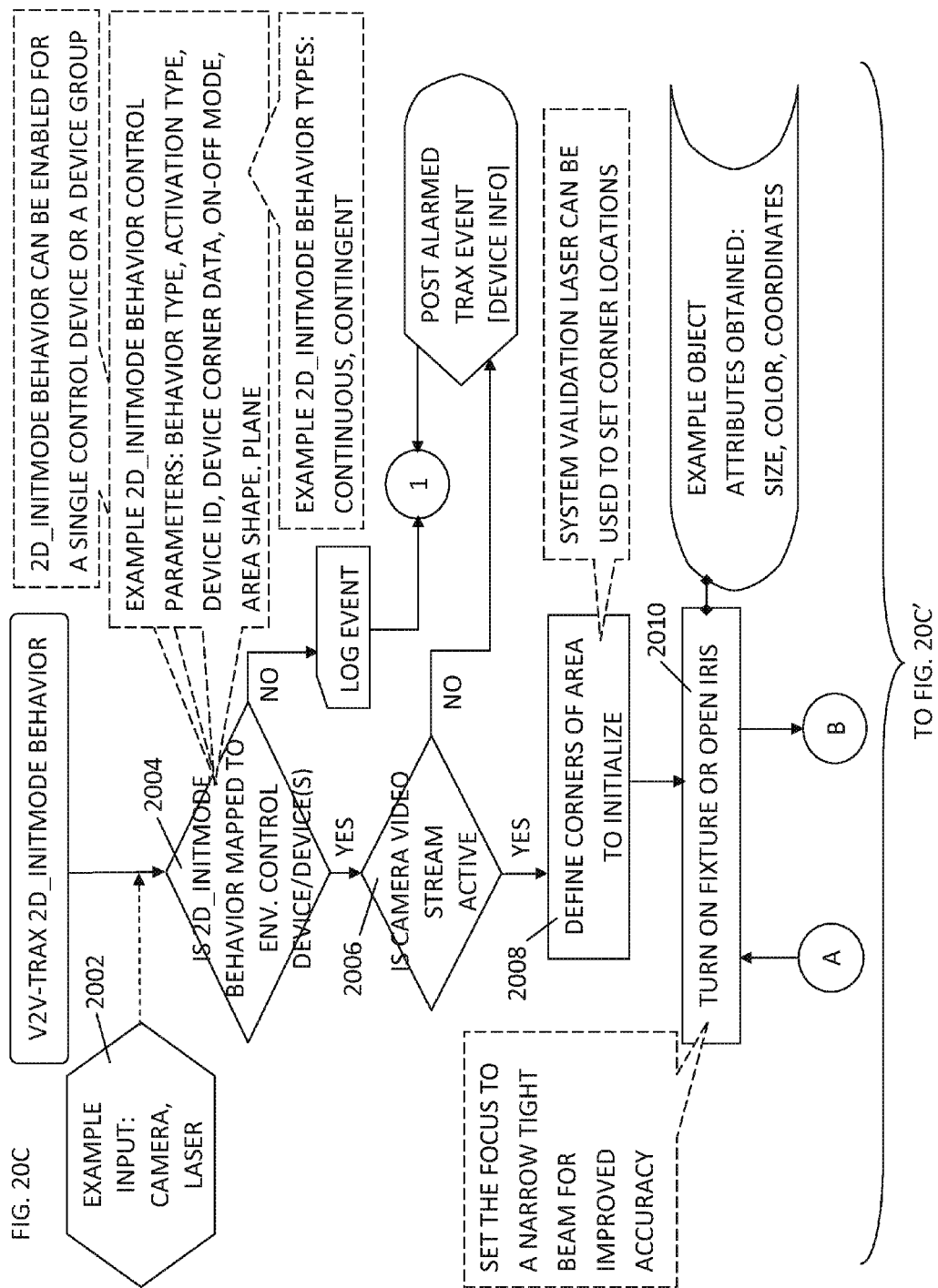
Figure 20C:
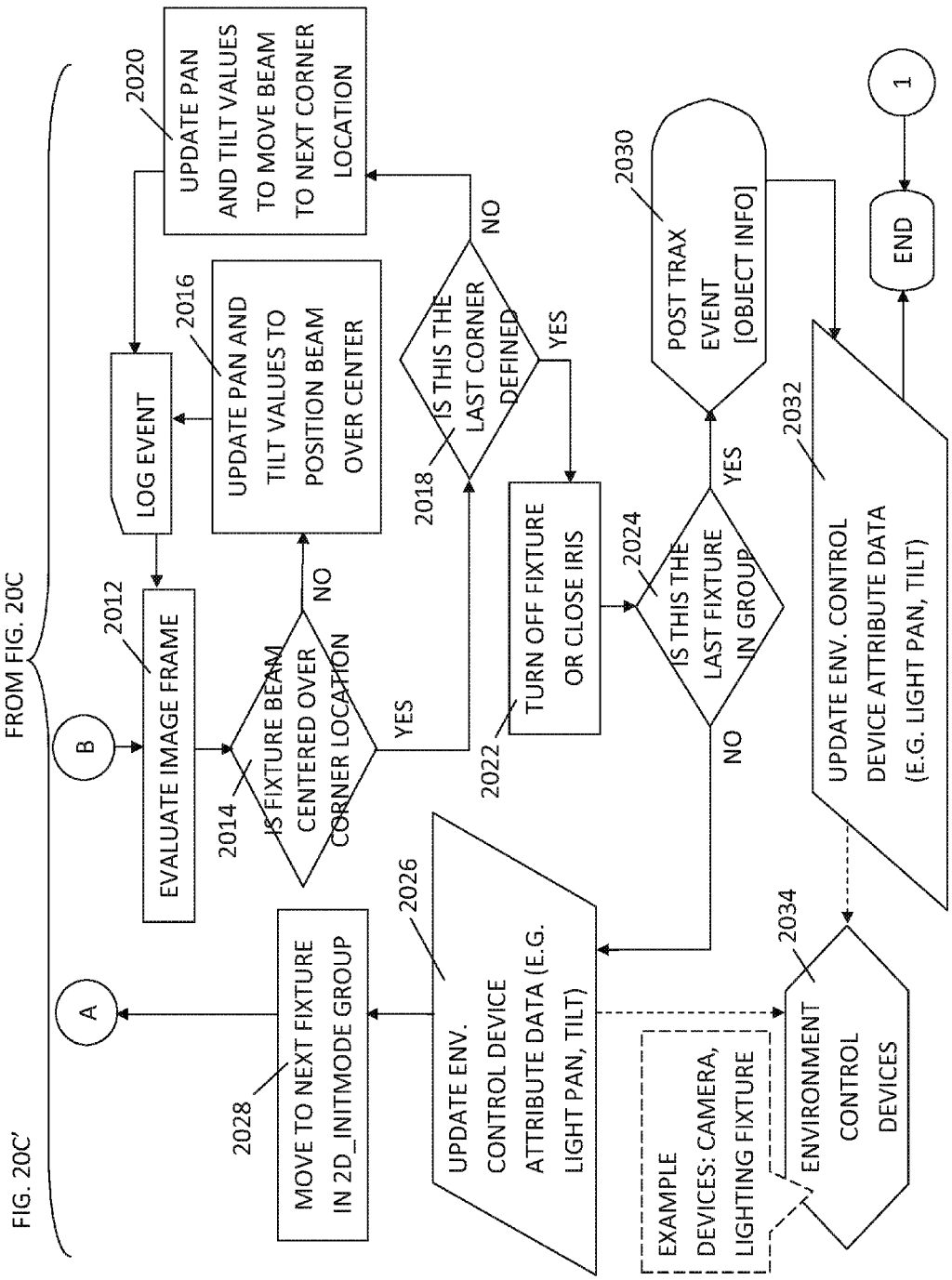

FIGS. 20c-20c' illustrate an embodiment of the 2D_INIT behavior function of the V2V-TRAX software. In step 2002 a camera or laser input is received by the control system 100. In step 2004 it is determined whether 2D_INIT mode behavior is mapped to one or more environment control devices. If the answer is no, a log event is generated and the procedure ends. If the answer is yes, the procedure continues to step 2006 in which it is determined if the camera video stream is active. If the camera video stream is not active, the procedure ends and a TRAX alarmed event is posted. If the camera video stream is active, the procedure continues to step 2008. Referring back to step 2004, 2D_INIT mode behavior can be enabled for a single control device or a group of devices. Example 2D_INIT mode control parameters include behavior type, activation type, device ID, device corner data, on-off mode, area shape and plain. Examples of 2D_INIT mode behavior types include continuous and contingent. If it is determined in step 2006 that the camera video stream is active, the procedure continues to step 2008 in which the corners of the areas to initialize are defined. In a particular embodiment, a system validation laser can be used to set the four corner locations. In step 2010 the fixture is turned on or the iris associated with the fixture is opened. In a particular embodiment, the focus of the fixture may be set to a narrow tight beam for improved accuracy. In step 2012 the image frame is evaluated to obtain object attributes such as size, color and coordinates within the XY plain. In step 2014 it is determined if the fixture beam is centered over the corner location. If the answer is no in step 2016, the pan and tilt values are updated to position the beam over center and the procedure continues back to step 2012 where the image frame is again evaluated. If in step 2014 it is determined that the answer is yes, the procedure continues to step 2018 in which it is determined whether this is the last corner to be defined. If this is not the last corner to be defined, the procedure continues to step 2020 in which the pan and tilt values are updated to move the beam to the next corner location and the procedure returns to step 2012 in which the image frame is again evaluated. If in step 2018 it is determined that this is the last corner to be defined, the procedure continues to step 2022 in which the fixture is turned off or the iris is closed. In step 2024 it is determined whether this is the last fixture in a group to be initialized. If the answer is no, the procedure continues to step 2026 in which the environment control device attribute data for the current fixture is updated. Examples of this control device attribute data include light pan and tilt. The procedure then moves to step 2028 in which the next light fixture in the group is selected and the procedure returns to step 2010. If it is determined in step 2024 that this is the last fixture in the group, the procedure continues to step 2030 in which an output is provided to the user indicating that the last fixture has been initialized and the procedure continues to step 2032 in which the environment control device attribute data such as light pan and tilt for the last fixture is updated. The procedure then continues to step 2034 in which one or more environment control devices are controlled.

FIG. 21 illustrates an embodiment of a procedure for a profile behavior function of the V2V-NOTE software component. The profile behavior function allows a user to generate a profile archive that captures the light cues or attribute cues on a given show. The profile behavior function further allows a user to generate a profile archive that captures the light cues or attributes and video used on a given show. Still other functions of the profile behavior function includes allowing a user to generate a profile archive that captures the light cues or attribute cues on a given show mapped to a specific genre. For example, the light attributes for a show with a music genre of rock. In another function of a profile behavior function, show or event profiles that are stored can be used as the basis to generate a new show where similar operations or behavior is desired. In step 2102, stored video, audio, light queues and show data are provided to the control system 100.

In step 2104, a profile generation type is selected. Example profile behavior control parameters can include behavior type, error management, duration threshold, duration type, user ID and label. Example profile behavior types include audio, lights, video, show or combined. In step 2106 stored data is selected for profile creation. In step 2108 it is determined whether selected file streams are closed. If the answer is no, an alarm event is provided to the user and the procedure ends. If the selected file streams are closed, the procedure continues to step 2110 in which the user can initiate or continue profile creation. In step 2112 it is determined if there were errors reported during generation. If the answer is yes, the procedure continues to step 2114 in which it is determined whether a continue on error flag is set. If the flag is not set, a log is generated and the procedure ends. If the flag is set, a log event is generated and the procedure continues back to step 2110. If in step 2112 there were no errors reported during generation, the procedure continues to step 2116 in which the profile is stored in a location in a database based upon user ID and label. After step 2116 a NOTE event is posted and the procedure ends.

Further description of the V2V-NOTE Profile Behavior function is provided in the following table:

| Control System Service Tool Service Operation | V2V-NOTE Profile Behavior |
|---|---|
| Example Control Capability Introduced | Generate a profile archive that captures the light cues or attributes used on a given show |
| | Generate a profile archive that captures the light cues or attributes and video used on a given show |
| | Generate a profile archive that captures the light cues or attributes used on a given show mapped to a specific music genre (e.g. the light attributes used for a show with a music genre of rock) |
| | Generated show or event profile archives can be used as the basis to generate a new show where similar operations or behavior is desired |
| Key Components | *Control System: Provides computational power, storage, and user interfaces |
| | Archived/saved show data, video streams, and or audio |
| Example Additional Components Utilized Based Upon Desired System Services and Control Capability | Additional Data Storage Units: Used to archive video and or audio streams |
| | Head Set: Used to tell the system a location in the environment (e.g. Don's office, Downstage Center) where tool operation is mapped |
| | Laser Pointer: Used to point to a location in the environment where tool operation is mapped; Used to point to or select (e.g. circle) an object in the environment |
| | Touch Panel: Used as a control interface to select objects, zones, locations, and lines |
| | Sensors: IMU, pressure, RFID, color, and temperature sensors may be used for additional attributes of devices in the environment |
| Example Devices Controlled by the System | |
| Example General Tool Service Provisioning Steps | Define the type of profile criteria desired and error management operation |
| Example Tool Control Parameters | Behavior Type: Audio, Lights, Video, Show, Combined = types of profiles (e.g. shows) |
| | Error Management: Control parameter used to store flags that determine what operations or steps should be taken if an error is encountered |
| | Duration Threshold: Control parameter used to define the maximum duration allowed to generate a profile |
| | Duration Type: Control parameter used to manage what mechanism is used to control the duration threshold (e.g. user with manual start stop indications, internal timer) |
| | User ID: Control parameter used to internally generate a profile label based upon system or node user information |
| | Label: Control parameter used to store a custom label for the profile; the name is specified by the user |

Although not illustrated in the figures, a further function that may be performed by the V2V control system may include a symmetry behavior function. In the symmetry behavior function the attributes and devices in the control environment may be updated based upon changes in the designed look of an image. For example, a particular image may be formed with symmetric beams and the symmetry behavior function will maintain symmetry of the image on device failure. In this example, an image is created with light which is supposed to be symmetric. One of the fixtures in the group fails. If the device count is even, that is if there were an even number of fixtures in the image, the control system will evaluate how many fixtures are still operating in the image. If more than two fixtures are still working, the system will close the iris or shutter on the failed unit's mate device so that it also appears off. In this way, symmetry of the image Although not illustrated in the figures, a further function that may be performed by the V2V control system may include a symmetry behavior function. In the symmetry behavior function the attributes and devices in the control environment may be updated based upon changes in the designed look of an image. For example, a particular image may be formed with symmetric beams and the symmetry behavior function will maintain symmetry of the image on device failure. In this example, an image is created with light which is supposed to be symmetric. One of the fixtures in the group fails. If the device count is even, that is if there were an even number of fixtures in the image, the control system will evaluate how many fixtures are still operating in the image. If more than two fixtures are still working, the system will close the iris or shutter on the failed unit's mate device so that it also appears off. In this way, symmetry of the image is maintained.

Further description of the V2V Symmetry Behavior function is provided in the following table:

It will be appreciated by those skilled in the art having the benefit of this disclosure that this Vision 2 Vision control system provides a system and method for controlling output devices based upon the detection of objects in an entertainment environment. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. For example, although certain embodiments are described for use in an entertainment environment, it should be understood that in still other embodiments, the control system may be used in any type of environment—an example of an alternate control environment could be a building where controlling the environment facilitates the integration of systems building systems such as lighting, HVAC, and

| Control System Service | V2V-Standard |
|---|---|
| Tool Service Operation | Symmetry Behavior |
| Example Control Capability Introduced | Update the attributes of devices in the control environment based upon Changes in the designed look of an image (e.g. image with symmetric beams) Example Sequence = Maintain Symmetry on Device Failure: Assume an image created with lights is supposed to be symmetric one of the fixtures in the group fails the device count is even (i.e. there were an even number of fixtures in the image) Control System Actions control system will evaluate how many fixtures are still operating in the image if more than two fixtures are still working, the system will close the iris or shutter on the failed unit's mate device so that it also appears off |
| Key Components | *Control System: Provides computational power, storage, and user interfaces Camera(s): Provides video and image input to computer vision pipeline tasks May be packaged with IMU, pressure, laser, and or GPS |
| Example Additional Components Utilized Based Upon Desired System Services and Control Capability | Additional Data Storage Units: Used to archive video and or audio streams Head Set: Used to tell the system a location in the environment (e.g. Don's office, Downstage Center) where tool operation is mapped Laser Pointer: Used to point to a location in the environment where tool operation is mapped; Used to point to or select (e.g. circle) an object in the environment Touch Panel: Used as a control interface to select objects, zones, locations, and lines Sensors: IMU, pressure, RFID, color, and temperature sensors may be used for additional attributes of devices in the environment |
| Example Devices Controlled by the System | Light Fixtures, Video Panels |
| Example General Tool Service Provisioning Steps | When a set of attributes is mapped to a cue (i.e. a specific look) additional parameters are utilized to store the designed image look type (e.g. random, symmetric, asymmetric) |
| Example Tool Control Parameters | Behavior Type: Automatic, Manual Look Type: Random, Symmetric, Asymmetric, Fan, Custom Device Count: Control parameter used to indicate how many fixtures are used in the image Fixture Gap: Control parameter used to control spacing of fixture beams in a given look (e.g. for a look type of fan, space the beams using a specific angel of separation between each of the beams) Error Management: Control parameter used to store flags that determine what operations or steps should be taken if an error is encountered | security. Thus, it is intended that the following claims be interpreted to embrace all such further modifications, changes, rearrangements, substitutions, alternatives, design choices, and embodiments.

What is claimed is:

1. A method for controlling an object space having an associated physical object space environment, comprising the steps of:
    defining the object space within a viewable image having a viewable image area as a set of object space coordinates within the viewable image to create a fixed object space area, wherein the fixed object space area is less than the viewable image area;
    defining a fixed target set of coordinates within a portion of the viewable image area overlapping and within the object space coordinates in response to a change in the portion of the viewable image area within the object space;
    creating a baseline reference image, including
        capturing one or more images of a reference object within the viewable image area,
        detecting object attributes of the reference object including color, shape, or texture attributes, and
        configuring an image of the reference object as the baseline reference image;
    recognizing a presence of one or more objects in the object space;
    determining a coordinate location of the recognized one or more objects in the object space relative to the object space coordinates;
    determining a spatial relationship between the recognized one or more objects and the fixed target set of coordinates;
    comparing the spatial relationship with predetermined spatial relationship criteria; and
    if the determined spatial relationship falls within the predetermined spatial relationship criteria, modifying the physical object space environment by projecting the baseline reference image into the physical object space environment.

2. The method of claim 1, wherein the coordinate location is a two-dimensional coordinate location.

3. The method of claim 1, wherein the coordinate location is a three-dimensional coordinate location.

4. The method of claim 1, wherein the physical object space environment is a visual environment.

5. The method of claim 1, wherein the physical object space environment is an audio environment.

6. The method of claim 1, wherein the physical object space environment is a sensor environment.

7. The method of claim 1, wherein the step of recognizing the presence of the one or more objects in the object space further comprises:
    capturing an image of the object space; and
    detecting the presence of the one or more objects within the object space using the image of the object space.

8. The method of claim 1, wherein the step of modifying the physical object space environment comprises controlling at least one output device within the physical object space environment.

9. The method of claim 8, wherein the controlling of the at least one output device comprises controlling at least one control attribute of the at least one output device.

10. The method of claim 9, wherein the at least one control attribute includes one or more of, a pan value, a tilt value, a color, a location, a position, a shape, a pattern, a texture, an image, a video, zoom, audio attributes, atmospherics, a temperature, and an output intensity value of the at least one output device.

11. The method of claim 8, wherein the at least one output device comprises at least one of a lighting fixture, a camera, a video screen, a video stream, an audio device, an HVAC device, and an effects device.

12. The method of claim 1, wherein the defining of the fixed target set of coordinates within the portion of the viewable image area overlapping and within the object space coordinates further comprises:
    capturing an image of the object space; and
    detecting a designated target location or a designated target area within the object space from the image of the object space; and
    determining the fixed target set of coordinates from the designated target location or the designated target area.

13. The method of claim 12, further comprising directing a beam of a light source to the designated target location, or to a set of locations defining the designated target area, by a user, wherein the detecting of the designated target location or area comprises detecting the light source at the designated target location or area.

14. The method of claim 1, further comprising storing data representing at least one of the object space and the fixed target set of coordinates.

15. The method of claim 1, wherein the defining of the fixed target set of coordinates in the object space further comprises:
    selecting a designated target location by a user using a user interface device; and
    determining the fixed target set of coordinates based upon the selected designated target location.

16. The method of claim 15, wherein the user interface device comprises at least one of a touch screen and a light source.

17. The method of claim 1, further comprising detecting a gesture of the one or more objects within the physical object space environment.

18. The method of claim 1, further comprising:
    determining attributes of the recognized one or more objects; and
    comparing the attributes of the recognized one or more objects to those of predefined attribute criteria, and if a determined attribute criteria falls within the predefined attribute criteria, modifying the physical object space environment.

19. The method of claim 18, wherein the attributes include at least one of color, size, shape, pattern, texture, trajectory, motion, angle, height, intensity, location, position, audio, image, and temperature.

20. The method of claim 1, further comprising:
    determining characteristics of an audio stream and mapping the characteristics to audio attributes;
    comparing the audio attributes with predefined audio mapping criteria; and
    if the audio attributes fall within the predefined audio mapping criteria, modifying the physical object space environment.

21. The method of claim 1, wherein defining the object space within a viewable image as a set of object space coordinates within the viewable image further comprises directing a beam of a light source to a plurality of target locations, the plurality of target locations defining boundaries of the object space.

22. The method of claim 1, wherein the fixed target set of coordinates is a subset of the object space.

* * * * *